US012295063B2

(12) United States Patent
Wang et al.

(10) Patent No.: US 12,295,063 B2
(45) Date of Patent: May 6, 2025

(54) SIGNALING OF JOINT ALIGNMENT OF UU DRX AND SL DRX

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US); Junyi Li, Fairless Hills, PA (US)

(73) Assignee: QUALCOMM Incorporated, San Diego, CA (US)

(*) Notice: Subject to any disclaimer, the term of this patent is extended or adjusted under 35 U.S.C. 154(b) by 401 days.

(21) Appl. No.: 17/647,726

(22) Filed: Jan. 11, 2022

(65) Prior Publication Data

US 2023/0225002 A1 Jul. 13, 2023

(51) Int. Cl.
*H04W 76/28* (2018.01)

(52) U.S. Cl.
CPC .................................. *H04W 76/28* (2018.02)

(58) Field of Classification Search
CPC ...... H04W 76/23; H04W 76/28; H04W 92/10
See application file for complete search history.

(56) References Cited

U.S. PATENT DOCUMENTS

2014/0036748 A1* 2/2014 Mukherjee ........ H04W 52/0212 370/311
2021/0059005 A1 2/2021 Hosseini et al.
2021/0227465 A1* 7/2021 Kung ................ H04W 52/0216
2021/0227620 A1 7/2021 Pan et al.
2022/0022279 A1* 1/2022 Kim ...................... H04W 72/23
2023/0053975 A1* 2/2023 Wang .................... H04W 76/28

(Continued)

FOREIGN PATENT DOCUMENTS

WO WO-2021119474 A1 * 6/2021 ........ H04W 72/0406
WO WO-2022154413 A1 * 7/2022 ............ H04W 72/04
WO WO-2022212687 A1 * 10/2022 ............ H04W 72/02

(Continued)

OTHER PUBLICATIONS

English Translation of WO-2022154413-A1; 2022.*

(Continued)

*Primary Examiner* — Jamal Javaid
*Assistant Examiner* — Ryan C Kavleski
(74) *Attorney, Agent, or Firm* — Arent Fox, LLP and Qualcomm, Incorporated

(57) ABSTRACT

Aspects present herein relate to methods and devices for wireless communication including an apparatus, e.g., a UE and/or a base station. More specifically, aspects described are directed to enhancements to bi-directional alignment of discontinuous reception (DRX). In some examples, an apparatus may receive, from a first user equipment (UE), an indication of discontinuous reception (DRX) assistance information. The apparatus may further configure a first sidelink (SL) DRX configuration for the first UE, a second SL DRX configuration for a second UE, and a first UE-universal mobile telecommunications system terrestrial radio access (UTRA) interface (Uu) DRX configuration for the first UE, wherein at least one of the first SL DRX configuration, the second SL DRX configuration, and the first Uu DRX configuration are configured based on the DRX assistance information.

30 Claims, 20 Drawing Sheets

(56) References Cited

U.S. PATENT DOCUMENTS

2023/0397295 A1* 12/2023 Salim .................... H04W 76/28

FOREIGN PATENT DOCUMENTS

| | | | | |
|---|---|---|---|---|
| WO | WO-2023000321 A1 * | 1/2023 | ........ | H04W 52/0216 |
| WO | 2023013995 A1 | 2/2023 | | |
| WO | WO-2023108655 A1 * | 6/2023 | ............ | H04W 76/14 |

OTHER PUBLICATIONS

English Translation of WO-2023108655-A1 (Year: 2023).*

Ericsson: "Summary of [Post116-e][718][V2X/SL] SL DRX Configuration", R2-2200007, 3GPP TSG-RAN WG2 Meeting #116bis-e, 3rd Generation Partnership Project (3GPP), Mobile Competence Centre, 650, Route Des Lucioles, F-06921 Sophia-Antipolis Cedex, France, vol. RAN WG2, No. Electronic, Jan. 17, 2022-Jan. 25, 2022, Dec. 17, 2021, XP052088892, 22 Pages, p. 10-p. 12.

Partial International Search Report—PCT/US2022/080889—ISA/EPO—Apr. 21, 2023.

International Search Report and Written Opinion—PCT/US2022/080889—ISA/EPO—Jun. 13, 2023.

* cited by examiner

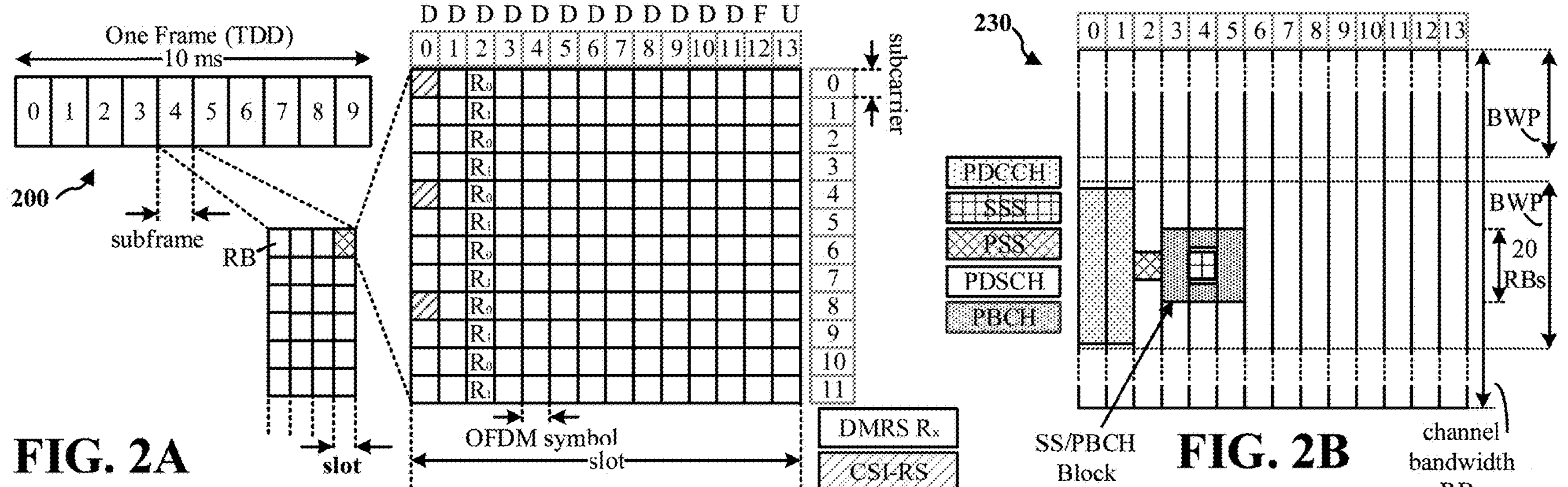
FIG. 2A
FIG. 2B
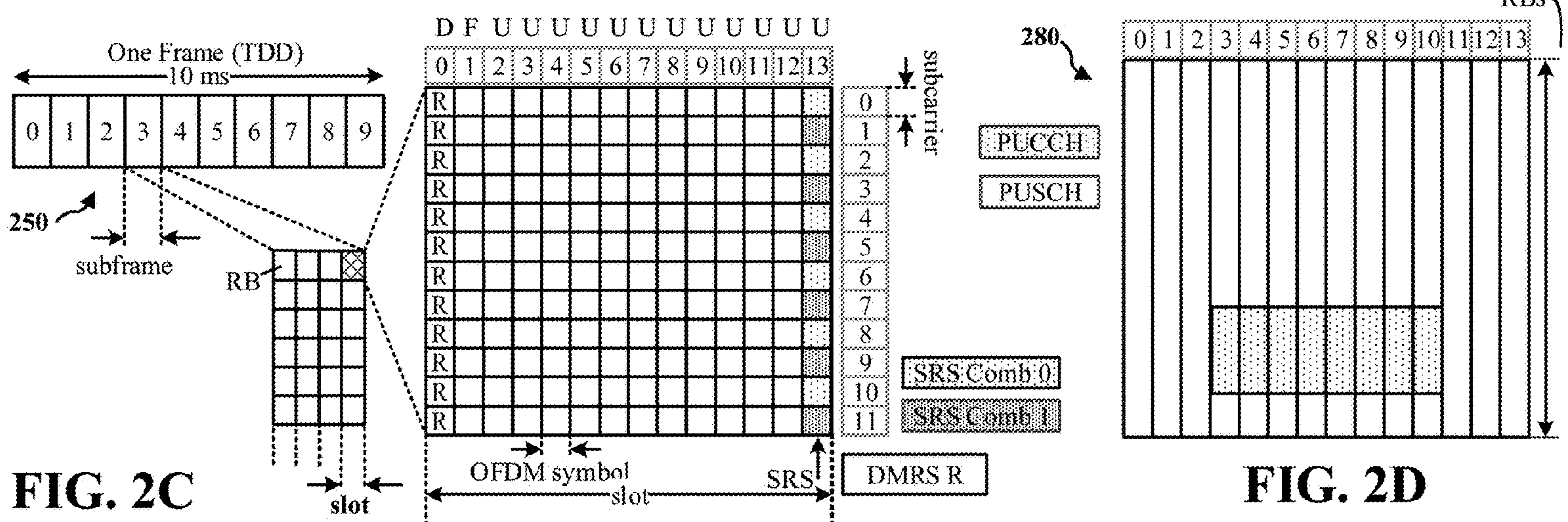
FIG. 2C
FIG. 2D

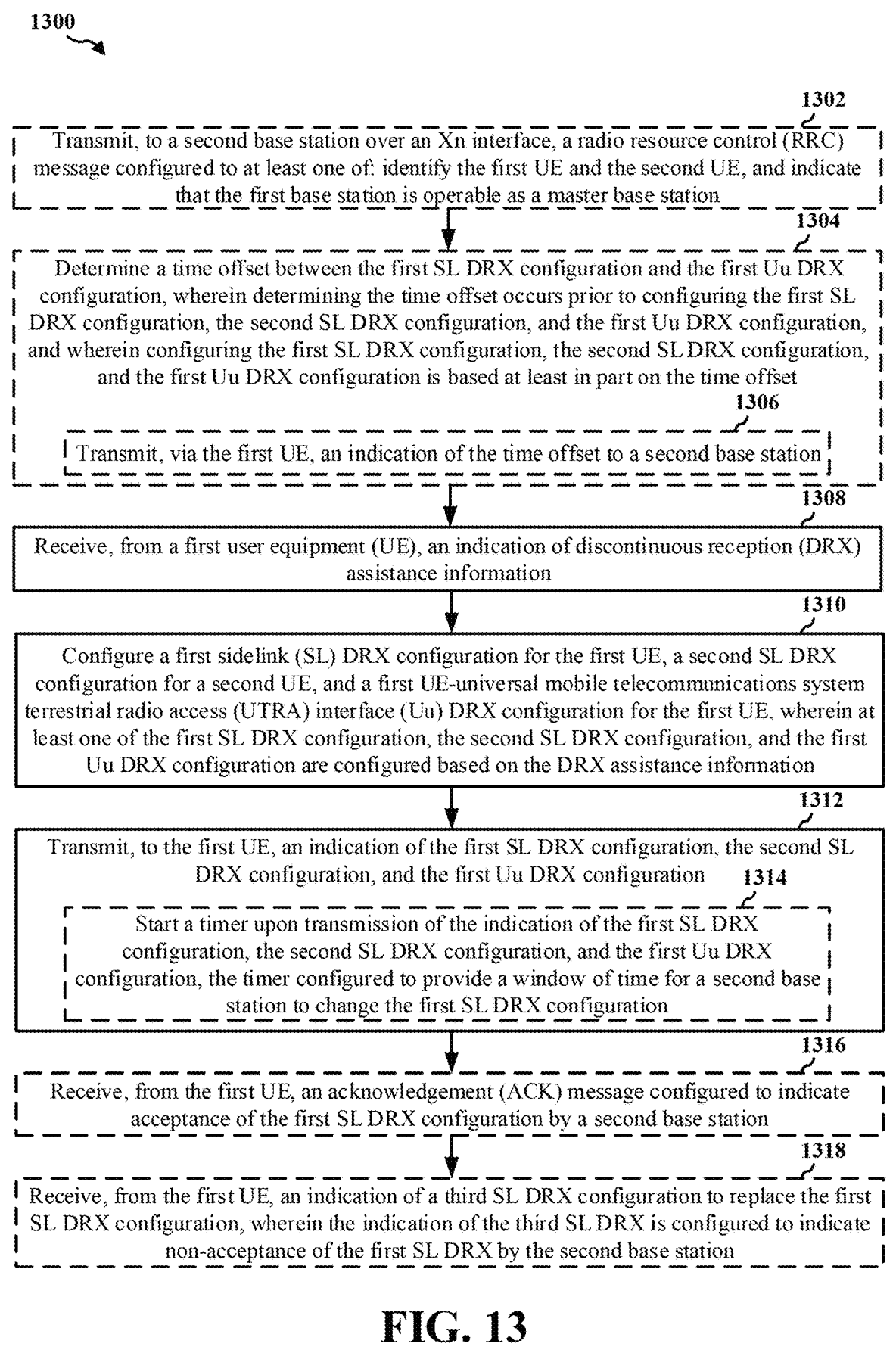

1300

1302: Transmit, to a second base station over an Xn interface, a radio resource control (RRC) message configured to at least one of: identify the first UE and the second UE, and indicate that the first base station is operable as a master base station 1304: Determine a time offset between the first SL DRX configuration and the first Uu DRX configuration, wherein determining the time offset occurs prior to configuring the first SL DRX configuration, the second SL DRX configuration, and the first Uu DRX configuration, and wherein configuring the first SL DRX configuration, the second SL DRX configuration, and the first Uu DRX configuration is based at least in part on the time offset 1306: Transmit, via the first UE, an indication of the time offset to a second base station 1308: Receive, from a first user equipment (UE), an indication of discontinuous reception (DRX) assistance information 1310: Configure a first sidelink (SL) DRX configuration for the first UE, a second SL DRX configuration for a second UE, and a first UE-universal mobile telecommunications system terrestrial radio access (UTRA) interface (Uu) DRX configuration for the first UE, wherein at least one of the first SL DRX configuration, the second SL DRX configuration, and the first Uu DRX configuration are configured based on the DRX assistance information 1312: Transmit, to the first UE, an indication of the first SL DRX configuration, the second SL DRX configuration, and the first Uu DRX configuration 1314: Start a timer upon transmission of the indication of the first SL DRX configuration, the second SL DRX configuration, and the first Uu DRX configuration, the timer configured to provide a window of time for a second base station to change the first SL DRX configuration 1316: Receive, from the first UE, an acknowledgement (ACK) message configured to indicate acceptance of the first SL DRX configuration by a second base station 1318: Receive, from the first UE, an indication of a third SL DRX configuration to replace the first SL DRX configuration, wherein the indication of the third SL DRX is configured to indicate non-acceptance of the first SL DRX by the second base station

FIG. 13

SIGNALING OF JOINT ALIGNMENT OF UU DRX AND SL DRX

TECHNICAL FIELD

The present disclosure relates generally to communication systems, and more particularly, to discontinuous reception (DRX) configurations in wireless communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to an apparatus for wireless communications at a first base station. In some examples, the apparatus includes a memory comprising instructions, and one or more processors configured to execute the instructions. In some examples, the one or more processors are configured to cause the apparatus to receive, from a first user equipment (UE), an indication of discontinuous reception (DRX) assistance information. In some examples, the one or more processors are configured to cause the apparatus to configure a first sidelink (SL) DRX configuration for the first UE, a second SL DRX configuration for a second UE, and a first UE-universal mobile telecommunications system terrestrial radio access (UTRA) interface (Uu) DRX configuration for the first UE, wherein at least one of the first SL DRX configuration, the second SL DRX configuration, and the first Uu DRX configuration are configured based on the DRX assistance information. In some examples, the one or more processors are configured to cause the apparatus to transmit, to the first UE, an indication of the first SL DRX configuration, the second SL DRX configuration, and the first Uu DRX configuration.

Certain aspects are directed to an apparatus for wireless communications at a first base station. In some examples, the apparatus includes a memory comprising instructions, and one or more processors configured to execute the instructions. In some examples, the one or more processors are configured to cause the apparatus to receive, from a first user equipment (UE), an indication of a first sidelink (SL) discontinuous reception (DRX) configuration for the first UE and a second SL DRX configuration for a second UE. In some examples, the one or more processors are configured to cause the apparatus to determine whether to accept the second SL DRX configuration based at least in part on the first SL DRX configuration.

Certain aspects are directed to an apparatus for wireless communications at a first user equipment (UE). In some examples, the apparatus includes a memory comprising instructions, and one or more processors configured to execute the instructions. In some examples, the one or more processors are configured to receive, from a first base station, an indication of a first UE-universal mobile telecommunications system terrestrial radio access (UTRA) interface (Uu) discontinuous reception (DRX) configuration for the first UE, a first sidelink (SL) DRX configuration for the first UE, and a second SL DRX configuration for a second UE. In some examples, the one or more processors are configured to apply the first Uu DRX configuration and the first SL DRX configuration. In some examples, the one or more processors are configured to transmit, to the second UE, the indication of the second SL DRX configuration.

Certain aspects are directed to an apparatus for wireless communications at a first user equipment (UE). In some examples, the apparatus includes a memory comprising instructions and one or more processors configured to execute the instructions. In some examples, the one or more processors are configured to receive, from a second UE, an indication of a first sidelink (SL) discontinuous reception (DRX) configuration for the first UE, a UE-universal mobile telecommunications system terrestrial radio access (UTRA) interface (Uu) DRX configuration for the second UE, and a second SL DRX configuration for the second UE. In some examples, the one or more processors are configured to apply the first SL DRX configuration. In some examples, the one or more processors are configured to transmit, to the second UE, the indication of the first Uu DRX configuration and the second SL DRX configuration.

Certain aspects are directed to a method for wireless communications at a first base station. In some examples, the method includes receiving, from a first user equipment (UE), an indication of discontinuous reception (DRX) assistance information. In some examples, the method includes configuring a first sidelink (SL) DRX configuration for the first UE, a second SL DRX configuration for a second UE, and a first UE-universal mobile telecommunications system terrestrial radio access (UTRA) interface (Uu) DRX configuration for the first UE, wherein at least one of the first SL DRX configuration, the second SL DRX configuration, and the first Uu DRX configuration are configured based on the DRX assistance information. In some examples, the method includes transmitting, to the first UE, an indication of the first SL DRX configuration, the second SL DRX configuration, and the first Uu DRX configuration.

Certain aspects are directed to a method for wireless communications at a first base station. In some examples, the method includes receiving, from a first user equipment (UE), an indication of a first sidelink (SL) discontinuous reception (DRX) configuration for the first UE and a second SL DRX configuration for a second UE. In some examples, the method includes determining whether to accept the second SL DRX configuration based at least in part on the first SL DRX configuration.

Certain aspects are directed to a method for wireless communications at a first user equipment (UE). In some examples, the method includes receiving, from a first base station, an indication of a first UE-universal mobile telecommunications system terrestrial radio access (UTRA) interface (Uu) discontinuous reception (DRX) configuration for the first UE, a first sidelink (SL) DRX configuration for the first UE, and a second SL DRX configuration for a second UE. In some examples, the method includes applying the first Uu DRX configuration and the first SL DRX configuration. In some examples, the method includes transmitting, to the second UE, the indication of the second SL DRX configuration.

Certain aspects are directed to a method for wireless communications at a first user equipment (UE). In some examples, the method includes receiving, from a second UE, an indication of a first sidelink (SL) discontinuous reception (DRX) configuration for the first UE, a UE-universal mobile telecommunications system terrestrial radio access (UTRA) interface (Uu) DRX configuration for the second UE, and a second SL DRX configuration for the second UE. In some examples, the method includes applying the first SL DRX configuration. In some examples, the method includes transmitting, to the second UE, the indication of the first Uu DRX configuration and the second SL DRX configuration.

Certain aspects are directed to an apparatus for wireless communications. In some examples, the apparatus includes means for receiving, from a first user equipment (UE), an indication of discontinuous reception (DRX) assistance information. In some examples, the apparatus includes means for configuring a first sidelink (SL) DRX configuration for the first UE, a second SL DRX configuration for a second UE, and a first UE-universal mobile telecommunications system terrestrial radio access (UTRA) interface (Uu) DRX configuration for the first UE, wherein at least one of the first SL DRX configuration, the second SL DRX configuration, and the first Uu DRX configuration are configured based on the DRX assistance information. In some examples, the apparatus includes means for transmitting, to the first UE, an indication of the first SL DRX configuration, the second SL DRX configuration, and the first Uu DRX configuration.

Certain aspects are directed to an apparatus for wireless communications. In some examples, the apparatus includes means for receiving, from a first user equipment (UE), an indication of a first sidelink (SL) discontinuous reception (DRX) configuration for the first UE and a second SL DRX configuration for a second UE. In some examples, the apparatus includes means for determining whether to accept the second SL DRX configuration based at least in part on the first SL DRX configuration.

Certain aspects are directed to an apparatus for wireless communications. In some examples, the apparatus includes means for receiving, from a first base station, an indication of a first UE-universal mobile telecommunications system terrestrial radio access (UTRA) interface (Uu) discontinuous reception (DRX) configuration for the first UE, a first sidelink (SL) DRX configuration for the first UE, and a second SL DRX configuration for a second UE. In some examples, the apparatus includes means for applying the first Uu DRX configuration and the first SL DRX configuration. In some examples, the apparatus includes means for transmitting, to the second UE, the indication of the second SL DRX configuration.

Certain aspects are directed to an apparatus for wireless communications. In some examples, the apparatus includes means for receiving, from a second UE, an indication of a first sidelink (SL) discontinuous reception (DRX) configuration for the first UE, a UE-universal mobile telecommunications system terrestrial radio access (UTRA) interface (Uu) DRX configuration for the second UE, and a second SL DRX configuration for the second UE. In some examples, the apparatus includes means for applying the first SL DRX configuration. In some examples, the apparatus includes means for transmitting, to the second UE, the indication of the first Uu DRX configuration and the second SL DRX configuration.

A non-transitory computer-readable medium having instructions stored thereon that, when executed by a first base station, cause the first base station to perform operations. In some examples, the operations include receiving, from a first user equipment (UE), an indication of discontinuous reception (DRX) assistance information. In some examples, the operations include configuring a first sidelink (SL) DRX configuration for the first UE, a second SL DRX configuration for a second UE, and a first UE-universal mobile telecommunications system terrestrial radio access (UTRA) interface (Uu) DRX configuration for the first UE, wherein at least one of the first SL DRX configuration, the second SL DRX configuration, and the first Uu DRX configuration are configured based on the DRX assistance information. In some examples, the operations include transmitting, to the first UE, an indication of the first SL DRX configuration, the second SL DRX configuration, and the first Uu DRX configuration.

A non-transitory computer-readable medium having instructions stored thereon that, when executed by a first base station, cause the first base station to perform operations. In some examples, the operations include receiving, from a first user equipment (UE), an indication of a first sidelink (SL) discontinuous reception (DRX) configuration for the first UE and a second SL DRX configuration for a second UE. In some examples, the operations include determining whether to accept the second SL DRX configuration based at least in part on the first SL DRX configuration.

A non-transitory computer-readable medium having instructions stored thereon that, when executed by a first user equipment (UE), cause the first UE to perform operations. In some examples, the operations include receiving, from a first base station, an indication of a first UE-universal mobile telecommunications system terrestrial radio access (UTRA) interface (Uu) discontinuous reception (DRX) configuration for the first UE, a first sidelink (SL) DRX configuration for the first UE, and a second SL DRX configuration for a second UE. In some examples, the operations include applying the first Uu DRX configuration and the first SL DRX configuration. In some examples, the operations include transmitting, to the second UE, the indication of the second SL DRX configuration.

A non-transitory computer-readable medium having instructions stored thereon that, when executed by a first user equipment (UE), cause the first UE to perform operations. In some examples, the operations include receiving, from a second UE, an indication of a first sidelink (SL) discontinuous reception (DRX) configuration for the first UE, a UE-universal mobile telecommunications system terrestrial radio access (UTRA) interface (Uu) DRX configuration for the second UE, and a second SL DRX configuration for the second UE. In some examples, the operations include applying the first SL DRX configuration. In some examples, the operations include transmitting, to the second UE, the indication of the first Uu DRX configuration and the second SL DRX configuration.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 13 is a flowchart of a method of wireless communication.

DETAILED DESCRIPTION

Figure 1:
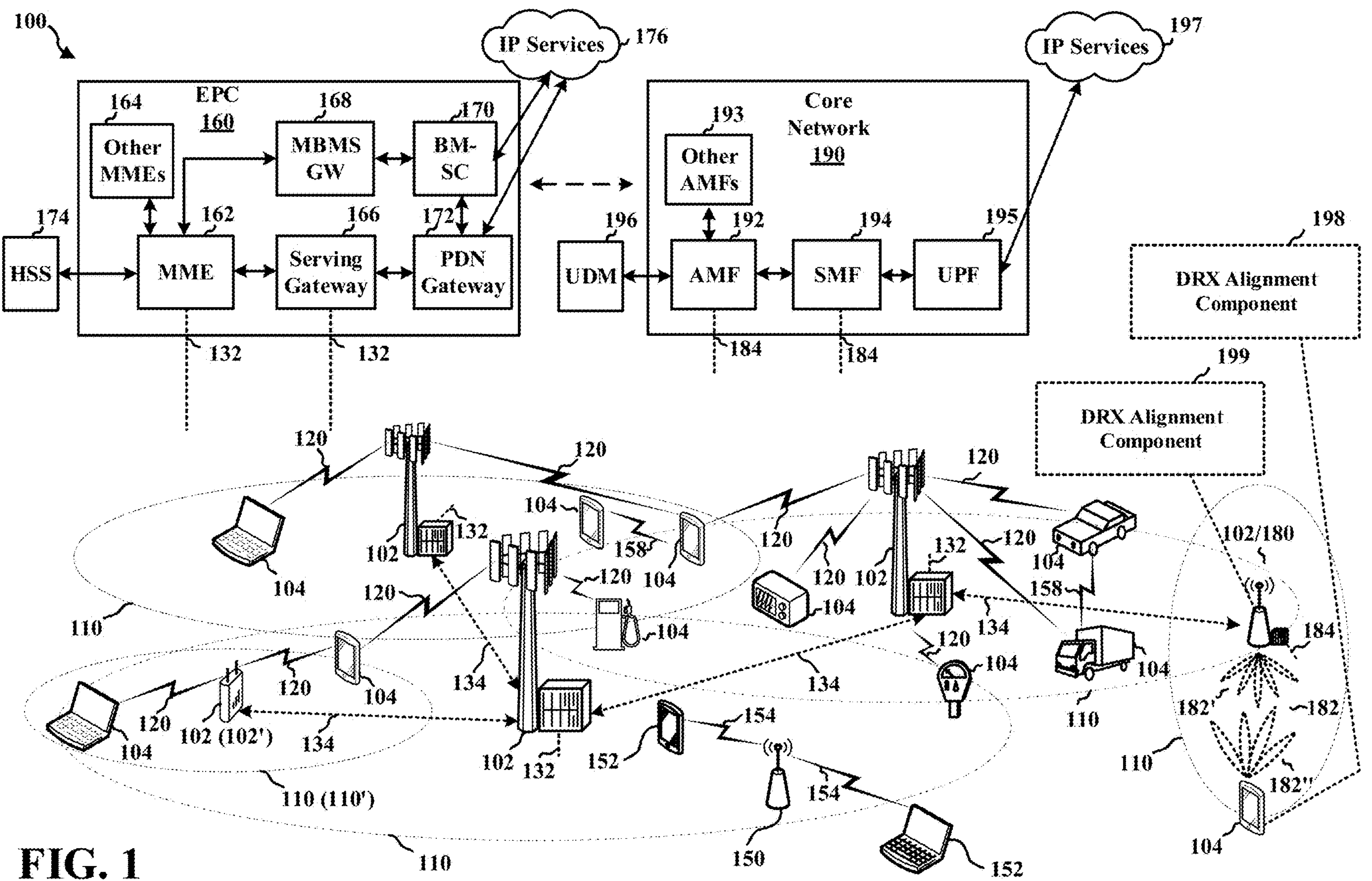
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-*a* or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a DRX alignment component 198 configured to receive, from a first base station, an indication of a first UE-universal mobile telecommunications system terrestrial radio access network (UTRAN) (Uu) discontinuous reception (DRX) configuration for the first UE, a first sidelink (SL) DRX configuration for the first UE, and a second SL DRX configuration for a second UE; apply the first Uu DRX configuration and the first SL DRX configuration; and transmit, to the second UE, the indication of the second SL DRX configuration.

DRX alignment component 198 may also be configured to receive, from a second UE, an indication of a first sidelink (SL) discontinuous reception (DRX) configuration for the first UE, a first UE-universal mobile telecommunications system terrestrial radio access network (UTRAN) (Uu) DRX configuration for the second UE, and a second SL DRX configuration for the second UE; apply the first SL DRX configuration; and transmit, to the second UE, the indication of the first Uu DRX configuration and the second SL DRX configuration.

Referring again to FIG. 1, in certain aspects, the base station 180 may include a DRX alignment component 199 configured to receive, from a first user equipment (UE), an indication of discontinuous reception (DRX) assistance information; configure a first sidelink (SL) DRX configuration for the first UE, a second SL DRX configuration for a second UE, and a first UE-universal mobile telecommunications system terrestrial radio access (UTRA) interface (Uu) DRX configuration for the first UE, wherein at least one of the first SL DRX configuration, the second SL DRX configuration, and the first Uu DRX configuration are configured based on the DRX assistance information; and transmit, to the first UE, an indication of the first SL DRX configuration, the second SL DRX configuration, and the first Uu DRX configuration.

DRX alignment component 199 may also be configured to receive, from a first user equipment (UE), an indication of a first sidelink (SL) discontinuous reception (DRX) configuration for the first UE and a second SL DRX configuration for a second UE; and determine whether to accept the second SL DRX configuration based at least in part on the first SL DRX configuration.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5 G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe.

The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (e.g., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
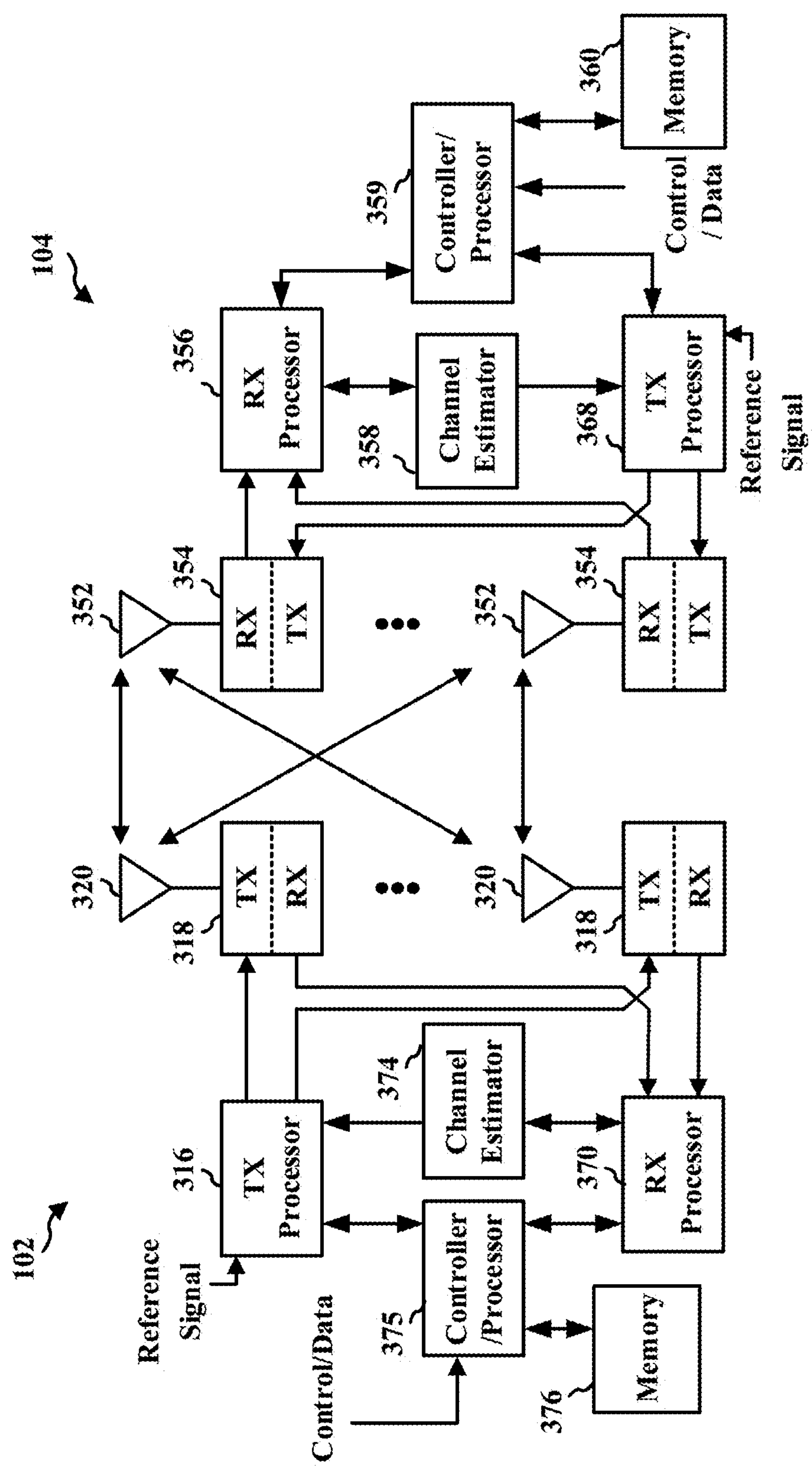
FIG. 3 is a diagram illustrating an example of a base station and user equipment (UE) in an access network.

FIG. 3 is a block diagram of a base station 102 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318 TX. Each transmitter 318 TX may modulate a radio frequency (RF) carrier with a respective spatial stream for transmission.

At the UE 104, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102. These soft decisions may be based on channel estimates computed by the channel estimator 358. The soft decisions are then decoded and deinterleaved to recover the data and control signals that were originally transmitted by the base station 102 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

Figure 4:
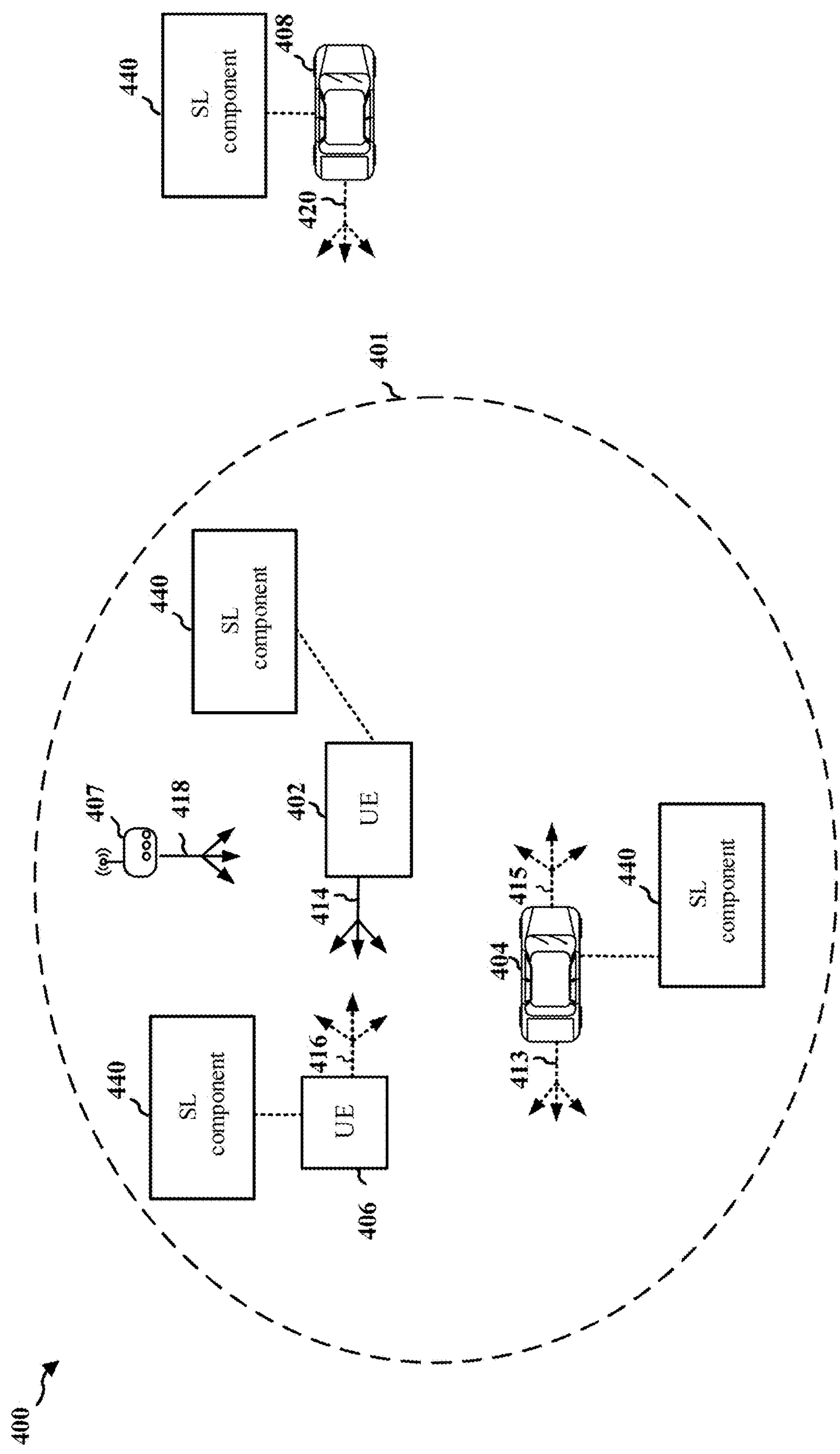
FIG. 4 is a diagram illustrating example aspects of sidelink (SL) communication between devices.

FIG. 4 is a diagram 400 illustrating example aspects of sidelink communication between devices. For example, the UE 402 may transmit a sidelink transmission 414, e.g., including a control channel (e.g., a physical sidelink control channel (PSCCH)) and/or a corresponding data channel (e.g., a physical sidelink shared channel (PSSCH)), that may be received by UEs 404, 406, 408. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 402, 404, 406, 408 may each be capable of sidelink transmission in addition to sidelink reception. Thus, UEs 404, 406, 408 are illustrated as transmitting sidelink transmissions 413, 415, 416, 420. The sidelink transmissions 413, 414, 415, 416, 420 may be unicast, broadcast, or multicast to nearby devices. For example, UE 404 may transmit transmissions 413, 415 intended for receipt by other UEs within a range 401 of UE 404, and UE 406 may transmit transmission 416. Additionally, RSU 407 may receive communication from and/or transmit transmission 418 to UEs 402, 404, 406, 408. One or more of the UEs 402, 404, 406, 408 or the RSU 407 may include an SL component 440.

Sidelink communication may be based on different types or modes of resource allocation mechanisms. In a first resource allocation mode (which may be referred to herein as "Mode 1"), centralized resource allocation may be provided by a network entity. For example, a base station may determine resources for sidelink communication and may allocate resources to different UEs to use for sidelink transmissions. In this first mode, a first UE receives the allocation of sidelink resources from the base station via a Uu interface, and forwards the allocation to a second UE. This requires the second UE to monitor the channel when the first UE starts transmitting. Thus, in such an arrangement, it would be beneficial if the DRX configuration of each UE is aligned in time, such that the first UE and the second UE cycle through a sleep state and an active state at the same time. If there is misalignment, then the second UE may be required to stay in an active mode for a longer duration, thereby using more power and reducing battery life. By cycling through sleep states and active states that are aligned in time, the first UE and the second UE are both in an active state at the same time, and thus, can communicate with each other without requiring one of the UEs to stay in an active state for an extended amount of time.

In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources.

Devices communicating based on sidelink may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots (as discussed below). Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs. For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RB s that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Examples of DRX Configuration Alignment

In some aspects of wireless communications, e.g., 5G new radio (NR), a UE may be configured by a base station for a discontinuous reception (DRX) mode. In some instances, when there is no data to be transmitted between the UE and base station in either direction (e.g., no uplink or downlink transmissions) the UE may enter the DRX mode in which the UE may monitor a control channel discontinuously using a sleep and awake cycle. Moreover, the DRX mode may conserve battery power at the UE. Without DRX, the UE may need to monitor the control channel in each subframe in order to determine whether there is data for the UE. Continuous monitoring of the control channel may place a demand on the UE's battery power.

A UE and a base station may communicate during a reception cycle. In some aspects, this may occur when the UE is configured by the base station for a DRX mode. Accordingly, the reception cycle may be a DRX cycle. In some aspects, a DRX cycle may be a reception cycle during which the UE and a base station communicate while the UE is in a DRX mode. Also, the UE may receive a configuration for the reception cycle from the base station. During the DRX cycle between the base station and the UE, the base station may send a wake-up signal (WUS) monitoring occasion (MO).

In some instances, the base station may send a WUS to the UE when the base station will transmit communication to the UE. Accordingly, the base station may send a WUS to the UE during the reception cycle. In some aspects, during the reception cycle, the UE may determine whether to monitor for a WUS during a WUS time resource. If the UE receives a WUS, the UE may wake-up by preparing to receive the communication. If the UE does not receive a WUS, the UE may return to sleep mode.

In some modes of operation, a UE may be constantly awake and monitor for a PDCCH in each subframe. This means that the UE may be awake all of the time since the UE may not know exactly when the network will transmit data. By monitoring the PDCCH, the UE may monitor instructions from the network or base station. However, this PDCCH monitoring may consume a lot of power on the UE side. As mentioned above, DRX is a mechanism in which a UE transitions to sleep mode for a certain period of time and wakes-up for another period of time. One purpose of DRX may be to save power at the UE, such as by monitoring for a wake-up signal (WUS), which may reduce the amount of power utilized by the UE. So the DRX cycle may help to reduce power utilized at the UE by not continuously monitoring for the PDCCH. During a DRX cycle there may be multiple UE settings, such as an 'ON' time, e.g., where the UE monitors for the PDCCH, and an 'OFF' time, e.g., where the UE is not monitoring for the PDCCH and saving power.

There are a number of different parameters associated with DRX. As indicated above, the DRX cycle is the duration of one ON time and one OFF time. In some instances, the DRX cycle may be calculated by the subframe time and a longdrx-CycleStartOffset parameter. Also, the DRX cycle may not be explicitly specified in RRC messages. The onDurationTimer may be the duration of the ON time within one DRX cycle, e.g., the amount of time the UE monitors for the PDCCH. The drx-Inactivity timer may specify the amount of time the UE may remain ON after the reception of a PDCCH. When the drx-Inactivity timer is on, the UE may remain in an ON state which may extend the UE ON period into the period which is otherwise an OFF period. The drx-Retransmission timer may specify the maximum number of consecutive PDCCH subframes that the UE may remain active to wait for an incoming retransmission after the first available retransmission time. The shortDRX-Cycle may be a DRX cycle that may be implemented within the OFF period of a long DRX cycle. Also, the drxShortCycle-Tirner may be the consecutive number of subframes that the UE follows the short DRX cycle after the DRX inactivity timer has expired.

Some aspects of wireless communication may utilize different types of DRX configurations. For instance, for communications between a UE and a universal mobile telecommunications system terrestrial radio access network (UTRAN) (e.g., via a UE-UTRAN (Uu) interface), aspects of wireless communication may utilize Uu DRX configurations. For communications between UEs, aspects of wireless communication may utilize sidelink (SL) DRX configurations. Additionally, aspects of wireless communications may align Uu DRX configurations with SL DRX configurations. In some instances, the alignment of Uu DRX configurations and SL DRX configurations may be utilized for UEs, e.g., a transmitting (Tx) UE and a receiving (Rx) UE, in different radio resource control (RRC) modes, e.g., RRC IDLE mode, RRC INACTIVE mode, and/or RRC CONNECTED mode. For example, the Uu DRX configurations and SL DRX configurations may be aligned in a time-dimension so that some alignment between a first UE's Uu DRX configuration and an second UE's SL DRX configurations may be considered to ensure that an SL grant scheduled for the first UE during its Uu DRX active time falls into the SL DRX active time of the second UE.

Sidelink communications between the first UE and the second UE may be bi-directional. That is, in a first direction, the first UE transmits to the second UE, and the second UE receives the transmission. Here, the first UE may be considered a Tx UE, and the second UE may be considered an Rx UE. In a second direction, the second UE transmits to the first UE, and the first UE receives the transmission. In this example, the first UE may be considered an Rx UE, and the second UE may be considered a Tx UE.

There may also be different types of DRX alignment. For example, a first type of alignment may correspond to DRX alignment of a Tx UE's Uu interface with the Rx UE's sidelink interface. A second type of alignment may correspond to DRX alignment of an Rx UE's Uu interface with the Rx UE's sidelink interface.

As described in more detail below, in some examples, the DRX alignment includes an alignment of both directions and both types of alignment. For example, for direction 1, the DRX alignment may include alignment of the first UE's Uu interface with the second UE's sidelink interface, and alignment of the second UE's Uu interface with second UE's sidelink interface. For direction 2, the DRX alignment may include alignment of the second UE's Uu interface with the first UE's sidelink interface, and alignment of the first UE's Uu interface with the first UE's sidelink interface.

In certain aspects, a DRX alignment may correspond to alignment of Uu and sidelink interfaces of both the first and second UEs. That is, the first UE's Uu DRX configuration is aligned in time with the second UE's sidelink DRX configuration, both of which are aligned in time with the second UE's Uu DRX configuration, all of which are aligned with the first UE's sidelink DRX configuration, and all of which are also aligned with the first UE's Uu DRX configuration. It should be noted that if two DRX configurations are aligned, their corresponding active state and sleep state cycles may be exactly aligned in time, or there may be an offset between the corresponding active state and sleep state cycles. In other words, alignment of DRX configurations may include a full overlapping in time between a Uu DRX configuration and a sidelink DRX configuration, or a partial overlap between a Uu DRX configuration and a sidelink DRX configuration.

Figure 5:
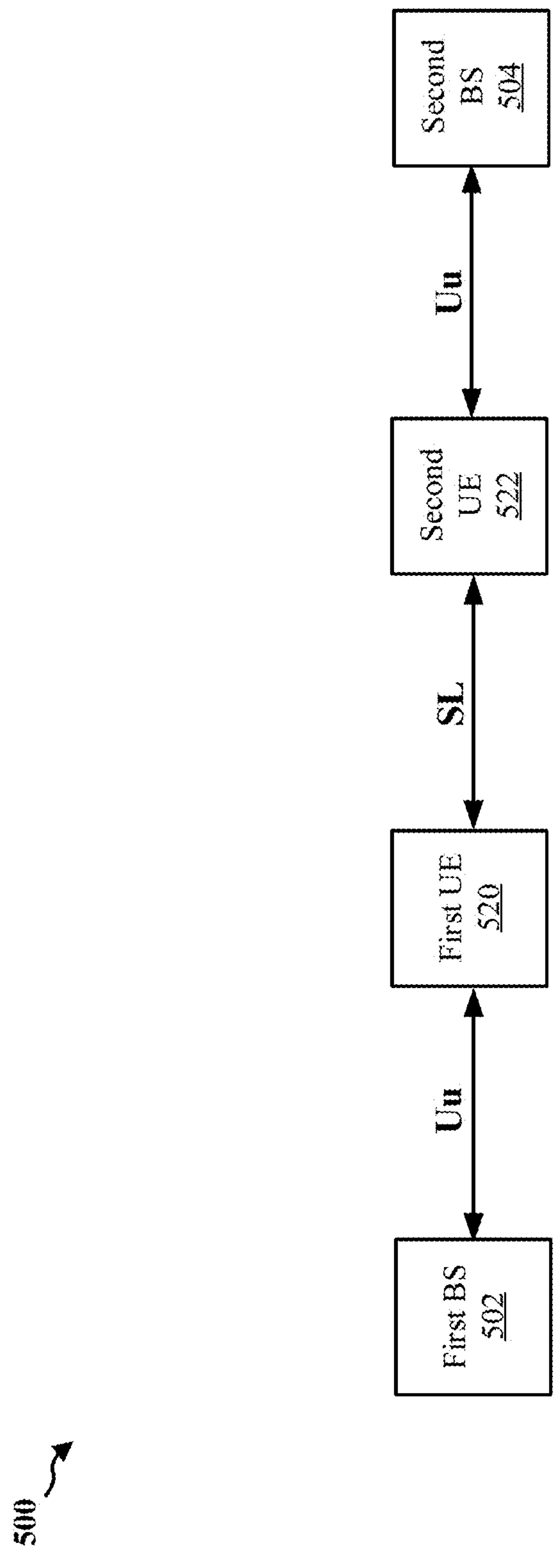
FIG. 5 is a diagram illustrating an example communication between base stations (BSs) and UEs.

FIG. 5 is a diagram 500 illustrating an example communication between base stations (BS s) and UEs. As illustrated, the diagram 500 includes a first BS 502, a second BS 504, a first UE 520, and a second UE 522. More specifically, the first UE 520 and the second UE 522 are connected via sidelink (SL), while the first BS 502 and the first UE 520 are connected via a Uu interface (e.g., RRC connected), and the second BS 504 and the second UE 522 are also connected via a Uu interface (e.g., RRC connected). Accordingly, transmissions between first UE 520 and the second UE 522 are bi-directional (e.g., each UE can operate as a Tx UE and an Rx UE).

In certain aspects, the first BS 502 and the second BS 504 may be responsible for the alignment of SL DRX and Uu DRX configurations. In this example, due to the bi-directional communication capability, DRX alignment may be in both directions. For example, in a first direction, the first UE 520 transmits to the second UE 522 (e.g., the first UE 520 is the Tx UE, and the second UE 522 is the Rx UE). In a second direction, the second UE 522 transmits to the first UE 520 (e.g., the second UE 522 is the Tx UE, and the first UE 520 is the Rx UE).

Figure 6:
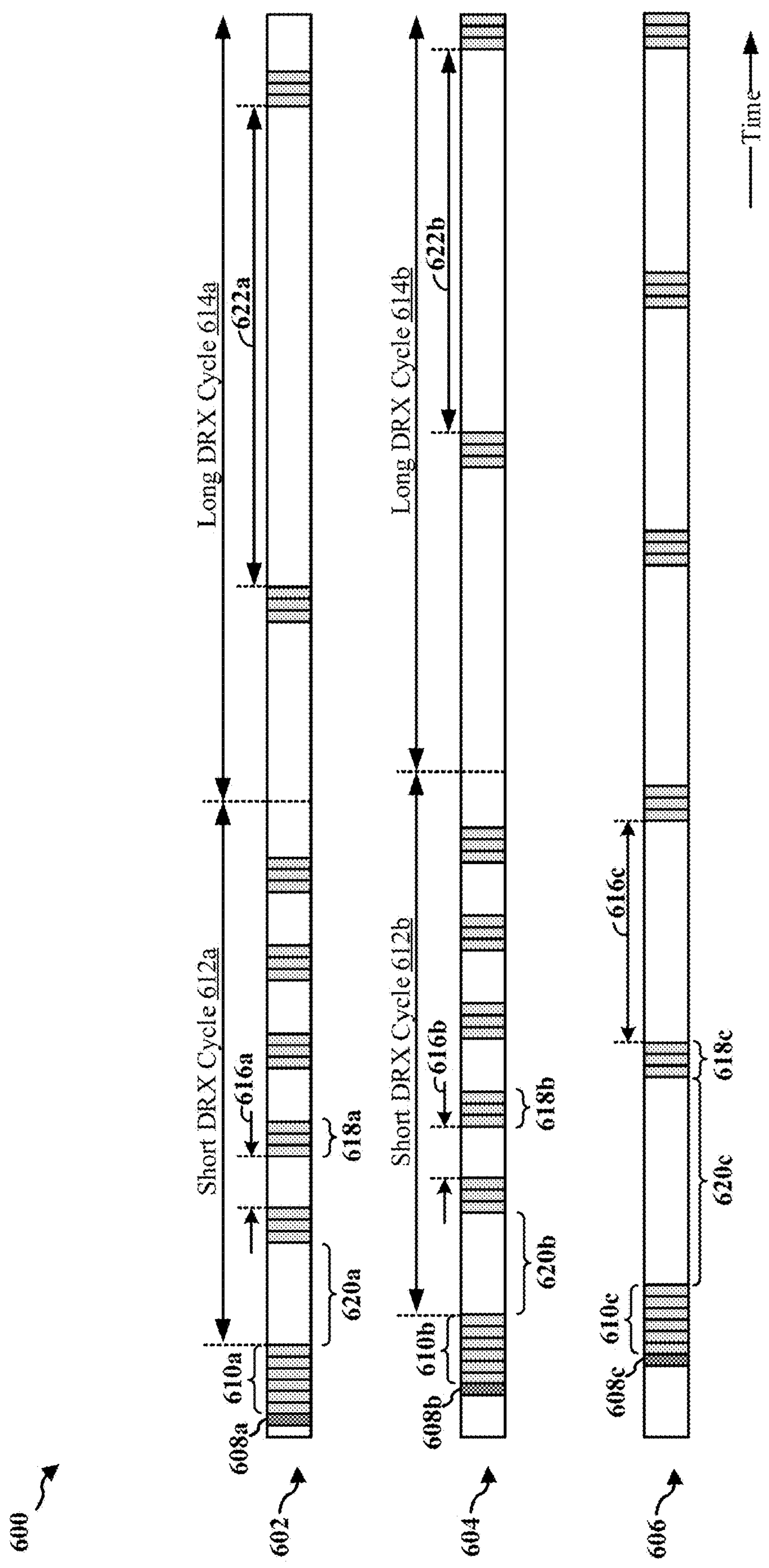
FIG. 6 is a diagram illustrating an example of UE-universal mobile telecommunications system terrestrial radio access (UTRA) interface (Uu) discontinuous reception (DRX) and SL DRX configuration timing before alignment.

FIG. 6 is a diagram 600 illustrating an example of Uu DRX and SL DRX configuration timing before alignment. As shown in FIG. 6, diagram 600 includes a timing for a first Uu DRX configuration 602 (e.g., the Uu DRX configuration of the first UE 520 of FIG. 5), a second Uu DRX configuration 604 (e.g., the Uu DRX configuration of the second UE 522 of FIG. 5), and a SL DRX configuration 606 (e.g., the SL DRX configuration of the second UE 522). More specifically, the diagram 600 depicts timing misalignment between the first Uu DRX configuration 602, the second Uu DRX configuration 604, and the SL DRX configuration 606 prior to proper alignment (e.g., illustrated in FIG. 7). For example, durations of inactivity timers 610, sleep states 616, active states 618, and/or other time offsets (e.g., cycle-start offsets 620) may not be aligned in time between the first UE 520 and the second UE 522. In this example, the first UE 520 may operate as a Tx UE, and the second UE 522 may operate as an Rx UE. That is, as illustrated, the first UE 520 transmits to the second UE 522, and the second UE receives the transmission.

The timing for the first Uu DRX configuration 602 includes a time of a last packet activity 608*a*, followed by a time duration of an inactivity timer 610*a*. The last packet activity 608*a* is illustrated as a time window (e.g., a frame, a subframe, a slot, a symbol, or any other suitable duration of time), and the inactivity timer 610*a* is illustrated as six contiguous time windows immediately following the last packet activity 608*a*. In one example, the last packet activity 608*a* is a slot during which a last downlink and/or sidelink packet is received by the first UE 520, and the inactivity timer 610*a* includes the six slots that immediately follow the last packet activity 608*a*. The first UE 520 may to “listen” for signaling from a base station or the second UE for the duration of the inactivity timer 610*a*.

The second and third Uu DRX configurations 604/606 may also include a time of a last packet activity 608*b*/608*c*, followed by a time duration of an inactivity timer 610*b*/610*c*.

If no signals are received for the duration of the inactivity timer 610*a*, the first UE 520 may enter into a sleep mode for a duration of time defined by a cycle-start offset 620*a*, following expiration of the inactivity timer 610*a*. The duration of the cycle-start offset 620*a* may depend on when the DRX configuration begins. The DRX configuration may be for a short DRX cycle 612*a* or a long DRX cycle 614*a*. For example, the first Uu DRX configuration 602 may be configured as a short DRX cycle 612*a* or a long DRX cycle 614*a*. The short DRX cycle 612*a* may be defined as having a relatively shorter sleep state 616*a* during which the first UE 520 may be in sleep mode. The long DRX cycle 614*a* may be defined as having a relatively longer sleep state 622*a*/622*b*. The second Uu DRX configuration 604 may also be configured as a short DRX cycle 612*b* or a long DRX cycle 614*b*, and may also include a cycle-start offset 620*b* following expiration of an inactivity timer 610*b*.

Accordingly, the first Uu DRX configuration 602 is defined by DRX timing configurations that provide, at least in part, offsets and durations during which the first UE 520 is in a sleep state 616*a* or an active state 618*a*. The second Uu DRX configuration 604 of the second UE 522 may be similar to the first Uu DRX configuration 602. However, as illustrated, the timing of the sleep states 616 and active states 618 between the first UE 520 and the second UE 522 are not aligned. Even if the first UE 520 and the second UE 522 are configured with the same Uu DRX configuration, communication timing could still be misaligned. Such misalignment can result in packet error and/or increased durations of the active state 618 for one or both of the first UE 520 and the second UE 522.

In some examples, the first Uu DRX configuration 602 and the second Uu DRX configuration 604 may be configured at the respective UEs via RRC signaling by a BS (e.g., the first BS 502 and/or the second BS 504). In one example, the BS can configure start of the active state 618*a*/618*b* using a drx-SlotOffset value that defines the start of the active state 618*a*/618*b* relative to the start of subframe/slot boundary. Once the active state 618*a*/618*b* starts, the UE may stay active for a duration given by a drx-onDurationTimer value provided by the BS. If the UE receives no signalling during this duration, the UE may enter into a sleep state 616*a*/616*b* until the start of next active state 618*a*/618*b*. The BS may also configure the UE for where the start location of the short DRX cycle 612*a* and the long DRX cycle 614*a* begin using one or more of RRC parameters drx-LongCycleStartOffset, drx-StartOffset, and/or drx-ShortCycle. This offset value may be defined to start at a subframe/slot boundary. In some examples, the duration of the inactivity timer 610*a*/610*b* may be configured by RRC by a drx-InactivityTimer value.

Similarly, a BS (e.g., the first BS 502 and/or the second BS 504) may configure the second UE 522 with the SL DRX configuration 606 (e.g., the SL DRX configuration of the second UE 522). Here, the duration of offsets (e.g., inactivity timer 610*c*, cycle-start offset 620*c*, etc.), active states 618*c*, and sleep states 616*c*, may be RRC defined. As illustrated the active states 618*c* and sleep states 616*c* of the sidelink communications are not aligned with the active states 618*a*/618*b* and sleep states 616*a*/616*b* of the first Uu DRX configuration 602 and the second Uu DRX configuration. The SL DRX configuration 606 may include a cycle-start offset 620*c* following expiration of an inactivity timer 610*c*.

Figure 7:
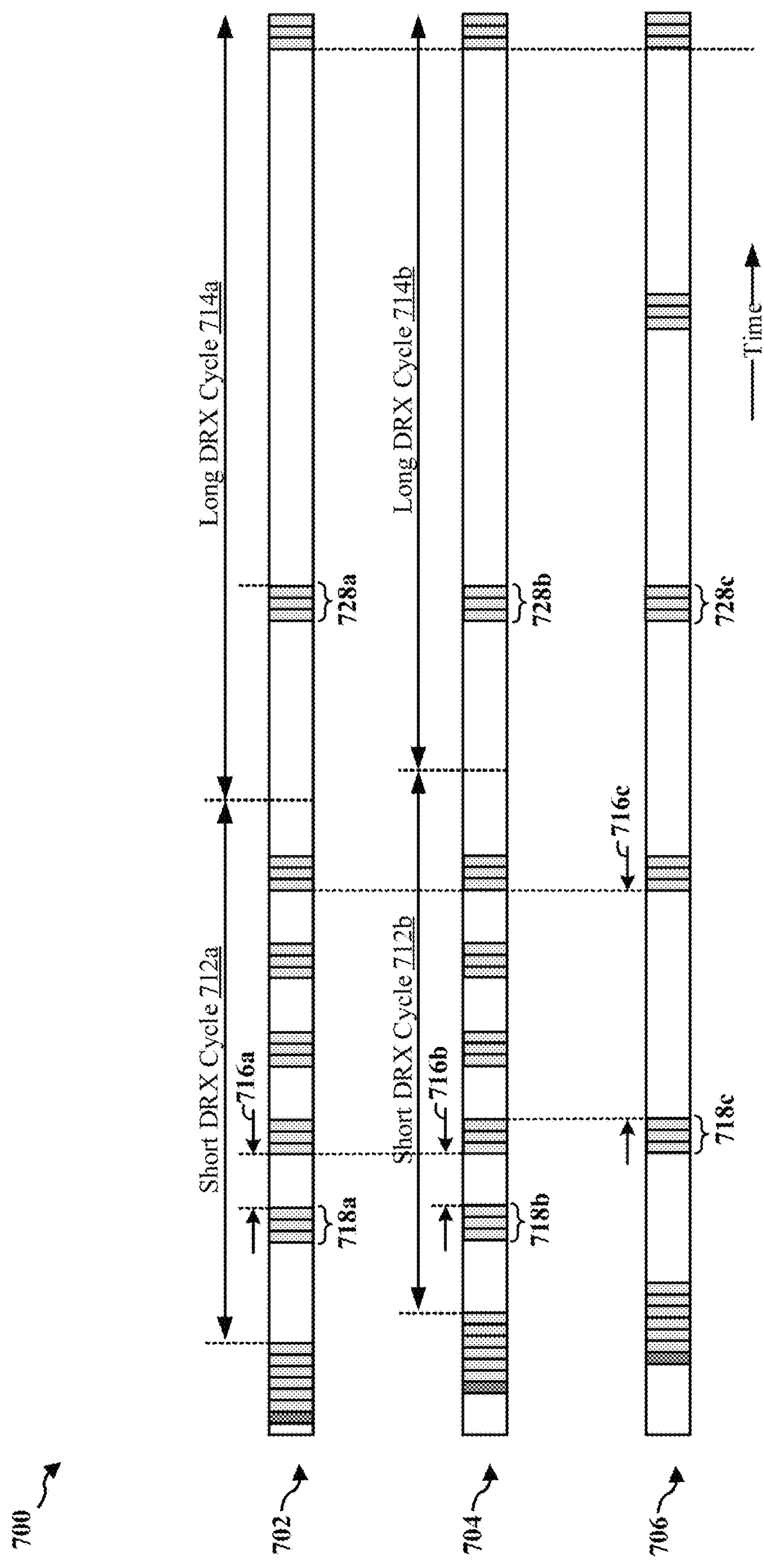
FIG. 7 is a diagram illustrating an example of Uu DRX and SL DRX configuration timing after alignment.

FIG. 7 is a diagram 700 illustrating an example of Uu DRX and SL DRX configuration timing after alignment. As shown in FIG. 7, diagram 700 includes a first timing for a first Uu DRX configuration 702 (e.g., a Uu DRX configuration of the first UE 520 of FIG. 5), a second Uu DRX configuration 704 (e.g., a Uu DRX configuration of the second UE 522 of FIG. 5), and a SL DRX configuration 706 (e.g., a SL DRX configuration of the second UE 522). More specifically, diagram 700 depicts the timing for the first Uu DRX configuration 702, the second Uu DRX configuration 704, and the SL DRX configuration 706 after they are time-aligned with each other. That is, durations of sleep states 716 and active states 718 are aligned in time between the first UE 520 and the second UE 522 in both a short DRX cycle 712*a*/712*b* and a long DRX cycle 714*a*/714*b* for both Uu and sidelink communications. In this example, the first UE 520 may operate as a Tx UE, and the second UE 522 may operate as an Rx UE.

As illustrated, within the short DRX cycle 712*a*, a first active state 718*a* of the first Uu DRX configuration 702 is time aligned with a second active state 718*b* of the second Uu DRX configuration 704, and a first sleep state 716*a* is time aligned with a second sleep state 716*b*. For example, the first active state 718*a* overlaps in time with the second active state 718*b*, and the first sleep state 716*a* overlaps in time with the second sleep state 716*b*. While a third sleep state 716*c* of the SL DRX configuration 706 may overlap in time with one or more active states in the Uu DRX configurations 702/704, it should be noted that the duration of the third sleep state 716*c* provides for alignment between active states of both Uu and sidelink communications. A third active state 718*c* in the SL DRX configuration 706 is also aligned in-time with the respective active states of the Uu DRX configurations 702/704. Within the long DRX cycle 714*a*, a fourth active state 728*a* of the first Uu DRX configuration 702 is aligned in-time with both of: a fifth active state 728*b* of the second Uu DRX configuration 704 and a sixth active state 728*c* in the SL DRX configuration 706.

Some types of wireless communication may utilize different types of alignment between Uu DRX and SL DRX configurations. For instance, there may be an alignment of Uu DRX and SL DRX configurations for the second UE 522. Also, there may be an alignment of the second UE’s 522 SL DRX configuration 706 with the first UE’s 520 Uu DRX configuration 702. In some instances, if both the first UE’s 520 Uu DRX configuration 702 and the second UE’s 522 Uu DRX configuration 704 are aligned with the second UE’s 522 SL DRX configuration 706 (as illustrated here), then all 3 of these DRX cycles may be aligned. By aligning all three configurations, the signaling may be optimized and a unified procedure may be present if the signaling covers all of these configurations.

As indicated herein, there may be different RRC states for DRX configuration alignments. For instance, the first UE 520 may be in an RRC connected state, an RRC inactive state, or an RRC idle state. Also, the second UE 522 may be in an RRC connected state. In some instances, DRX alignment scenarios may include both the first UE 520 and the second UE 522 in RRC connected mode. Also, DRX alignment scenarios may include the first UE 520 in RRC inactive/idle mode and the second UE 522 in RRC connected mode.

DRX alignment scenarios may also utilize different information elements, e.g., an RRC information element (IE). The individual contents of an information element may be referred to as a field. Also, a structural element containing single or multiple fields may be referred to as an information element. An RRC IE may be contained in RRC messages and utilized to convey information. One type of RRC IE is DRX-Config, which may define an entire DRX configuration and may be utilized in the Uu interface between a base station and a UE. Another type of RRC IE is sl-DRX-Config, which may define an entire SL DRX configuration and may be utilized in the PC5 interface (e.g., the interface between UE/vehicles and other devices).

As indicated herein, some types of wireless communication may utilize inefficient types of DRX alignment, such as certain types of alignment for Uu DRX and SL DRX configurations. For example, some RRC IEs (e.g., DRX-Config and sl-DRX-Config) may convey the entire Uu DRX or SL DRX configuration, which may be an inefficient type of DRX alignment. As such, it may be beneficial to more efficiently align a Uu DRX configuration and an SL DRX configuration. For instance, it may be beneficial to utilize certain types of RRC IEs to efficiently align the Uu DRX configuration or the SL DRX configuration. Additionally, it may be beneficial to utilize different types of signaling between base stations and UEs to facilitate the procedure for Uu DRX and SL DRX alignment.

Figure 8:
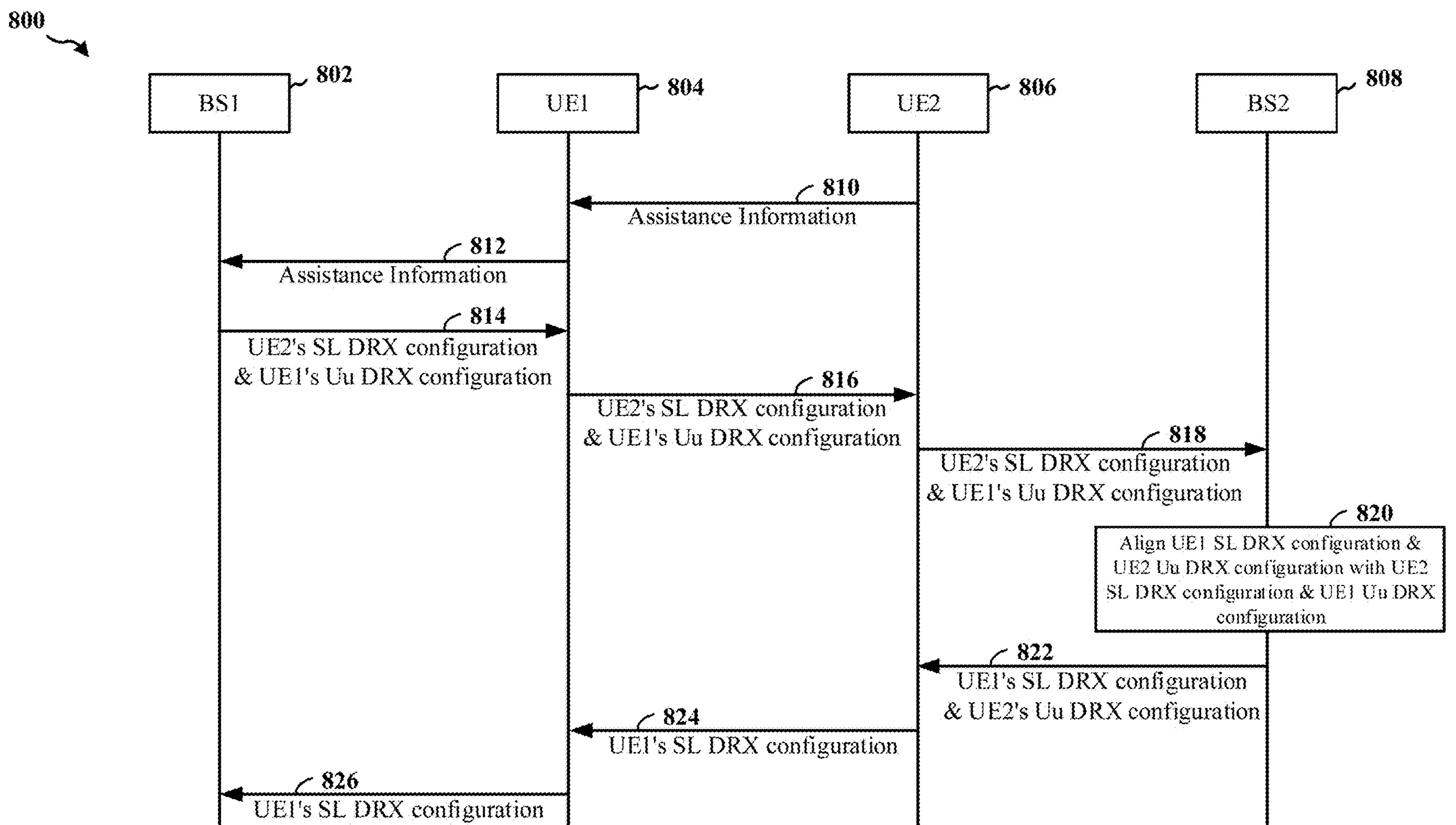
FIG. 8 is a diagram illustrating an example communication flow between base stations and UEs (e.g., a receiving (Rx) UE and a transmitting (Tx) UE).

FIG. 8 is a diagram 800 illustrating an example communication flow between base stations and UEs (e.g., an Rx UE and a Tx UE). As shown in FIG. 8, diagram 800 includes a first base station 802 (e.g., a BS 102/180 of FIG. 1), a first UE 804 (e.g., a UE 104 of FIG. 1 operating as a Tx UE), a second UE 806 (e.g., a UE 104 of FIG. 1 operating as an Rx UE), and a second base station 808 (e.g., a BS 102/180 of FIG. 1). More specifically, diagram 800 depicts an example communication flow between the first UE 804 and its corresponding base station (e.g., first base station 802) and the second UE 806 and its corresponding base station (e.g., second base station 808). As illustrated in FIG. 8, the base stations 802/808 and the UEs 804/806 may transmit different types of message between one another. For instance, base stations 802/808 and UEs 804/806 may transmit assistance information (e.g., an assistance information message/indication), an SL DRX configuration (e.g., SL DRX configuration message/indication), and/or a Uu DRX configuration (e.g., a Uu DRX configuration message/indication).

Initially, at a first step 810, the second UE 806 may transmit assistance information to the first UE 804. The assistance information may include an existing sidelink DRX configuration of other Tx UEs (not shown) with which the second UE 806 communicates, a current Uu DRX configuration of the second UE 806, and/or a preferred sidelink DRX configuration of the second UE 806. At a second step 812, the first UE 804 may transmit/report the assistance information to the first base station 802. After receiving the assistance information, base station 802 may determine or configure a sidelink DRX configuration and/or a Uu DRX configuration. For example, base station 802 may determine or configure an sidelink DRX configuration for the second UE 806 and/or a Uu DRX configuration for the first UE 804.

At a third step 814, after determining or configuring the sidelink DRX configuration for the second UE 806 and/or the Uu DRX configuration for the first UE 804, the first base station 802 may transmit the sidelink DRX configuration and/or the Uu DRX configuration to the first UE 804. The first UE 804 may implement the Uu DRX configuration provided by the first base station 802.

At a fourth step 816, the first UE 804 may transmit the sidelink DRX configuration and/or the Uu DRX configuration to the second UE 806. The second UE 806 may implement the sidelink DRX configuration provided by the first UE 804. At a fifth step 818, the second UE 806 may transmit the sidelink DRX configuration and/or the Uu DRX configuration to the second base station 808.

At a sixth step 820, the second base station 808 may adjust/configure a Uu DRX configuration for the second UE 806 and/or a sidelink DRX for the first UE 804 based on the information received at the fifth step 818. For example, the second base station 808 may adjust/configure a Uu DRX configuration for the second UE 806 and/or a sidelink DRX for the first UE 804 to achieve the alignment with the SL DRX configuration of the second UE 806 and the Uu DRX configuration of the first UE 804. At a seventh step 822, the second base station 808 may transmit, to the second UE 806, the adjusted/configured Uu DRX configuration for the second UE 806 and/or a sidelink DRX for the first UE 804. The second UE 806 may implement the Uu DRX configuration received from the second base station 808.

At an eighth step 824, the second UE 806 may transmit, to the first UE 804, the adjusted/configured sidelink DRX for the first UE 804. The first UE may implement the sidelink DRX. At a ninth step 826, the first UE 804 may transmit, to the first base station 802, the adjusted/configured sidelink DRX for the first UE 804.

As depicted in FIG. 8, the first base station 802 may determine/configure a sidelink DRX configuration for the second UE and/or a Uu DRX configuration for the first UE 804 based on assistance information. The assistance information may contain a variety of information including at least one of: the second UE's 806 Uu DRX configuration, a list of the second UE's 806 available Uu DRX configurations, existing sidelink DRX configurations from other Tx UEs, and/or a suitable sidelink DRX configuration from the second UE 806 or the second base station 808. Regarding the second UE's 806 Uu DRX configuration, the first base station 802 may select the sidelink DRX configuration that is aligned with the second UE's 806 Uu DRX configuration. For the list of the second UE's available Uu DRX configurations, the first base station 802 may align the Uu DRX configuration with one of the available Uu DRX configurations. Concerning the existing sidelink DRX configurations from other Tx UEs, the first base station 802 may select a sidelink DRX configuration that does not overlap with existing sidelink DRX configurations from other Tx UEs. For the suitable sidelink DRX configuration from the second UE 806 or the second base station 808, the second UE 806 may take into account its Uu DRX configuration when requesting the suitable sidelink DRX configuration.

In some aspects, the assistance information may include the Uu DRX configuration (e.g., the second UE's Uu DRX configuration) and may be transmitted via layer 3 (L3) signaling. For instance, an RRC message may contain the Uu DRX configuration. This message may contain the whole Uu DRX configuration, e.g., using RRC IE drx-Config. The message may also contain a subset of the Uu DRX configuration which is related to alignment, e.g., using RRC IE drx-Config-Alignment.

The Uu DRX configuration (e.g., the second UE's 806 Uu DRX configuration) may also be transmitted, by the second base station 808, via layer 1 (L1) or layer 2 (L2) signaling. For L2 signaling, a MAC-CE may convey the relevant Uu DRX configuration (e.g., drx-LongCycleStartOffset, drx-Short-Cycle, or drx-SlotOffset). In some instances, short DRX information may be included if it is configured for Uu as a short DRX cycle. The second base station 808 may also set a subset of values for the update, e.g., drx-Slot-Offset may have 32 values, such that the second base station may inform the UEs that the updated value in the MAC-CE is one of 8 values in a subset. Additionally, for L1/L2 signaling, the RRC message may configure a set of values for a relevant Uu DRX configuration (e.g., drx-LongCycleStartOffset, shortDRX, or drx-SlotOffset) and L1/L2 signaling may be used to point to one of these values. For example, this may be a pointer to a list to minimize the overhead.

In some aspects, the assistance information may include a list of available Uu DRX configurations for the second UE 806. For instance, instead of a single Uu DRX configuration in the assistance information, the assistance information may include a list of possible Uu DRX configurations, so that the first base station 802 may align with one of the Uu DRX configurations. Because the selected sidelink DRX configuration may align with one of the Uu DRX configurations provided by the second base station 808, the second base station 808 may be able to align the Uu DRX configuration with the selected sidelink DRX configuration. Also, the list of Uu DRX configurations may be sorted in order of suitability, e.g., a descending or ascending order of suitability.

The assistance information may include the list of available Uu DRX configurations for the second UE and may be transmitted via L3 signaling. For instance, an RRC message may contain the Uu DRX configuration candidates. This message may contain the whole Uu DRX configuration and candidates. The message may also contain the parameters related to alignment.

The list of available Uu DRX configurations for the second UE may also be transmitted via L1 or L2 signaling. For L2 signaling, a MAC-CE may convey the relevant Uu DRX configuration candidates (e.g., drx-LongCycleStart-Offset, drx-Short-Cycle, or drx-SlotOffset). In some instances, the short DRX information may be included if it is configured for Uu as a short DRX cycle. The base station may also set a subset of values for the update, e.g., drx-Slot-Offset may have 32 values, such that the base station may inform UEs that the updated value in the MAC-CE is one of 8 values in a subset. For L1/L2 signaling, the RRC message may configure a set of values for relevant Uu DRX configuration candidates (e.g., drx-LongCycleStartOffset, shortDRX, or drx-SlotOffset) and L1/L2 signaling may be used to point to one of these values. For example, this may be a pointer to a list to minimize the overhead.

Additionally, the assistance information may include existing sidelink DRX configurations from other Tx UEs. For instance, the second UE 806 may have sidelink connections with multiple Tx UEs, where each Tx UE may set a sidelink DRX configuration for the second UE 806. The first UE 804 may need to set a sidelink DRX configuration based on existing sidelink DRX configurations and the UE's capability. If the second UE 806 cannot monitor signaling/message from different Tx UEs simultaneously, the active times of each sidelink DRX configuration may not overlap (e.g., this may work on FR2 and/or a single panel). If the second UE 806 monitors the signaling/message from different Tx UEs simultaneously, the active times of different sidelink DRX configurations may overlap (e.g., this may work on FR1 or multiple panels). Also, the first base station 802 may select the sidelink DRX configuration that does not overlap with existing sidelink DRX configurations from other Tx UEs.

The assistance information may include the existing sidelink DRX configurations from other Tx UEs and may be transmitted via L3 signaling. For instance, an RRC message may contain the existing sidelink DRX configurations from other Tx UEs. This message may contain the whole sidelink DRX configuration and candidates. The message may also contain the parameters related to alignment.

The existing sidelink DRX configurations from other Tx UEs may also be transmitted via L1 or L2 signaling. For L2 signaling, a MAC-CE may convey the relevant sidelink DRX configurations (e.g., sl-drx-StartOffset, sl-drx-Cycle, or sl-drx-SlotOffset). The base stations 802/808 may also set a subset of values for the update, e.g., sl-drx-Slot-Offset may have 32 values, such that the base station may inform the UEs 804/806 that the updated value in the MAC-CE is one of 8 values in a subset. For L1/L2 signaling, the RRC message may configure a set of values for relevant sidelink DRX configurations (e.g., sl-drx-StartOffset, sl-drx-Cycle, or sl-drx-SlotOffset) and L1/L2 signaling may be used to point to one of these values. For example, this may be a pointer to a list to minimize the overhead.

Moreover, the assistance information may include a suitable sidelink DRX configuration from the second UE 806 or the second base station 808. For instance, the second base station 808 may provide a list of the suitable sidelink DRX configurations, which may be compatible with the second UE's 806 Uu DRX configuration. The suitable sidelink DRX configuration may be aligned with a current second UE's 806 Uu DRX configuration. Also, in some instances, the suitable sidelink DRX configuration may not be aligned with current the second UE's 806 Uu DRX, but it may be possible for the second base station 808 to align the second UE's Uu DRX configuration with the SL DRX configuration, as it may be provided by the second UE's base station.

The assistance information may include the suitable sidelink DRX configurations from the second UE 806 or the second base station 808 via L3 signaling. For instance, an RRC message may contain the list of suitable sidelink DRX configurations. This message may contain the whole sidelink DRX configuration and candidates. The message may also contain the parameters related to alignment. Also, the suitable sidelink DRX configurations from the second UE 806 or the second base station 808 may be transmitted via L1 or L2 signaling. For L2 signaling, a MAC-CE may convey the relevant sidelink DRX configurations (e.g., sl-drx-StartOffset, sl-drx-Cycle, or sl-drx-SlotOffset). For L1/L2 signaling, the RRC message may configure a set of values for relevant sidelink DRX configurations (e.g., sl-drx-StartOffset, sl-drx-Cycle, or sl-drx-SlotOffset) and L1/L2 signaling may be used to point to one of these values.

The sidelink DRX configuration message for the second UE 806 (or indication of the sidelink DRX configuration) may be transmitted from the first base station 802 to the first UE 804, transmitted from the first UE 804 to the second UE 806, or transmitted from the second UE 806 to the second base station 808. The first base station 802 may make decisions for the second UE's sidelink DRX configuration, and the first UE 804 may forward this sidelink DRX configuration to the second UE 806. The second UE 806 may then report its sidelink DRX configuration to its corresponding base station (e.g., the second base station 808). The sidelink DRX configuration message (or indication of the sidelink DRX configuration) may contain the sidelink DRX configuration for the second UE, including the sidelink DRX parameters related to the alignment between the sidelink DRX configuration and the Uu DRX configuration (e.g., sl-drx-StartOffset, sl-drx-Cycle, and/or sl-drx-SlotOffset).

The sidelink DRX configuration message (or indication of the sidelink DRX configuration) may be transmitted via L3 signaling. For instance, an RRC message may contain the sidelink DRX configuration. This message may contain the whole sidelink DRX configuration, e.g., using sidelink RRC IE sl-DRX-Config. The message may also contain a subset of sidelink DRX configuration which is related to alignment, e.g., using sidelink RRC IE sl-DRX-Config-Alignment.

The sidelink DRX configuration message (or indication of the sidelink DRX configuration) may also be transmitted via L1 or L2 signaling. For L2 signaling, a MAC-CE may convey the relevant sidelink DRX configurations (e.g., sl-drx-StartOffset, sl-drx-Cycle, or sl-drx-SlotOffset). The base station may also set a subset of values for the update, e.g., sl-drx-Slot-Offset may have 32 values, such that the base station may inform UEs that the updated value in the MAC-CE is one of 8 values in a subset. For L1/L2 signaling, the RRC message may configure a set of values for relevant sidelink DRX configurations (e.g., sl-drx-StartOffset, sl-drx-Cycle, or sl-drx-SlotOffset) and L1/L2 signaling may be used to point to one of these values. For example, this may be a pointer to a list to minimize the overhead.

The Uu DRX configuration message (or indication of the Uu DRX configuration) may be transmitted from the first base station 802 to the first UE 804 and/or transmitted from the second base station 808 to the second UE 806. The first UE 804 and the second UE 806 may receive their Uu DRX configuration from their corresponding base stations, respectively. The Uu DRX configuration message (or indication of the Uu DRX configuration) may contain the Uu DRX configuration for the UE, including the Uu DRX parameters related to the alignment between the sidelink DRX configuration and the Uu DRX configuration (e.g., drx-LongCycleStartOffset, shortDRX, drx-ShortCycle, drx-ShortCycleTimer, and/or drx-SlotOffset).

The Uu DRX configuration message (or indication of the Uu DRX configuration) may be transmitted via L3 signaling. For instance, an RRC message may contain the Uu DRX configuration. This message may contain the whole Uu DRX configuration, e.g., using RRC IE drx-Config. The message may also contain a subset of the Uu DRX configuration which is related to alignment, e.g., using RRC IE drx-Config-Alignment. Also, the Uu DRX configuration message (or indication of the Uu DRX configuration) may be transmitted via L1 or L2 signaling. For L2 signaling, a MAC-CE may convey the relevant Uu DRX configuration (e.g., drx-LongCycleStartOffset, drx-ShortCycle, and/or drx-SlotOffset). The short DRX information may be included if it is configured for Uu, as in some instances the short DRX cycle may not be included. For L1/L2 signaling, the RRC message may configure a set of values for relevant Uu DRX configurations (e.g., drx-LongCycleStartOffset, shortDRX, or drx-SlotOffset) and L1/L2 signaling may be used to point to one of these values.

In some aspects, L1/L2 signaling may be used after the initial DRX configuration setup based on L3 signaling. For instance, the UE may make a decision on changing the DRX configuration among RRC configured options and then notify the base station via L1/L2 signaling. Additionally, for the alignment of the first UE's 804 Uu DRX configuration and the second UE's 806 sidelink DRX configuration, an on-time duration (onDuration) of active times may be optimized. In some instances, the length of the second UE's 806 onDuration may be no less than the first UE's 804 Uu DRX onDuration. This may be performed to ensure that the sidelink grant scheduled for the first UE 804 during its Uu DRX active time falls into the sidelink DRX active time of the peer second UE 806. Also, the drx-onDurationTimer may be included in the drx-Config-Alignment and the sl-drx-onDurationTimer may be included in the sl-drx-Config-Alignment, so that the first UE 804 or the first base station 802 may adjust the sidelink DRX configuration and the second base station 808 may adjust the Uu DRX configuration.

Accordingly, as illustrated in FIG. 8, the first base station 802 aligns the sidelink DRX configuration of the second UE 806 and the Uu DRX configuration of the first UE 804. Then, the second base station 808 aligns the sidelink DRX configuration of the first UE 804 and the Uu DRX configuration of the second UE 806. However, such a method of DRX configuration alignment may have a relatively higher latency due to the sequential configuration steps (e.g., both base stations 802/808 are required to configure the UEs 804/806). That is, the seventh step 822, the eighth step 824, and the ninth step 826 are required in the illustrated communication flow to ensure that the first UE's 804 sidelink DRX configuration and Uu DRX configuration are aligned. Thus, if the seventh step 822, the eighth step 824, and the ninth step 826 can be omitted from the communication flow without preventing alignment of the first UE's 804 sidelink DRX configuration and Uu DRX configuration, signaling overhead and latency associated with the DRX configuration alignment may be reduced.

Thus, aspects of the present disclosure are directed to more efficiently aligning one or more DRX configurations (e.g., alignment of Uu DRX configurations with sidelink DRX configurations, alignment of sidelink DRX configurations with Uu DRX configurations, alignment of a Uu DRX configuration with another Uu DRX configuration, and/or alignment of a sidelink DRX configuration with another sidelink DRX configuration).

Examples of Efficient DRX Configuration Alignment—Negotiation in Advance

Figure 9:
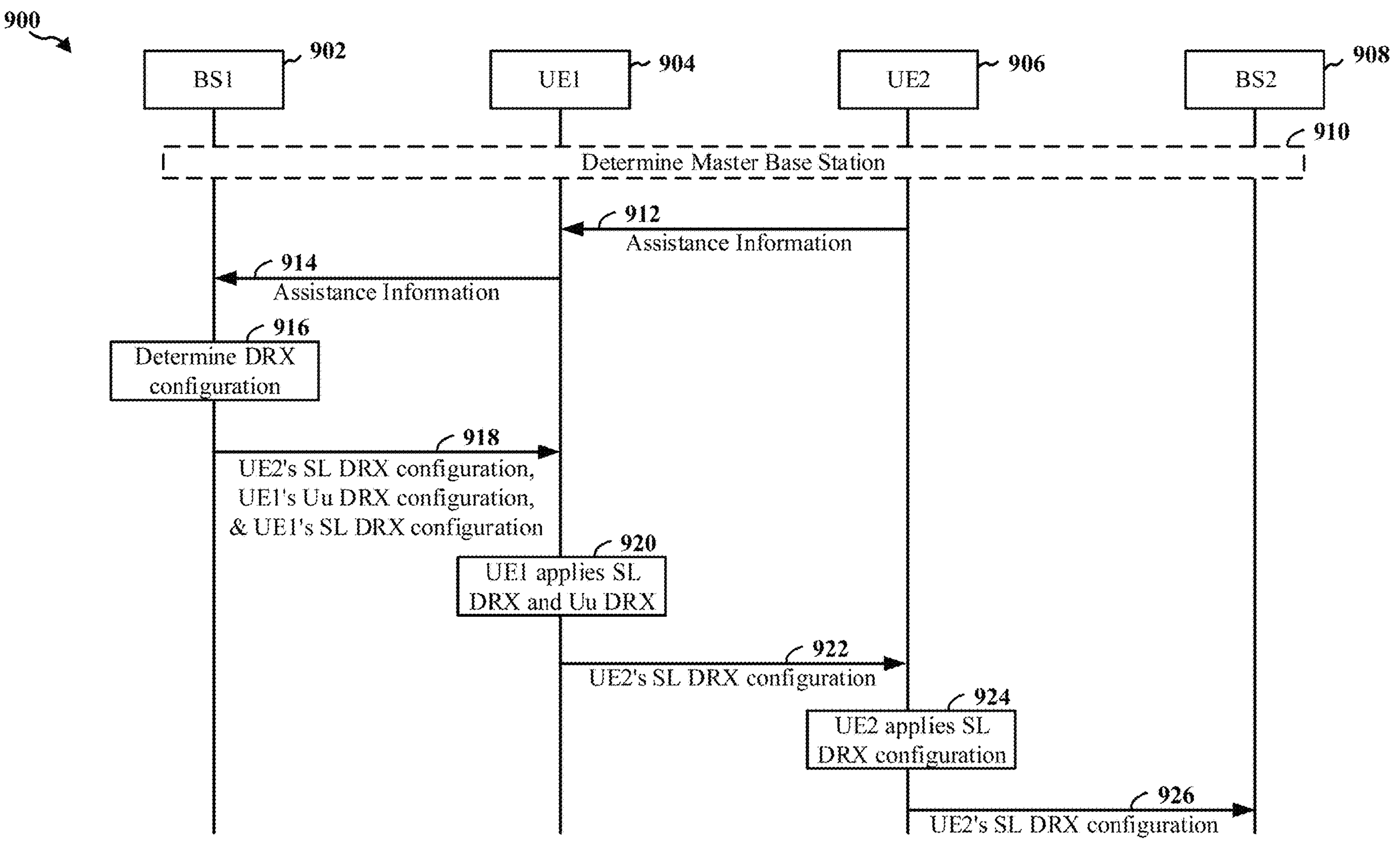
FIG. 9 is a call-flow diagram illustrating an example communication flow between a first base station, a first UE, a second UE, and a second base station for DRX alignment between the devices.

FIG. 9 is a call-flow diagram 900 illustrating an example communication flow between a first base station 902 (e.g., first BS 502 of FIG. 5), a first UE 904 (e.g., first UE 520 of FIG. 5), a second UE 906 (e.g., second UE 522 of FIG. 5), and a second base station 908 (e.g., second BS 504 of FIG. 5) for DRX alignment between the devices. Here, the first base station 902 and the first UE 904 may communicate over a first Uu interface, the first UE 904 and the second UE 906 may communicate over a sidelink interface, and the second UE 906 and the second base station 908 may communicate over another Uu interface. The first base station 902 and the second base station 908 may communicate directly via an Xn interface or may communicate indirectly via the first UE 904 and the second UE 906. In the illustrated example, the first UE 904 is a Tx UE, the second UE 906 is an Rx UE, and the first base station 902 is a master base station.

Initially, the first base station 902 and the second base station 908 may perform a first step 910 to determine which will operate as a master base station. In one example, the whichever base station transmits a coordination setup message will, by default, be determined to be the master base station by both the first base station 902 and the second base station 908. For example, if the first base station 902 transmits a coordination setup message first, then the first base station 902 and the second base station 908 will determine the first base station 902 to be the master base station. The coordination setup message may be an RRC message sent over an Xn interface. The message may include a UE-identifier for each of the first UE 904 and the second UE 906 so that the base station receiving the coordination setup message will know that the master base station is associated with the specific pair of UEs.

In a second example, the first UE 904 and the second UE 906 may exchange UE information between each other while establishing their sidelink connection. The UE information may include a UE-identifier (e.g., a Layer 2 ID), and/or a quality of service (QoS) requirement of the UE. The UEs 904/906 may then determine the master base station based on the UE information. In one example, the UEs 904/906 may determine which UE has the smallest UE-identifier (e.g., smallest in number of bits). In another example, the UEs 904/906 may determine which UE has the highest QoS requirement. Accordingly, the UEs 904/906 may determine that the master base station should be the base station to which the UE having the smallest (e.g., fewer digits and/or lowest value of digits relative to another UE) UE-identifier is connected, or the base station to which the UE having the highest QoS requirements is connected. For example, if the first UE 904 has the smallest UE-identifier and/or the highest QoS requirements, the first UE 904 may transmit a message, via the Uu interface to the first base station 902, indicating that the first base station 902 is the master base station. In some examples, the second UE 906 or the first base station 902 may notify the second base station 908 that the first base station 902 is the master.

In certain aspects, the mater base station may operate differently relative to the other base station(s). For example, if the first base station is the master base station, then the first base station may determine a Uu DRX alignment and a SL DRX alignment in a first direction (e.g., first UE 904 to second UE 906). Here, the master base station may determine that the first UE's 904 Uu DRX and the second UE's 906 SL DRX should be aligned with the second UE's 906 Uu DRX.

In certain aspects, the first step 910 of determining a master base station may be optional. For example, if the time alignment of the sidelink DRX configuration of the first UE 904 overlaps with time alignment of the Uu DRX configuration of the first UE 904 (e.g., an active state and/or sleep state of the sidelink DRX overlaps with an active state and/or sleep state of the Uu DRX), then the first step may not be performed. However, if there in a offset between the time alignment of the sidelink DRX configuration of the first UE 904 and the time alignment of the Uu DRX configuration of the first UE 904 (e.g., an active state and/or sleep state of the sidelink DRX overlaps with an active state and/or sleep state of the Uu DRX, but begins earlier or later than the Uu DRX), then the first step 910 may be performed. In some examples, during the first step 910, the first base station 902 and the second base station 908 may determine and preconfigure the offset between the time alignment of the sidelink DRX configuration of the first UE 904 and the time alignment of the Uu DRX configuration of the first UE 904.

In a second step 912, the second UE 906 may transmit assistance information to the first UE 904. The assistance information may include an existing sidelink DRX configuration of other Tx UEs (not shown) with which the second UE 906 communicates, a current Uu DRX configuration of the second UE 906, and/or a preferred sidelink DRX configuration of the second UE 906. At a third step 914, the first UE 904 may transmit the assistance information to the first base station 902 along with information regarding the sidelink DRX configuration of the first UE 904. For example, the first UE 904 may append the assistance information to a message that includes its own current sidelink DRX configuration.

At a fourth step 916, first base station 902 may determine or configure a sidelink DRX configuration and/or a Uu DRX configuration based on the information received in the third step 914. For example, base station 902 may determine or configure a sidelink DRX configuration for the first UE 904, a sidelink DRX configuration for the second UE 906, and a Uu DRX configuration for the first UE 904. At a fifth step 918, the first base station 902 may transmit the sidelink DRX configuration(s) and/or the Uu DRX configuration to the first UE 904. Upon receiving the transmission, at a sixth step 920, the first UE 904 may implement the sidelink DRX configuration and the Uu DRX configuration the first base station 902 determined for the first UE 904.

At a seventh step 922, the first UE 904 may transmit the sidelink DRX configuration for the second UE 906 to the second UE 906. It should be noted that the first UE 904 may not include the sidelink DRX configuration and the Uu DRX configuration for the first UE 904 in the transmission. This is because the second base station 908 no longer determines the sidelink DRX configuration for the first UE 904, and thus, the second base station 908 no longer needs either of the sidelink DRX configuration or the Uu DRX configuration for the first UE 904.

More specifically, the second UE 906 does not have to provide the second base station 908 with the sidelink DRX configuration or the Uu DRX configuration for the first UE 904 (e.g., in a ninth step 926) because both of the first base station 902 and the second base station 908 have already agreed (e.g., at the first step 910) that the first UE's 904 sidelink DRX configuration and the first UE's 904 Uu DRX configuration are either overlapping (e.g., substantially aligned, such that an active state of the sidelink DRX begins at substantially the same time as an active state of a Uu DRX) or are aligned according to a fixed offset (e.g., the active state of the sidelink DRX is offset in time by a fixed amount relative to the active state of the Uu DRX, offset determined at the first step 910).

For example, the first base station 902 and the second base station 908 may determine and preconfigure the offset between the time alignment of the sidelink DRX configuration of the first UE 904 and the time alignment of the Uu DRX configuration of the first UE 904 during the first step 910. As such, if no offset is configured, then the second base station 908 can assume that the first UE's 904 sidelink DRX overlaps the second UE's 906 sidelink DRX in time. However, if an offset is preconfigured, then the second base station 908 can apply the offset to the second UE's 906 sidelink DRX to determine the first UE's 904 sidelink DRX.

In either case (e.g., whether an offset is determined or no offset), the second base station 908 can also determine the first UE's 904 Uu DRX configuration in a similar manner. For example, if an offset is preconfigured, then the second base station 908 may determine the first UE's 904 Uu DRX configuration by applying the offset to the first UE's 904 sidelink DRX configuration. Alternatively, and the first UE's 904 Uu DRX configuration may be either a zero or a non-zero value. As such, the second base station 908 may derive the first UE's 904 sidelink DRX configuration from the first UE's 904 Uu DRX configuration and the offset value (or absence of the offset value), or the first UE's 904 Uu DRX configuration based on the first UE's 904 sidelink DRX configuration and the offset value (or absence of the offset value).

In certain aspects, the second base station 908 may derive the first UE's 904 sidelink DRX configuration based on the second UE's 906 sidelink DRX configuration. For example, at the fourth step 916, the first base station 902 may determine or configure the sidelink DRX configuration for the first UE 904 and the sidelink DRX configuration for the second UE 906, wherein the sidelink DRX configurations are equal to each other (e.g., the sidelink DRX configuration for the first UE 904 and the second UE 906 are time aligned).

At an eighth step 924, the second UE 906 may apply the sidelink DRX configuration received from the first UE 904. At a ninth step 926, the second UE 906 may forward the sidelink DRX configuration to the second base station 908.

Thus, by performing a DRX alignment as described in the foregoing, signaling overhead and latency can be reduced. For example, the second base station 908 is no longer required to perform the sixth step 820, the seventh step 822, the eighth step 824, or the ninth step 826 illustrated in FIG. 8.

Figure 10:
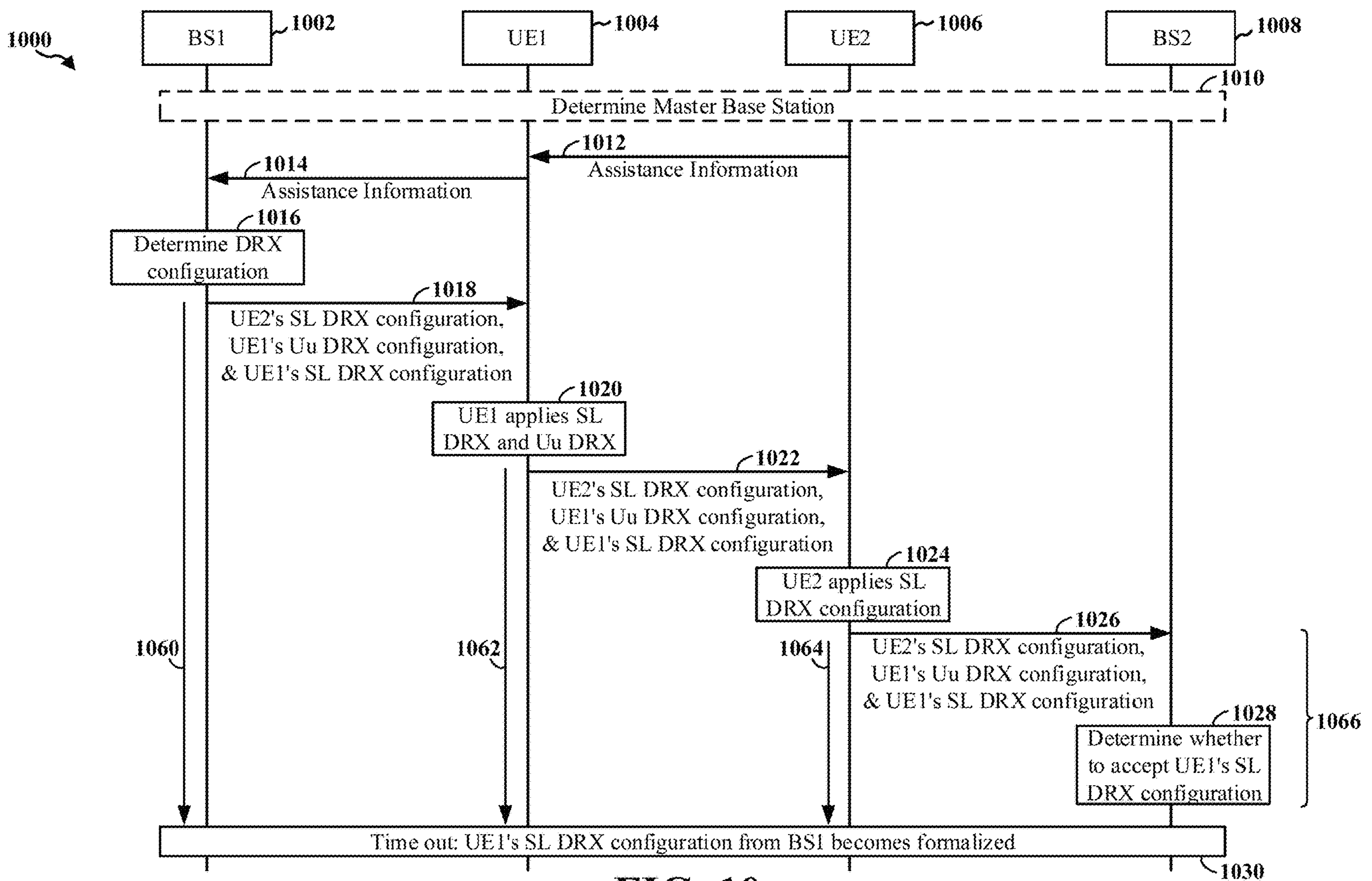
FIG. 10 is a call-flow diagram illustrating an example communication flow between a first base station, a first UE, a second UE, and a second base station for DRX alignment between the devices.

Examples of Efficient DRX Configuration Alignment—Negotiation During DRX Alignment FIG. 10 is a call-flow diagram 1000 illustrating an example communication flow between a first base station 1002 (e.g., first BS 502 of FIG. 5), a first UE 1004 (e.g., first UE 520 of FIG. 5), a second UE 1006 (e.g., second UE 522 of FIG. 5), and a second base station 1008 (e.g., second BS 504 of FIG. 5) for DRX alignment between the devices. Here, the first base station 1002 and the first UE 1004 may communicate over a first Uu interface, the first UE 1004 and the second UE 1006 may communicate over a sidelink interface, and the second UE 1006 and the second base station 1008 may communicate over another Uu interface. The first base station 1002 and the second base station 1008 may communicate directly via an Xn interface or may communicate indirectly via the first UE 1004 and the second UE 1006. In the illustrated example, the first UE 1004 is a Tx UE, the second UE 1006 is an Rx UE, and the first base station 1002 is a master base station.

Initially, the first base station 1002 and the second base station 1008 may perform a first step 1010 to determine which will operate as a master base station. The first step 1010 may be the same as the first step 910 described above in reference to FIG. 9. It should be noted however, that unlike the first step 910 in FIG. 9, the first step 1010 of FIG. 10 may omit a negotiation of a time-offset between the first UE's 1004 sidelink DRX configuration and the first UE's 1004 Uu DRX configuration. As such, an offset between the first UEs SL DRX and Uu DRX may not be known by both the first base station 1002 and the second base station 1008.

In a second step 1012, the second UE 1006 may transmit assistance information to the first UE 1004. The assistance information may include an existing sidelink DRX configuration of other Tx UEs (not shown) with which the second UE 1006 communicates, a current Uu DRX configuration of the second UE 1006, and/or a preferred sidelink DRX configuration of the second UE 1006. At a third step 1014, the first UE 1004 may transmit the assistance information to the first base station 1002 along with information regarding the current sidelink DRX configuration of the first UE 1004. For example, the first UE 1004 may append the assistance information received from the second UE 1006 to a message that includes its own current sidelink DRX configuration.

At a fourth step 1016, first base station 1002 may determine or configure a sidelink DRX configuration and/or a Uu DRX configuration based on the information received in the third step 1014. For example, first base station 1002 may determine or configure a sidelink DRX configuration for the first UE 1004, a sidelink DRX configuration for the second UE 1006, and a Uu DRX configuration for the first UE 1004. At a fifth step 1018, the first base station 1002 may transmit the sidelink DRX configuration(s) and/or the Uu DRX configuration to the first UE 1004. The first base station 1002 may also start a first timer 1060 configured to time-out at a future point in time.

At a sixth step 1020, the first UE 1004 may implement the sidelink DRX configuration and the Uu DRX configuration the first base station 1002 determined for the first UE 1004. That is, the first UE 1004 may configure it's sidelink and Uu link according to the DRX configurations. In certain aspects, the sidelink DRX configuration for the first UE 1004 may be a temporary sidelink DRX configuration because the second base station 1008 does not yet know either of the sidelink DRX configuration for the first UE 1004 or the Uu DRX configuration for the first UE 1004 that the first base station 1002 has determined. The first UE 1004 may also start a second timer 1062 configured to time-out at the future point in time. In some examples, the transmission at the fifth step 1018 may include timer information (e.g., a timer duration, an indication of the future point in time, etc.) and the timer set by the first UE 1004 may be set according to the timer information.

At a seventh step 1022, the first UE 1004 may transmit the sidelink DRX configuration for the first UE 1004, the sidelink DRX configuration for the second UE 1006, and the Uu DRX configuration for the first UE 1004 to the second UE 1006. At an eighth step 1024, the second UE 1006 may implement the sidelink DRX configuration that the first base station 1002 determined for the first UE 1004. That is, the second UE 1006 may configure it's sidelink according to the DRX configuration. The second UE 1006 may also start a third timer 1064 configured to time-out at the future point in time. In some examples, the transmission at the seventh step 1022 may include timer information (e.g., a timer duration, an indication of the future point in time, etc.) and the timer set by the second UE 1006 may be set according to the timer information.

In a following series of steps 1066, the second base station 1008 may receive, from the second UE 1006, the sidelink DRX configuration for the first UE 1004, the sidelink DRX configuration for the second UE 1006, and the Uu DRX configuration for the first UE 1004. Next as described in more detail below in the instant figure and FIG. 11, the second base station 1008 may determine whether to accept the sidelink DRX configuration for the first UE 1004 that was previously determined by the first base station 1002 at the fourth step 1016. Thus, the series of steps 1066 includes at least a ninth step 1026 and a tenth step 1028.

At the ninth step 1026, the second UE 1006 may transmit the sidelink DRX configuration for the first UE 1004, the sidelink DRX configuration for the second UE 1006, and the Uu DRX configuration for the first UE 1004 to the second base station 1008. At the tenth step 1028, the second base station 1008 may determine whether to accept the sidelink DRX configuration for the first UE 1004, or whether to deny the sidelink DRX configuration and determine a new sidelink DRX configuration for the first UE 1004. In this example, the second base station 1008 determines to accept the sidelink DRX configuration of the first UE 1004, and thus, the second base station 1008 does not transmit any signaling to the UEs 1004/1006 or the first base station 1002. Accordingly, once one or more of the first timer 1060, the second timer 1062, or the third timer 1064 times out, the sidelink DRX configuration that the first UE 1004 applied to its communications at the sixth step 1020 becomes formalized (e.g., is no longer temporary or subject to change prior to the time out) at an eleventh step 1030. That is, in certain aspects, the sidelink DRX configuration of the first UE 1004 may be changed by the second base station 1008 within the duration of the timers. Thus, if the second base station 1008 determines not to accept the sidelink DRX configuration of the first UE 1004, the second base station 1008 may indicate the non-acceptance in a transmission to prior to the end of the timers, as is described in more detail below.

Accordingly, because the first base station 1002, the first UE 1004, and the second UE 1006 did not receive a new sidelink DRX configuration generated by the second base station 1008 in response to the transmission of the ninth step 1026, no additional communications are necessary to complete the DRX configuration. As such, signaling overhead and latency can be reduced because the second base station 1008 is not required to perform the sixth step 820, the seventh step 822, the eighth step 824, or the ninth step 826 illustrated in FIG. 8.

In certain aspects, after determining, at the tenth step 1028, to accept the first UE's 1004 sidelink DRX configuration, the second base station 1008 may transmit an acknowledgement (ACK) to the first base station 1002 instead of not transmitting anything. In this example, the second base station 1008 may transmit an ACK message to the second UE 1006, and the second UE 1006 may forward to the ACK to the first UE 1004, and the first UE may forward the ACK to the first base station 1002. It should be noted that the ACK message is relatively smaller than the messaging performed in the sixth step 820, the seventh step 822, the eighth step 824, or the ninth step 826 illustrated in FIG. 8. Thus, with an ACK message, the singling overhead is reduced relative to FIG. 8.

Figure 11:
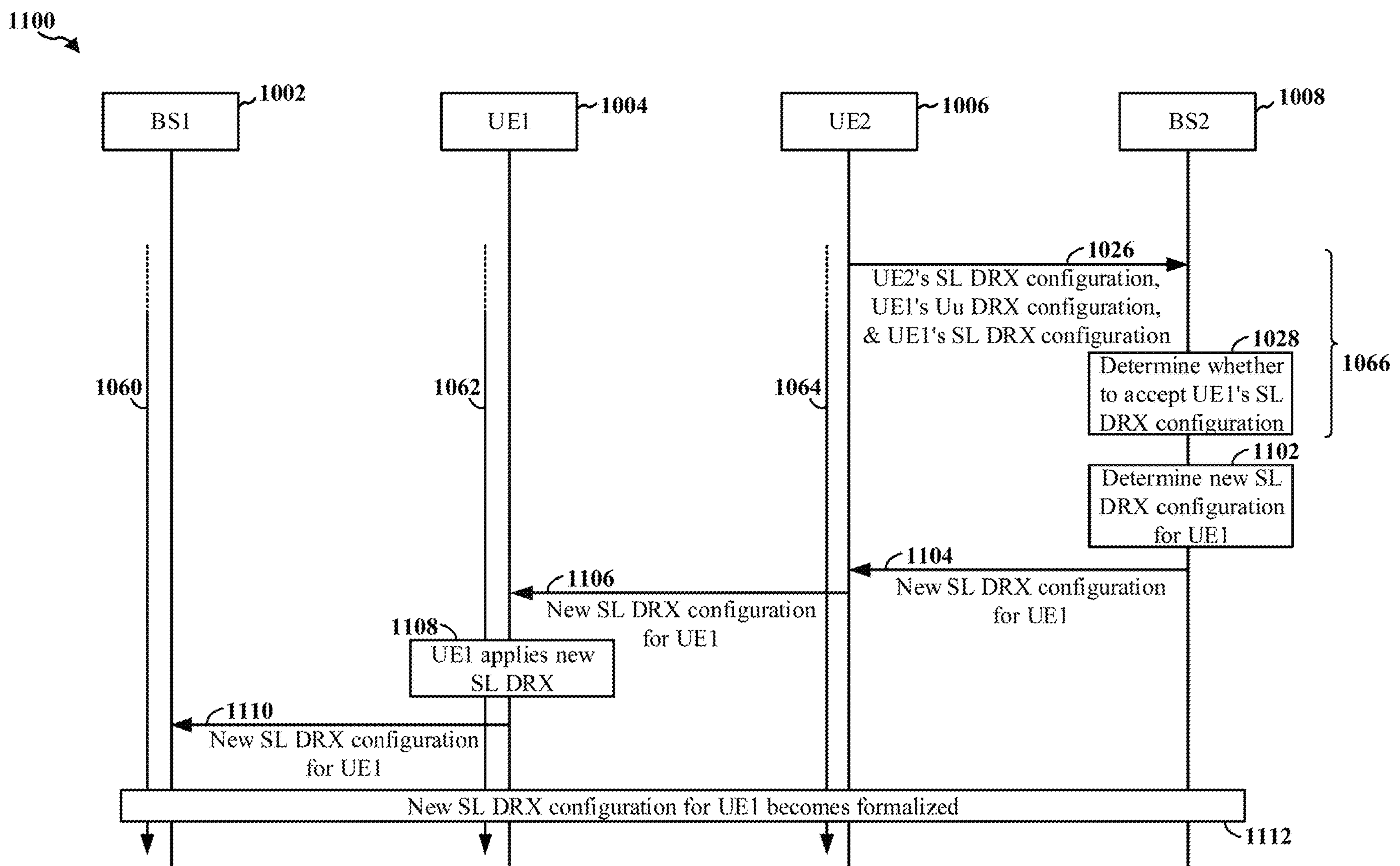
FIG. 11 is a call-flow diagram illustrating an example communication flow between the first base station), the first UE, the second UE, and the second base station of FIG. 10 for DRX alignment between the devices.

FIG. 11 is a call-flow diagram 1100 illustrating an example communication flow between the first base station 1002), the first UE 1004, the second UE 1006, and the second base station 1008 of FIG. 10 for DRX alignment between the devices. Here, the second base station 1008 does not accept the sidelink DRX configuration of the first UE 1004 as determined by the first base station 1002 (acceptance of the sidelink DRX configuration of the first UE 1004 is illustrated in FIG. 10). Thus, communications and steps from FIG. 10 leading up to the series of steps 1066 (e.g., 1010-1024) may be similar, and will be omitted.

In FIG. 11, the ninth step 1026 is illustrated, where the second UE 1006 may transmit the sidelink DRX configuration for the first UE 1004, the sidelink DRX configuration for the second UE 1006, and the Uu DRX configuration for the first UE 1004 to the second base station 1008. At the tenth step 1028, the second base station 1008 may determine whether to accept the sidelink DRX configuration for the first UE 1004, or whether to deny the sidelink DRX configuration and determine a new sidelink DRX configuration for the first UE 1004.

In this example, the second base station 1008 determines not to accept the sidelink DRX configuration of the first UE 1004. As such, the second base station 1008 proceeds to a twelfth step 1102 where it determines, based at least in part on the Uu DRX configuration of the first UE 1004, a new sidelink DRX configuration for the first UE 1004. At a thirteenth step 1104, the second base station 1008 may transmit the new sidelink DRX configuration to the second UE 1006, and in a fourteenth step 1106 the second UE 1006 may transmit the new sidelink DRX configuration to the first UE 1004.

At a fifteenth step 1108, the first UE 1004 may receive the new sidelink DRX configuration and apply it to its sidelink communications, thereby overwriting the previous sidelink DRX configuration of the sixth step 1020 of FIG. 10. At a sixteenth step 1110, the first UE 1004 may forward the new sidelink DRX configuration to the first base station 1002 so that the first UE's 1004 sidelink DRX configuration is consistent between the first UE 1004 and the first base station 1002. Upon receiving the new sidelink DRX configuration, the first base station 1002 may update its memory with the new configuration. In this example, because the first base station 1002, the first UE 1004, and the second UE 1006 all receive the new sidelink DRX configuration prior to the expiration of the timers 1060/1062/1064, the new sidelink DRX configuration becomes formalized 1112 and is used by the first UE 1004 for sidelink communications.

Accordingly, in the example of FIG. 11, latency and signal overhead are still reduced relative to the procedure illustrated in FIG. 8 because the new steps illustrated in FIG. 11 may only performed when the second base station 1008 does not accept the first UE's 1004 sidelink DRX configuration.

Figure 12:
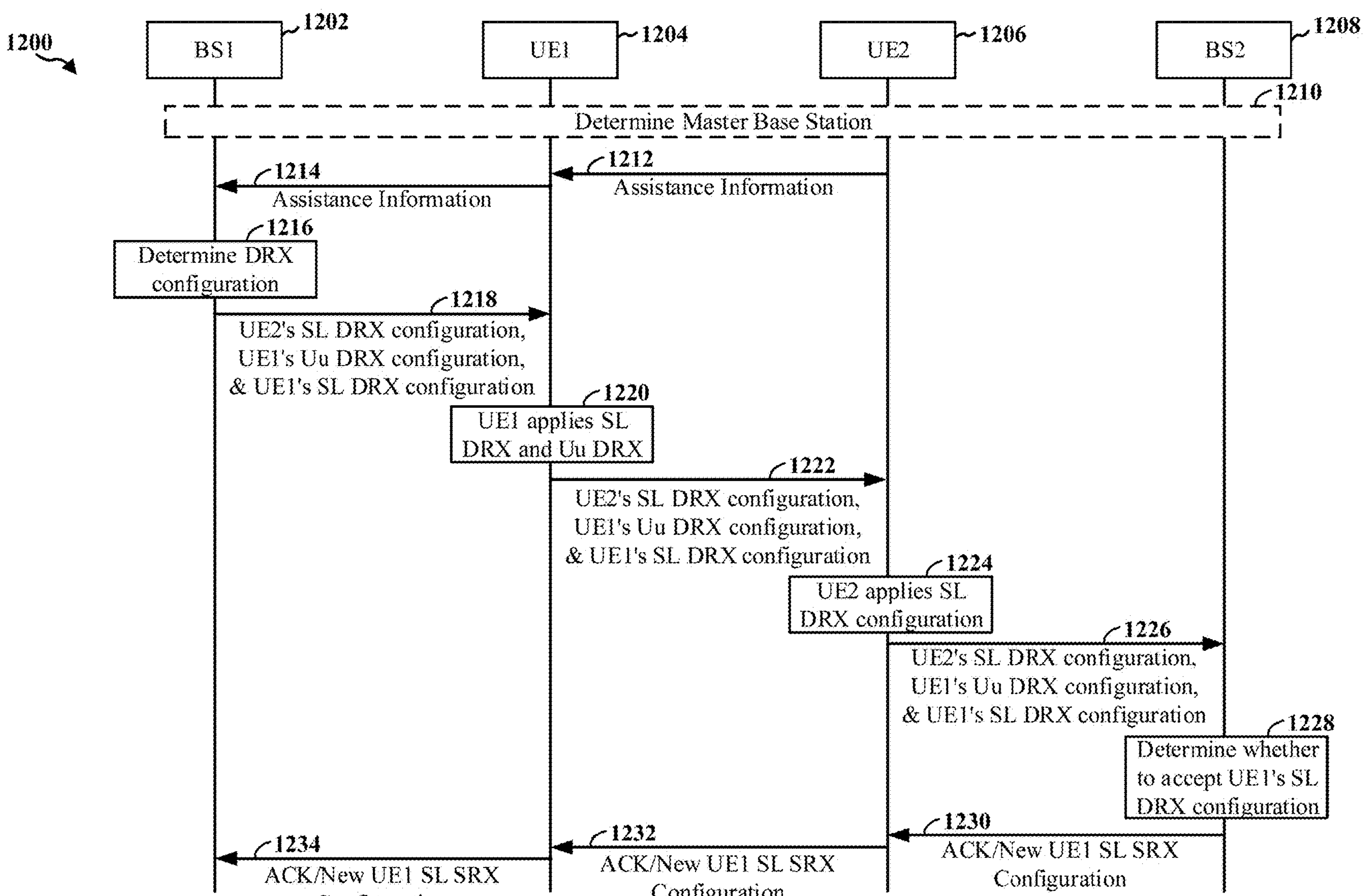
FIG. 12 is a call-flow diagram illustrating an example communication flow between a first base station, a first UE, a second UE, and a second base station for DRX alignment between the devices.

FIG. 12 is a call-flow diagram 1200 illustrating an example communication flow between a first base station 1202 (e.g., first BS 502 of FIG. 5), a first UE 1204 (e.g., first UE 520 of FIG. 5), a second UE 1206 (e.g., second UE 522 of FIG. 5), and a second base station 1208 (e.g., second BS 504 of FIG. 5) for DRX alignment between the devices. Here, the first base station 1202 and the first UE 1204 may communicate over a first Uu interface, the first UE 1204 and the second UE 1206 may communicate over a sidelink interface, and the second UE 1206 and the second base station 1208 may communicate over another Uu interface. The first base station 1202 and the second base station 1208 may communicate directly via an Xn interface or may communicate indirectly via the first UE 1204 and the second UE 1206. In the illustrated example, the first UE 1204 is a Tx UE, the second UE 1206 is an Rx UE, and the first base station 1202 is a master base station.

Initially, the first base station 1202 and the second base station 1208 may perform a first step 1210 to determine which will operate as a master base station. The first step 1210 may be the same as the first step 910 described above in reference to FIG. 9. It should be noted however, that unlike the first step 910 in FIG. 9, the first step 1210 of FIG. 12 may omit a negotiation of a time-offset between the first UE's 1204 sidelink DRX configuration and the first UE's 1204 Uu DRX configuration.

In a second step 1212, the second UE 1206 may transmit assistance information to the first UE 1204. The assistance information may include an existing sidelink DRX configuration of other Tx UEs (not shown) with which the second UE 1206 communicates, a current Uu DRX configuration of the second UE 1206, and/or a preferred sidelink DRX configuration of the second UE 1206. At a third step 1214, the first UE 1204 may transmit the assistance information to the first base station 1202 along with information regarding the current sidelink DRX configuration of the first UE 1204. For example, the first UE 1204 may append the assistance information received from the second UE 1206 to a message that includes its own current sidelink DRX configuration.

At a fourth step 1216, the first base station 1202 may determine or configure a sidelink DRX configuration and/or a Uu DRX configuration based on the information received in the third step 1214. For example, first base station 1202 may determine or configure a sidelink DRX configuration for the first UE 1204, a sidelink DRX configuration for the second UE 1206, and a Uu DRX configuration for the first UE 1204. At a fifth step 1218, the first base station 1202 may transmit the sidelink DRX configuration(s) and/or the Uu DRX configuration to the first UE 1204.

At a sixth step 1220, the first UE 1204 may implement the sidelink DRX configuration and the Uu DRX configuration the first base station 1202 determined for the first UE 1204. That is, the first UE 1204 may configure it's sidelink and Uu link according to the DRX configurations. In certain aspects, the sidelink DRX configuration for the first UE 1204 may be a temporary sidelink DRX configuration because the second BS 1208 does not yet know either of the sidelink DRX configuration for the first UE 1204 or the Uu DRX configuration for the first UE 1204 that the first base station 1202 has determined.

At a seventh step 1222, the first UE 1204 may transmit the sidelink DRX configuration for the first UE 1204, the sidelink DRX configuration for the second UE 1206, and the Uu DRX configuration for the first UE 1204 to the second UE 1206. At an eighth step 1224, the second UE 1206 may implement the sidelink DRX configuration that the first base station 1202 determined for the first UE 1204. That is, the second UE 1206 may configure it's sidelink according to the DRX configuration.

At a ninth step 1226, the second UE 1206 may transmit the sidelink DRX configuration for the first UE 1204, the sidelink DRX configuration for the second UE 1206, and the Uu DRX configuration for the first UE 1204 to the second base station 1208. At a tenth step 1228, the second base station 1208 may determine whether to accept the sidelink DRX configuration for the first UE 1204, or whether to deny the sidelink DRX configuration and determine a new sidelink DRX configuration for the first UE 1204.

For example, if the second base station 1208 determines to accept the sidelink DRX configuration, the second base station 1208 may transmit an acknowledgement (ACK) to the first base station 1202 (e.g., via an eleventh step 1230, a twelfth step 1232, and a thirteenth step 1234).

However, if the base station 1208 determines not to accept the sidelink DRX configuration, it may determine, at the tenth step 1228, a new sidelink DRX configuration for the first UE 1204. Then, instead of transmitting an ACK to the first base station 1202, the second base station 1208 may transmit the new sidelink DRX configuration to the second UE 1206 (e.g., in the eleventh step 1230), the second UE 1206 may transmit the configuration to the first UE 1204 (e.g., in the twelfth step 1232), and the first UE 1204 may transmit the configuration to the first base station 1202 (e.g., in thirteenth step 1234).

FIG. 13 is a flowchart 1300 of a method of wireless communication. The method may be performed by a base station configured as a master base station (e.g., a base station 102/180 of FIGS. 1 and 3; first base station 502/802/902/1002/1202 of FIGS. 5, 8, 9, 10, and 12; apparatus 1402 of FIG. 14) or a component of the base station. The methods described herein may provide a number of benefits, such as reducing signaling overhead, improving resource utilization, and/or power savings.

At a first step 1302, the base station may optionally transmit, to a second base station over an Xn interface, a radio resource control (RRC) message configured to at least one of: identify the first UE (e.g., Tx UE) and the second UE (e.g., Rx UE), and indicate that the first base station is operable as a master base station. For example, the first step 1302 may be performed by a transmitting component 1440 of FIG. 14. Here, the base station may transmit a coordination setup message via an RRC message sent over an Xn interface to another base station. In some examples, the base station that transmits the message is the master base station by virtue of sending the coordination setup message. The message may include an identifier of multiple UEs (e.g., a first UE and a second UE) so that the base station receiving the message knows the master base station is associated with a particular set (e.g., pair) of UEs. In some examples, the coordination setup message may be part of a first process 910/1010/1210 illustrated in FIGS. 9, 10, and 12.

At a second step 1304, the base station may optionally determine a time offset between the first SL DRX configuration and the first Uu DRX configuration, wherein determining the time offset occurs prior to configuring the first SL DRX configuration, the second SL DRX configuration, and the first Uu DRX configuration, and wherein configuring the first SL DRX configuration, the second SL DRX configuration, and the first Uu DRX configuration is based at least in part on the time offset. For example, the second step 1304 may be performed by a determining component 1442 of FIG. 14. Here, the master base station may determine an offset value indicative of a time-offset between a first UE's (e.g., Tx UE) SL DRX and Uu DRX. The offset value may be a zero or non-zero value, where the zero value indicates full alignment. The master base station may determine the offset value before configuring the first UE's SL DRX and Uu DRX. In some examples, the master base station and another base station may negotiate the offset value between the first UE's Uu DRX and SL DRX during the first process 910/1010/1210 illustrated in FIGS. 9, 10, and 12. Accordingly, both base stations know the offset value, and can use the offset value to derive the first UE's SL DRX or the Uu DRX from each other.

At a third step 1306, the base station may optionally transmit, via the first UE, an indication of the time offset to a second base station (e.g., a secondary base station). For example, the third step 1306 may be performed by the transmitting component 1440 of FIG. 14. Here, the first base station determines the SL DRX and Uu DRX for the first UE and sends them to the second base station via the first UE and second UE. In some examples, the master base station transmits the first UE's Uu DRX and SL DRX during the transmission 918/1018/1218 illustrated in FIGS. 9, 10, and 12.

At a fourth step 1308, the base station may receive, from a first user equipment (UE), an indication of discontinuous reception (DRX) assistance information. For example, the fourth step 1308 may be performed by a receiving component 1444 of FIG. 14. Here, the assistance information may include existing SL DRX configurations between the second UE and other UEs (e.g., other Tx UEs), a current Uu DRX configuration of the second UE (e.g., the Rx UE), a SL DRX configuration that the second UE has determined would be preferrable for sidelink communications between the second UE and the first UE. In some examples, the assistance information may be transmitted to one or more of the second base station and/or the second UE via the first UE, wherein the first UE may add its own existing SL DRX configuration information to the assistance information. For example, the first base station may receive the assistance information at transmission 914/1014/1214 of FIGS. 9, 10, and 12.

At a fifth step 1310, the base station may configure a first sidelink (SL) DRX configuration for the first UE, a second SL DRX configuration for a second UE, and a first UE-universal mobile telecommunications system terrestrial radio access (UTRA) interface (Uu) DRX configuration for the first UE, wherein at least one of the first SL DRX configuration, the second SL DRX configuration, and the first Uu DRX configuration are configured based on the DRX assistance information. For example, the fifth step 1310 may be performed by a configuring component 1446 of FIG. 14. Here, the base station may determine the SL DRX and Uu DRX configurations for the first UE, and the SL DRX configuration for the second UE based on one or more of the assistance information and the time offset. For example, the base station may determine the DRX configurations at process 916/1016/1216 of FIGS. 9, 10, and 12.

At a sixth step 1312, the base station may transmit, to the first UE, an indication of the first SL DRX configuration, the second SL DRX configuration, and the first Uu DRX configuration. For example, the sixth step 1312 may be performed by the transmitting component 1440 of FIG. 14. Here, the base station may transmit the DRX configurations to the first UE. For example, the base station may transmit the indication in transmission 918/1018/1218 of FIGS. 9, 10, and 12.

At a seventh step 1314, the base station may optionally start a timer configured to provide a window of time for a second base station to change the first SL DRX configuration. For example, the seventh step 1314 may be performed by a timer component 1448 of FIG. 14. In some examples, each of the base station, the first UE, and the second UE may set a timer. If they receive a new SL DRX configuration for the first UE from the second base station before timeout of the timer, then the SL DRX configuration from the first base station is overridden by the new SL DRX. Otherwise, the SL DRX configuration from the first base station becomes official (e.g., the SL DRX configuration from the first base station is no longer a temporary configuration). For example, the base station may start a timer at 1060 of FIG. 10.

At an eighth step 1316, the base station may optionally receive, from the first UE, an acknowledgement (ACK) message configured to indicate acceptance of the first SL DRX configuration by a second base station. For example, the eighth step 1316 may be performed by the receiving component 1444 of FIG. 14. Here, if the second base station accepts the first SL DRX (e.g., the SL DRX configuration provided by the first base station), then the second base station may transmit an ACK to signal that the first SL DRX is acceptable. For example, the base station may receive the ACK at step 1234 of FIG. 12.

At a ninth step 1318, the base station may optionally receive, from the first UE, an indication of a third SL DRX configuration to replace the first SL DRX configuration, wherein the indication of the third SL DRX is configured to indicate non-acceptance of the first SL DRX by the second base station. In certain aspects, the base station may receive, from the first UE and within the window of time, an indication of a third SL DRX configuration for the first UE to replace the first SL DRX configuration, wherein the third SL DRX configuration is configured by the second base station. For example, the ninth step 1318 may be performed by the receiving component 1444 of FIG. 14. Here, if the second base station does not accept the first SL DRX of the first UE, then the second base station may transmit a new SL DRX for the first UE to replace the first SL DRX. For example, the base station may receive the third SL DRX at step 1234 of FIG. 12.

In certain aspects, the DRX assistance information comprises at least one of: a first existing SL DRX configuration used for SL communications between a second UE and a third UE, a second existing SL DRX configuration used for SL communications between the first UE and the third UE, an existing Uu DRX configuration used for Uu communications between the second UE and a second base station, or a proposed SL DRX configuration, determined by the second UE, for SL communications between the first UE and the second UE.

In certain aspects, the first SL DRX configuration comprises at least one of: a first SL DRX cycle, a first SL DRX starting offset, or a first SL DRX slot offset; the second SL DRX configuration comprises at least one at least one of: a second SL DRX cycle, a second SL DRX starting offset, or a second SL DRX slot offset; and the first Uu DRX configuration comprises at least one at least one of: a first Uu DRX cycle, a first Uu DRX starting offset, or a first Uu DRX slot offset.

Figure 14:
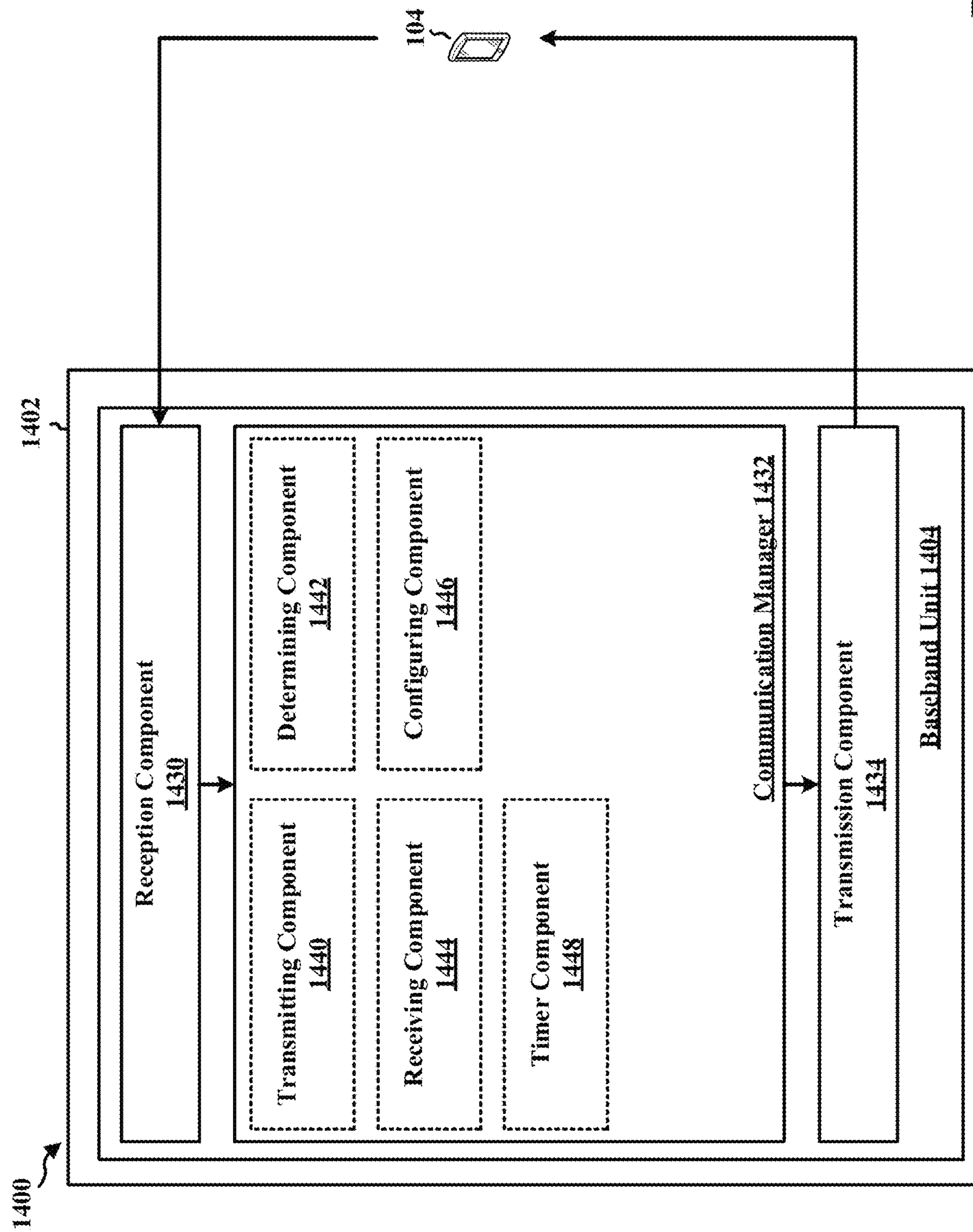
FIG. 14 is a diagram illustrating an example of a hardware implementation for an apparatus.

FIG. 14 is a diagram 1400 illustrating an example of a hardware implementation for an apparatus 1402. The apparatus 1402 is a BS and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the base station 102 and may include the memory 376 and/or at least one of the TX processor 316, the RX processor 370, and the controller/processor 375.

The communication manager 1432 includes a transmitting component 1440 configured to transmit, to the first UE, an indication of the first SL DRX configuration, the second SL DRX configuration, and the first Uu DRX configuration; transmit, via the first UE, an indication of the time offset to a second base station; transmit, to a second base station over an Xn interface, a radio resource control (RRC) message configured to at least one of: identify the first UE and the second UE, and indicate that the first base station is operable as a master base station; e.g., as described in connection with the first step 1302, the third step 1306, and the sixth step 1312 of FIG. 13.

The communication manager 1432 further includes a determining component 1442 configured to determine a time offset between the first SL DRX configuration and the first Uu DRX configuration, wherein determining the time offset occurs prior to configuring the first SL DRX configuration, the second SL DRX configuration, and the first Uu DRX configuration, and wherein configuring the first SL DRX configuration, the second SL DRX configuration, and the first Uu DRX configuration is based at least in part on the time offset; e.g., as described in connection with the second step 1304 of FIG. 13.

The communication manager 1432 further includes a receiving component 1444 configured to receive, from a first user equipment (UE), an indication of discontinuous reception (DRX) assistance information; receive, from the first UE and within the window of time, an indication of a third SL DRX configuration for the first UE to replace the first SL DRX configuration, wherein the third SL DRX configuration is configured by the second base station; receive, from the first UE, an acknowledgement (ACK) message configured to indicate acceptance of the first SL DRX configuration by a second base station; receive, from the first UE, an indication of a third SL DRX configuration to replace the first SL DRX configuration, wherein the indication of the third SL DRX is configured to indicate non-acceptance of the first SL DRX by the second base station; e.g., as described in connection with the fourth step 1308, the eighth step 1316, and the ninth step 1318 of FIG. 13.

The communication manager 1432 further includes a configuring component 1446 configured to configure a first sidelink (SL) DRX configuration for the first UE, a second SL DRX configuration for a second UE, and a first UE-universal mobile telecommunications system terrestrial radio access (UTRA) interface (Uu) DRX configuration for the first UE, wherein at least one of the first SL DRX configuration, the second SL DRX configuration, and the first Uu DRX configuration are configured based on the DRX assistance information; e.g., as described in connection with the fifth step 1310 of FIG. 13.

The communication manager 1432 further includes a timer component 1448 configured to start a timer upon transmission of the indication of the first SL DRX configuration, the second SL DRX configuration, and the first Uu DRX configuration, the timer configured to provide a window of time for a second base station to change the first SL DRX configuration; e.g., as described in connection with the seventh step 1314 of FIG. 13.

The apparatus may include additional components that perform each of the blocks of the algorithm in the aforementioned flowchart of FIG. 13. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for receiving, from a first user equipment (UE), an indication of discontinuous reception (DRX) assistance information; means for configuring a first sidelink (SL) DRX configuration for the first UE, a second SL DRX configuration for a second UE, and a first UE-universal mobile telecommunications system terrestrial radio access (UTRA) interface (Uu) DRX configuration for the first UE, wherein at least one of the first SL DRX configuration, the second SL DRX configuration, and the first Uu DRX configuration are configured based on the DRX assistance information; means for transmitting, to the first UE, an indication of the first SL DRX configuration, the second SL DRX configuration, and the first Uu DRX configuration; means for determine a time offset between the first SL DRX configuration and the first Uu DRX configuration, wherein determining the time offset occurs prior to configuring the first SL DRX configuration, the second SL DRX configuration, and the first Uu DRX configuration, and wherein configuring the first SL DRX configuration, the second SL DRX configuration, and the first Uu DRX configuration is based at least in part on the time offset; means for transmitting, via the first UE, an indication of the time offset to a second base station; means for starting a timer upon transmission of the indication of the first SL DRX configuration, the second SL DRX configuration, and the first Uu DRX configuration, the timer configured to provide a window of time for a second base station to change the first SL DRX configuration; means for receiving, from the first UE and within the window of time, an indication of a third SL DRX configuration for the first UE to replace the first SL DRX configuration, wherein the third SL DRX configuration is configured by the second base station; means for receiving, from the first UE, an acknowledgement (ACK) message configured to indicate acceptance of the first SL DRX configuration by a second base station; means for receiving, from the first UE, an indication of a third SL DRX configuration to replace the first SL DRX configuration, wherein the indication of the third SL DRX is configured to indicate non-acceptance of the first SL DRX by the second base station; and means for transmit, to a second base station over an Xn interface, a radio resource control (RRC) message configured to at least one of: identify the first UE and the second UE, and indicate that the first base station is operable as a master base station.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 15:
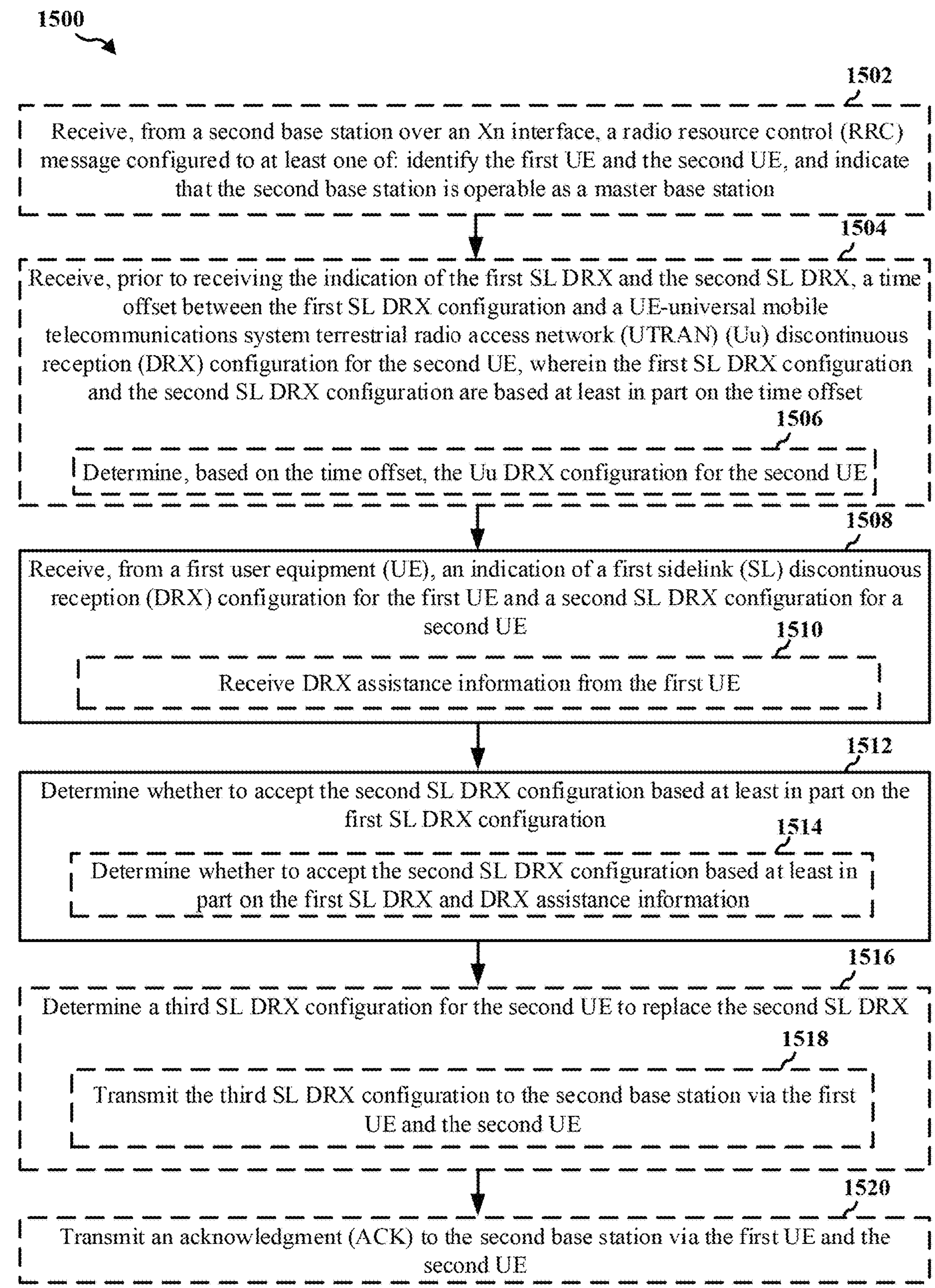
FIG. 15 is a flowchart of a method of wireless communication.

FIG. 15 is a flowchart 1500 of a method of wireless communication. The method may be performed by a base station configured as a secondary base station (e.g., a base station 102/180 of FIGS. 1 and 3; second base station 504/808/908/1008/1208 of FIGS. 5, 8, 9, 10, and 12; apparatus 1602) or a component of the base station. The methods described herein may provide a number of benefits, such as reducing signaling overhead, improving resource utilization, and/or power savings.

At a first step 1502, the base station may optionally receive, from a second base station over an Xn interface, a radio resource control (RRC) message configured to at least one of: identify the first UE and the second UE, and indicate that the second base station is operable as a master base station. For example, the first step 1502 may be performed by a receiving component 1640 of FIG. 16. Here, the base station may receive a coordination setup message via an RRC message sent over an Xn interface from another base station (e.g., a master base station). In some examples, the base station that transmits the message is the master base station by virtue of sending the coordination setup message. The message may include an identifier of multiple UEs (e.g., a first UE and a second UE) so that the base station receiving the message knows the master base station is associated with a particular set (e.g., pair) of UEs. In some examples, the coordination setup message may be part of a first process 910/1010/1210 illustrated in FIGS. 9, 10, and 12.

At a second step 1504, the base station may optionally receive, prior to receiving the indication of the first SL DRX and the second SL DRX, a time offset between the first SL DRX configuration and a UE-universal mobile telecommunications system terrestrial radio access network (UTRAN) (Uu) discontinuous reception (DRX) configuration for the second UE, wherein the first SL DRX configuration and the second SL DRX configuration are based at least in part on the time offset. For example, the second step 1504 may be performed by the receiving component 1640 of FIG. 16. Here, the master base station may determine an offset value indicative of a time-offset between a first UE's (e.g., Tx UE) SL DRX and Uu DRX. The offset value may be a zero or non-zero value, where the zero value indicates full alignment. The master base station may determine the offset value before configuring the first UE's SL DRX and Uu DRX. The master base station may then send the offset to the secondary base station. In some examples, the master base station and the secondary base station may negotiate the offset value between the first UE's Uu DRX and SL DRX during the first process 910/1010/1210 illustrated in FIGS. 9, 10, and 12. Accordingly, both base stations know the offset value, and can use the offset value to derive the first UE's SL DRX or the Uu DRX from each other.

At a third step 1506, the base station may optionally determine, based on the time offset, the Uu DRX configuration for the second UE. For example, the third step 1506 may be performed by a determining component 1642 of FIG. 16. Here, because the secondary base station knows the offset value determined by the master base station, the secondary base station may derive either of the first UE's SL DRX or Uu DRX from the other.

At a fourth step 1508, the base station may receive, from a first user equipment (UE), an indication of a first sidelink (SL) discontinuous reception (DRX) configuration for the first UE and a second SL DRX configuration for a second UE. For example, the fourth step 1508 may be performed by a receiving component 1640 of FIG. 16. Here, the secondary UE may receive DRX configurations generated and transmitted by the master base station. For example, the secondary base station may receive the DRX configurations at transmission 926/1026/1226 of FIGS. 9, 10, and 12.

At a fifth step 1510, the base station may optionally receive DRX assistance information from the first UE. For example, the fifth step 1510 may be performed by the receiving component 1640 of FIG. 16. Here, the secondary base station may receive, along with the DRX configurations, assistance information. For example, the secondary base station may receive the assistance information at transmission 926/1026/1226 of FIGS. 9, 10, and 12.

At a sixth step 1512, the base station may determine whether to accept the second SL DRX configuration based at least in part on the first SL DRX configuration. For example, the sixth step 1512 may be performed by the determining component 1642 of FIG. 16. Here, the secondary base station may determine whether to accept the SL DRX of the first UE as configured by the master base station. For example, the base station may determine whether to accept in process 1028/1228 of FIGS. 10-12.

At a seventh step 1514, the base station may optionally determine whether to accept the second SL DRX configuration based at least in part on the first SL DRX and DRX assistance information. For example, the seventh step 1514 may be performed by the determining component 1642 of FIG. 16. In some examples, the secondary base station may determine whether to accept the SL DRX of the first UE (Tx UE) as configured by the master base station based on both of SL DRX configuration of the first UE and the assistance information. For example, the base station may start a timer at 1060 of FIG. 10.

At an eighth step 1516, the base station may optionally determine a third SL DRX configuration for the second UE to replace the second SL DRX. For example, the eighth step 1516 may be performed by the determining component 1642 of FIG. 16. Here, if the secondary base station does not accept the first SL DRX (e.g., the SL DRX configuration for the Tx UE provided by the first base station), then the secondary base station may determine a new SL DRX for the Tx UE that is acceptable for the secondary base station. For example, the secondary base station may a new SL DRX at process 1102/1228 of FIGS. 11 and 12.

At a ninth step 1518, the base station may optionally transmit the third SL DRX configuration to the second base station via the first UE and the second UE. For example, the ninth step 1518 may be performed by a transmitting component 1644 of FIG. 16. Here, if the secondary base station does not accept the first SL DRX of the first UE, then the secondary base station may transmit a new SL DRX for the first UE to replace the first SL DRX. For example, the base station may transmit the third SL DRX at communications 1104/1106/1110 of FIG. 11, and communications 1230/1232/1234 of FIG. 12.

At a tenth step, the base station may optionally transmit an acknowledgment (ACK) to the second base station via the first UE and the second UE. For example, the tenth step 1520 may be performed by the transmitting component 1644 of FIG. 16. Here, if the secondary base station accepts the first SL DRX of the first UE, then the secondary base station may transmit an ACK to the master base station to indication acceptance. For example, the base station may transmit the ACK at communications 1230/1232/1234 of FIG. 12.

In certain aspects, the DRX assistance information comprises at least one of: a first existing SL DRX configuration used for SL communications between a second UE and a third UE, a second existing SL DRX configuration used for SL communications between the first UE and the third UE, an existing Uu DRX configuration used for Uu communications between the second UE and a second base station, or a proposed SL DRX configuration, determined by the second UE, for SL communications between the first UE and the second UE.

In certain aspects, the DRX assistance information comprises at least one of: a first existing SL DRX configuration used for SL communications between the first UE and a third UE, a second existing SL DRX configuration used for SL communications between the second UE and the third UE, an existing Uu DRX configuration used for Uu communications between the second UE and the second base station, or a proposed SL DRX configuration, determined by the first UE, for SL communications between the first UE and the second UE.

Figure 16:
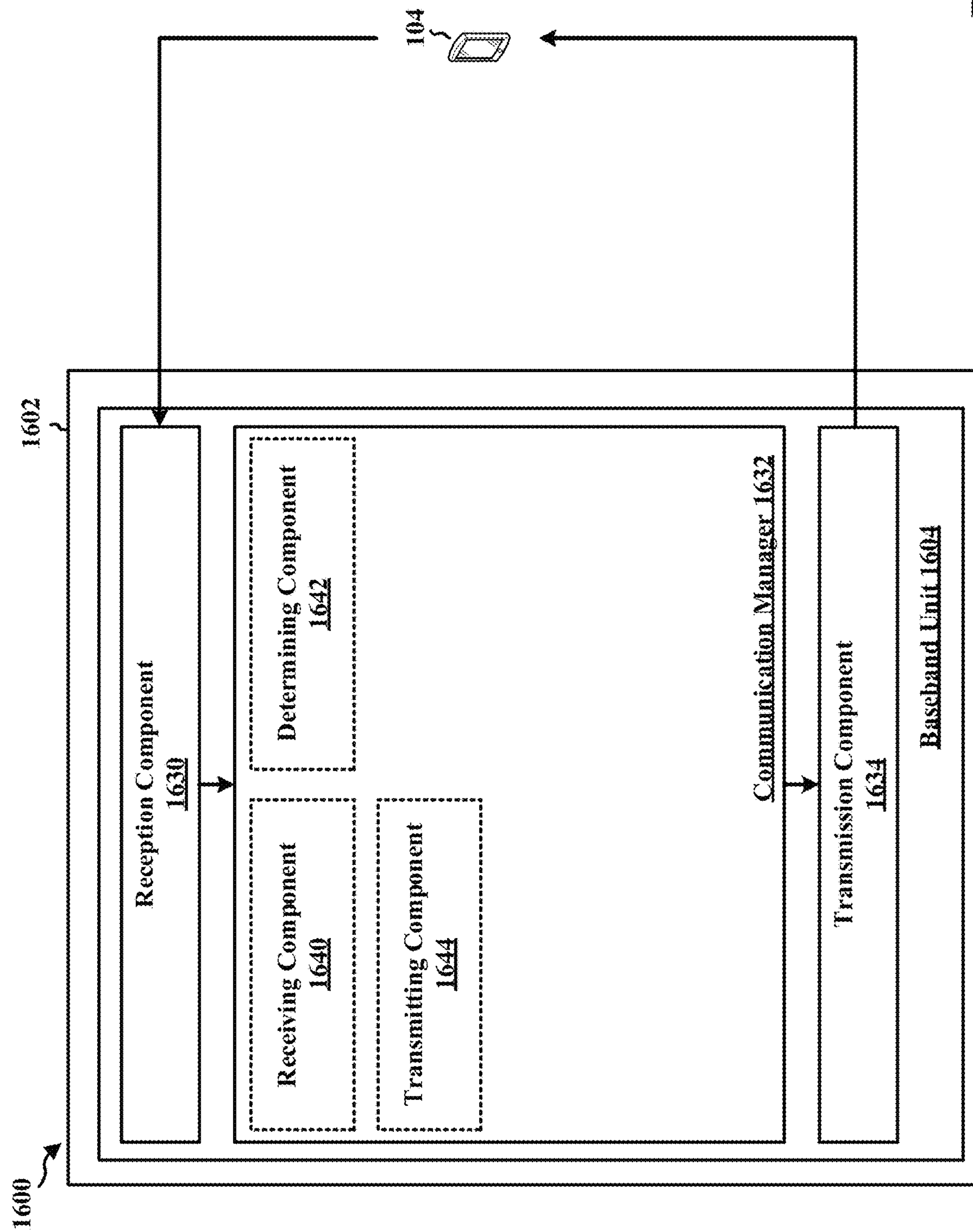
FIG. 16 is a diagram illustrating an example of a hardware implementation for an example apparatus.

FIG. 16 is a diagram 1600 illustrating an example of a hardware implementation for an apparatus 1602. The apparatus 1602 is a BS and includes a baseband unit 1604. The baseband unit 1604 may communicate through a cellular RF transceiver with the UE 104. The baseband unit 1604 may include a computer-readable medium/memory. The baseband unit 1604 is responsible for general processing, including the execution of software stored on the computer-readable medium/memory. The software, when executed by the baseband unit 1604, causes the baseband unit 1604 to perform the various functions described supra. The computer-readable medium/memory may also be used for storing data that is manipulated by the baseband unit 1604 when executing software. The baseband unit 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the baseband unit 1604. The baseband unit 1604 may be a component of the base station 102 and may include the memory 376 and/or at least one of the TX processor 316, the RX processor 370, and the controller/processor 375.

The communication manager 1632 includes a receiving component 1640 configured to receive, from a second base station over an Xn interface, a radio resource control (RRC) message configured to at least one of: identify the first UE and the second UE, and indicate that the second base station is operable as a master base station; receive, prior to receiving the indication of the first SL DRX and the second SL DRX, a time offset between the first SL DRX configuration and a UE-universal mobile telecommunications system terrestrial radio access network (UTRAN) (Uu) discontinuous reception (DRX) configuration for the second UE, wherein the first SL DRX configuration and the second SL DRX configuration are based at least in part on the time offset; receive, from a first user equipment (UE), an indication of a first sidelink (SL) discontinuous reception (DRX) configuration for the first UE and a second SL DRX configuration for a second UE; receive DRX assistance information from the first UE; e.g., as described in connection with the first step 1502, the second step 1504, the fourth step 1508, and the fifth step 1510 of FIG. 15.

The communication manager 1632 further includes a determining component 1642 configured to determine, based on the time offset, the Uu DRX configuration for the second UE; determine whether to accept the second SL DRX configuration based at least in part on the first SL DRX configuration; determine whether to accept the second SL DRX configuration based at least in part on the first SL DRX and DRX assistance information; determine a third SL DRX configuration for the second UE to replace the second SL DRX; e.g., as described in connection with the third step 1506, the sixth step 1512, the seventh step 1514, and the eighth step 1516 of FIG. 15.

The communication manager 1632 further includes a transmitting component 1644 configured to transmit the third SL DRX configuration to the second base station via the first UE and the second UE; and Transmit an acknowledgment (ACK) to the second base station via the first UE and the second UE; e.g., as described in connection with the ninth step 1518, and the tenth step 1520 of FIG. 15.

The apparatus may include additional components that perform each of the blocks of the algorithm in the aforementioned flowchart of FIG. 13. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the baseband unit 1604, includes means for receiving, from a second base station over an Xn interface, a radio resource control (RRC) message configured to at least one of: identify the first UE and the second UE, and indicate that the second base station is operable as a master base station; means for receiving, prior to receiving the indication of the first SL DRX and the second SL DRX, a time offset between the first SL DRX configuration and a UE-universal mobile telecommunications system terrestrial radio access network (UTRAN) (Uu) discontinuous reception (DRX) configuration for the second UE, wherein the first SL DRX configuration and the second SL DRX configuration are based at least in part on the time offset; means for receiving, from a first user equipment (UE), an indication of a first sidelink (SL) discontinuous reception (DRX) configuration for the first UE and a second SL DRX configuration for a second UE; means for receiving DRX assistance information from the first UE; means for determining, based on the time offset, the Uu DRX configuration for the second UE; means for determining whether to accept the second SL DRX configuration based at least in part on the first SL DRX configuration; means for determining whether to accept the second SL DRX configuration based at least in part on the first SL DRX and DRX assistance information; means for determining a third SL DRX configuration for the second UE to replace the second SL DRX; means for transmitting the third SL DRX configuration to the second base station via the first UE and the second UE; means for transmitting an acknowledgment (ACK) to the second base station via the first UE and the second UE.

The aforementioned means may be one or more of the aforementioned components of the apparatus 1602 configured to perform the functions recited by the aforementioned means. As described supra, the apparatus 1602 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 17:
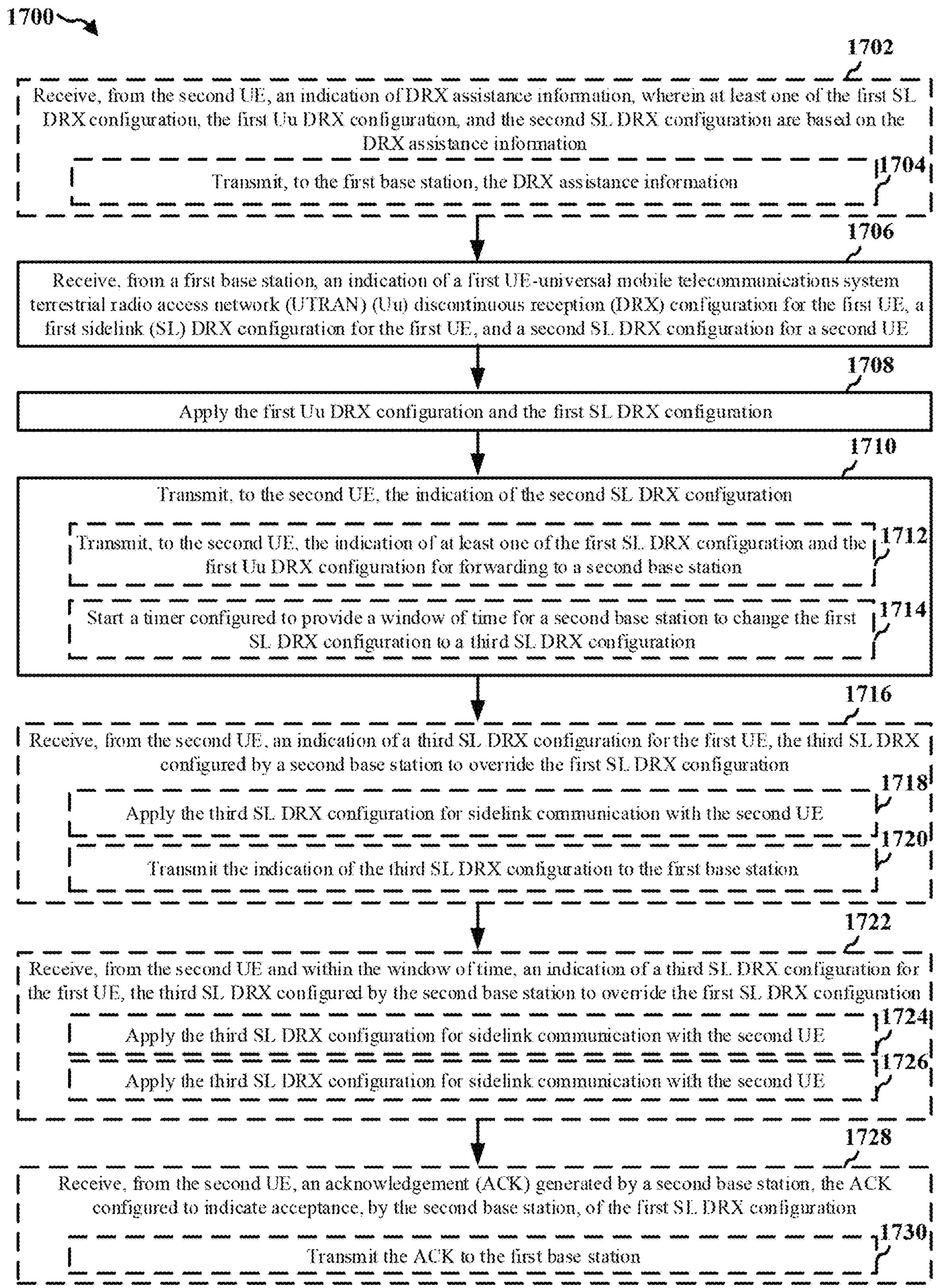
FIG. 17 is a flowchart of a method of wireless communication.

FIG. 17 is a flowchart 1700 of a method of wireless communication. The method may be performed by a UE configured as a Tx UE (e.g., UE 104 of FIGS. 1 and 3; first UE 520/804/904/1004/1204; apparatus 1802) or a component of a UE. The methods described herein may provide a number of benefits, such as improving communication signaling, resource utilization, and/or power savings.

At a first step 1702, the UE may optionally receive, from the second UE, an indication of DRX assistance information, wherein at least one of the first SL DRX configuration, the first Uu DRX configuration, and the second SL DRX configuration are based on the DRX assistance information. For example, the first step 1702 may be performed by a receiving component 1840 of FIG. 18. Here, the UE may receive and forward assistance information to another UE or base station. In some examples, one or more DRX configurations generated by the base station may be based on the assistance information. For example, the UE may receive and transmit the assistance information in steps 912/914 of FIG. 9, 1012/1014 of FIG. 10, 1212/1214 of FIG. 12.

At a second step 1704, the UE may optionally transmit, to the first base station, the DRX assistance information. For example, the second step 1704 may be performed by a transmitting component 1842 of FIG. 18.

At a third step 1706, the UE may receive, from a first base station, an indication of a first UE-universal mobile telecommunications system terrestrial radio access network (UTRAN) (Uu) discontinuous reception (DRX) configuration for the first UE, a first sidelink (SL) DRX configuration for the first UE, and a second SL DRX configuration for a second UE. For example, the third step 1706 may be performed by the receiving component 1840 of FIG. 18. Here, the master base station may transmit the DRX configurations to the UE, and the UE. For example, the UE may receive the DRX configurations via transmission 918/1018/1218 of FIGS. 9, 10, and 12.

At a fourth step 1708, the UE may apply the first Uu DRX configuration and the first SL DRX configuration. For example, the fourth step 1708 may be performed by an applying component 1844 of FIG. 18. Here, the UE may apply the DRX configurations to its communication (e.g., to a modem). For example, the UE may apply the DRX configurations at steps 920/1020/1220 of FIGS. 9, 10, and 12.

At a fifth step 1710, the UE may transmit, to the second UE, the indication of the second SL DRX configuration. For example, the fifth step 1710 may be performed by the transmitting component 1842 of FIG. 18. Here, the UE may transmit the DRX configurations and any assistance information another UE (e.g., an Rx UE). For example, the UE may transmit the DRX configurations at transmissions 922/1022/1222 of FIGS. 9, 10, and 12.

At a sixth step 1712, the UE may optionally transmit, to the second UE, the indication of at least one of the first SL DRX configuration and the first Uu DRX configuration for forwarding to a second base station. For example, the sixth step 1712 may be performed by the transmitting component 1842 of FIG. 18.

At a seventh step 1714, the UE may optionally start a timer configured to provide a window of time for a second base station to change the first SL DRX configuration to a third SL DRX configuration. For example, the seventh step 1714 may be performed by a timing component 1846 of FIG. 18.

At an eighth step 1716, the UE may optionally receive, from the second UE, an indication of a third SL DRX configuration for the first UE, the third SL DRX configured by a second base station to override the first SL DRX configuration. For example, the eighth step 1716 may be performed by the receiving component 1840 of FIG. 18.

At a ninth step 1718, the UE may optionally apply the third SL DRX configuration for sidelink communication with the second UE. For example, the ninth step 1718 may be performed by the applying component 1844 of FIG. 18. Here, the UE may configure itself to communicate using the third SL DRX configuration instead of the first SL DRX configuration.

At a tenth step 1720, the UE may optionally transmit the indication of the third SL DRX configuration to the first base station. For example, the tenth step 1720 may be performed by the transmitting component 1842 of FIG. 18.

At an eleventh step 1722, the UE may optionally receive, from the second UE and within the window of time, an indication of a third SL DRX configuration for the first UE, the third SL DRX configured by the second base station to override the first SL DRX configuration. For example, the eleventh step 1722 may be performed by the receiving component 1840 of FIG. 18.

At a twelfth step 1724, the UE may optionally apply the third SL DRX configuration for sidelink communication with the second UE. For example, the twelfth step 1724 may be performed by the applying component 1844 of FIG. 18.

At a thirteenth step 1726, the UE may optionally apply the third SL DRX configuration for sidelink communication with the second UE. For example, the thirteenth step 1726 may be performed by the applying component 1844 of FIG. 18.

At a fourteenth step 1728, the UE may optionally receive, from the second UE, an acknowledgement (ACK) generated by a second base station, the ACK configured to indicate acceptance, by the second base station, of the first SL DRX configuration. For example, the fourteenth step 1728 may be performed by the receiving component 1840 of FIG. 18.

At a fifteenth step 1730, the UE may optionally transmit the ACK to the first base station. For example, the fifteenth step 1730 may be performed by the transmitting component 1842 of FIG. 18.

Figure 18:
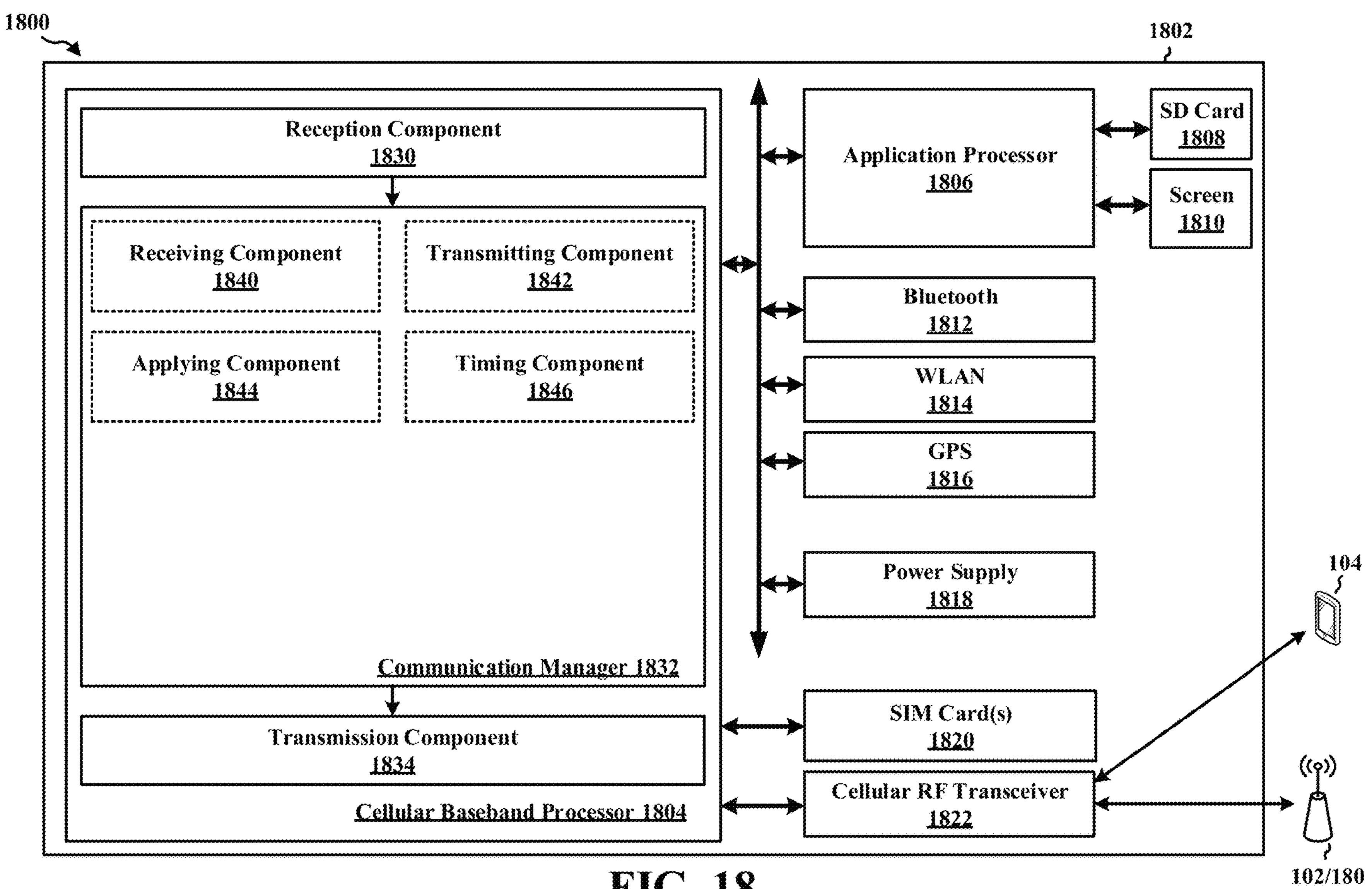
FIG. 18 is a diagram illustrating an example of a hardware implementation for an example apparatus.

FIG. 18 is a diagram 1800 illustrating an example of a hardware implementation for an apparatus 1802. The apparatus 1802 may be a UE, a component of a UE, or may implement UE functionality. In some aspects, the apparatus 1802 may include a cellular baseband processor 1804 (also referred to as a modem) coupled to a cellular RF transceiver 1822. In some aspects, the apparatus 1802 may further include one or more subscriber identity modules (SIM) cards 1820, an application processor 1806 coupled to a secure digital (SD) card 1808 and a screen 1810, a Bluetooth module 1812, a wireless local area network (WLAN) module 1814, a Global Positioning System (GPS) module 1816, or a power supply 1818. The cellular baseband processor 1804 communicates through the cellular RF transceiver 1822 with the UE 104 and/or BS 102/180. The cellular baseband processor 1804 may include a computer-readable medium/memory. The computer-readable medium/memory may be non-transitory. The cellular baseband processor 1804 is responsible for general processing, including the execution of software stored on the computer-readable medium/memory. The software, when executed by the cellular baseband processor 1804, causes the cellular baseband processor 1804 to perform the various functions described supra. The computer-readable medium/memory may also be used for storing data that is manipulated by the cellular baseband processor 1804 when executing software. The cellular baseband processor 1804 further includes a reception component 1830, a communication manager 1832, and a transmission component 1834. The communication manager 1832 includes the one or more illustrated components. The components within the communication manager 1832 may be stored in the computer-readable medium/memory and/or configured as hardware within the cellular baseband processor 1804. The cellular baseband processor 1804 may be a component of the UE 104 and may include the memory 360 and/or at least one of the TX processor 368, the RX processor 356, and the controller/processor 359. In one configuration, the apparatus 1802 may be a modem chip and include just the baseband processor 1804, and in another configuration, the apparatus 1802 may be the entire UE (e.g., see 104 of FIGS. 1 and 3) and include the additional modules of the apparatus 1802.

The communication manager 1832 includes a receiving component 1840 that is configured to receive, from the second UE, an indication of DRX assistance information, wherein at least one of the first SL DRX configuration, the first Uu DRX configuration, and the second SL DRX configuration are based on the DRX assistance information; receive, from a first base station, an indication of a first UE-universal mobile telecommunications system terrestrial radio access network (UTRAN) (Uu) discontinuous reception (DRX) configuration for the first UE, a first sidelink (SL) DRX configuration for the first UE, and a second SL DRX configuration for a second UE; receive, from the second UE, an indication of a third SL DRX configuration for the first UE, the third SL DRX configured by a second base station to override the first SL DRX configuration; receive, from the second UE and within the window of time, an indication of a third SL DRX configuration for the first UE, the third SL DRX configured by the second base station to override the first SL DRX configuration; receive, from the second UE, an acknowledgement (ACK) generated by a second base station, the ACK configured to indicate acceptance, by the second base station, of the first SL DRX configuration; e.g., as described in connection with the first step 1702, the third step 1706, the eighth step 1716, the eleventh step 1722, and the fourteenth step 1728 discussed above.

The communication manager 1832 includes a transmitting component 1842 that is configured to transmit, to the first base station, the DRX assistance information; transmit, to the second UE, the indication of the second SL DRX configuration; transmit, to the second UE, the indication of at least one of the first SL DRX configuration and the first Uu DRX configuration for forwarding to a second base station; transmit the indication of the third SL DRX configuration to the first base station; transmit the ACK to the first base station; e.g., as described in connection with the second step 1704, the fifth step 1710, the sixth step 1712, the tenth step 1720, and the fifteenth step 1730 discussed above.

The communication manager 1832 includes an applying component 1844 that is configured to apply the first Uu DRX configuration and the first SL DRX configuration; apply the third SL DRX configuration for sidelink communication with the second UE; apply the third SL DRX configuration for sidelink communication with the second UE; apply the third SL DRX configuration for sidelink communication with the second UE; e.g., as described in connection with the fourth step 1708, the ninth step 1718, the twelfth step 1724, and the thirteenth step 1726 discussed above.

The communication manager 1832 includes a timing component 1846 that is configured to start a timer configured to provide a window of time for a second base station to change the first SL DRX configuration to a third SL DRX configuration; e.g., as described in connection with the seventh step 1714 discussed above.

The apparatus may include additional components that perform each of the blocks of the algorithm in the flowchart of FIG. 17. As such, each block in the flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1802 may include a variety of components configured for various functions. In one configuration, the apparatus 1802, and in particular the cellular baseband processor 1804, includes means for receiving, from the second UE, an indication of DRX assistance information, wherein at least one of the first SL DRX configuration, the first Uu DRX configuration, and the second SL DRX configuration are based on the DRX assistance information; means for transmitting, to the first base station, the DRX assistance information; means for receiving, from a first base station, an indication of a first UE-universal mobile telecommunications system terrestrial radio access network (UTRAN) (Uu) discontinuous reception (DRX) configuration for the first UE, a first sidelink (SL) DRX configuration for the first UE, and a second SL DRX configuration for a second UE; means for applying the first Uu DRX configuration and the first SL DRX configuration; means for transmitting, to the second UE, the indication of the second SL DRX configuration; means for transmitting, to the second UE, the indication of at least one of the first SL DRX configuration and the first Uu DRX configuration for forwarding to a second base station; means for starting a timer configured to provide a window of time for a second base station to change the first SL DRX configuration to a third SL DRX configuration; means for receiving, from the second UE, an indication of a third SL DRX configuration for the first UE, the third SL DRX configured by a second base station to override the first SL DRX configuration; means for applying the third SL DRX configuration for sidelink communication with the second UE; means for transmitting the indication of the third SL DRX configuration to the first base station; means for receiving, from the second UE and within the window of time, an indication of a third SL DRX configuration for the first UE, the third SL DRX configured by the second base station to override the first SL DRX configuration; means for applying the third SL DRX configuration for sidelink communication with the second UE; means for applying the third SL DRX configuration for sidelink communication with the second UE; means for receiving, from the second UE, an acknowledgement (ACK) generated by a second base station, the ACK configured to indicate acceptance, by the second base station, of the first SL DRX configuration; means for transmitting the ACK to the first base station.

The means may be one or more of the components of the apparatus 1802 configured to perform the functions recited by the means. As described supra, the apparatus 1802 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 19:
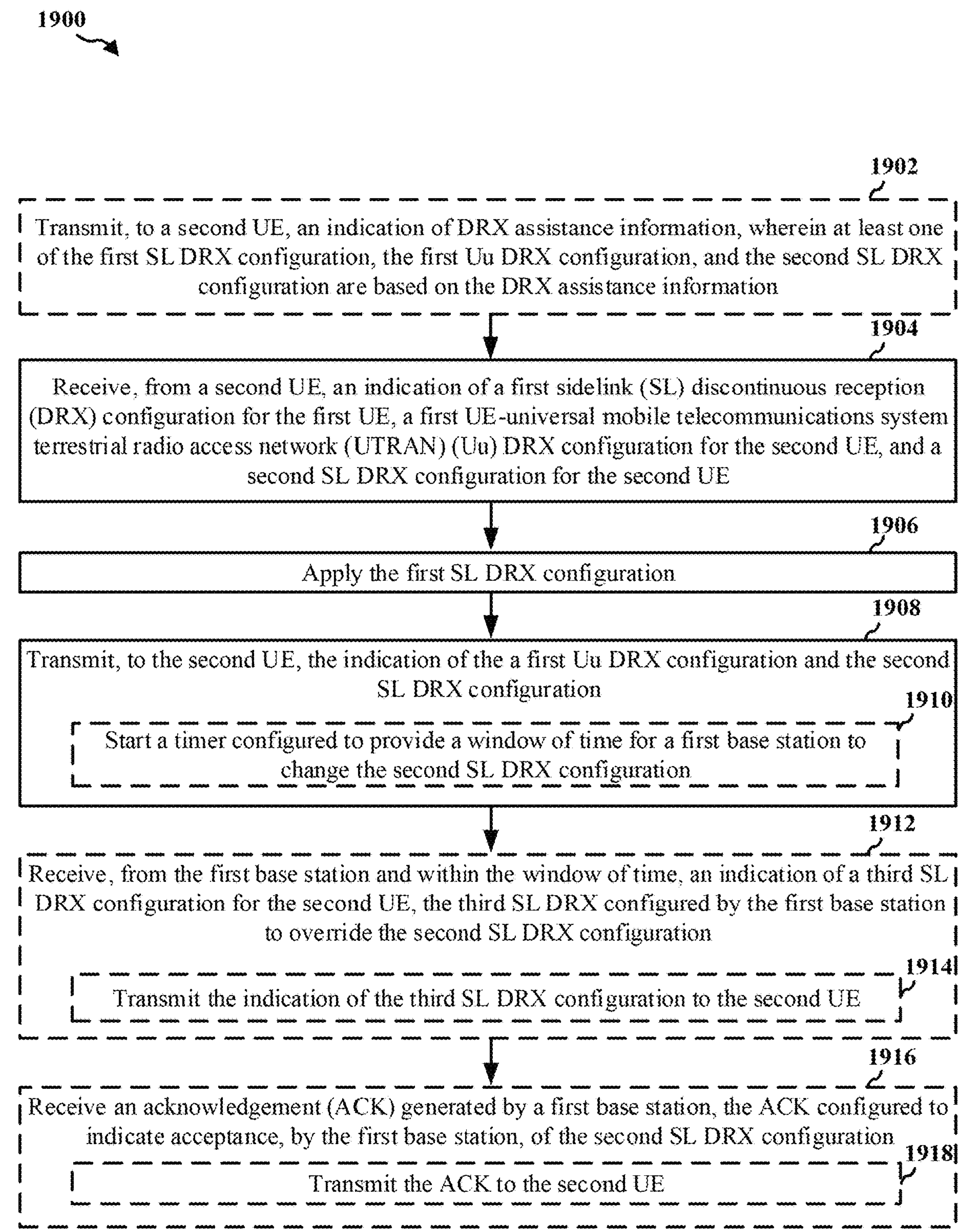
FIG. 19 is a flowchart of a method of wireless communication.

FIG. 19 is a flowchart 1900 of a method of wireless communication. The method may be performed by a UE configured as an Rx UE (e.g., UE 104 of FIGS. 1 and 3; first UE 522/806/906/1006/1206; apparatus 2002) or a component of a UE. The methods described herein may provide a number of benefits, such as improving communication signaling, resource utilization, and/or power savings.

At a first step 1902, the UE may optionally transmit, to a second UE, an indication of DRX assistance information, wherein at least one of the first SL DRX configuration, the first Uu DRX configuration, and the second SL DRX configuration are based on the DRX assistance information. For example, the first step 1902 may be performed by a transmitting component 2040 of FIG. 20. Here, the UE may receive and forward assistance information to another UE or base station. In some examples, one or more DRX configurations generated by the base station may be based on the assistance information. For example, the UE may transmit the assistance information in communication 912 of FIG. 9, 1012 of FIG. 10, 1212 of FIG. 12.

At a second step 1904, the UE may receive, from a second UE, an indication of a first sidelink (SL) discontinuous reception (DRX) configuration for the first UE, a first UE-universal mobile telecommunications system terrestrial radio access network (UTRAN) (Uu) DRX configuration for the second UE, and a second SL DRX configuration for the second UE. For example, the second step 1904 may be performed by a receiving component 2042 of FIG. 20.

At a third step 1906, the UE may apply the first SL DRX configuration. For example, the third step 1906 may be performed by an applying component 2044 of FIG. 20.

At a fourth step 1908, the UE may transmit, to the second UE, the indication of the first Uu DRX configuration and the second SL DRX configuration. For example, the fourth step 1908 may be performed by the transmitting component 2040 of FIG. 20.

At a fifth step 1910, the UE may optionally start a timer configured to provide a window of time for a first base station to change the second SL DRX configuration. For example, the fifth step 1910 may be performed by a timing component 2046 of FIG. 20.

At a sixth step 1912, the UE may optionally receive, from the first base station and within the window of time, an indication of a third SL DRX configuration for the second UE, the third SL DRX configured by the first base station to override the second SL DRX configuration. For example, the sixth step 1912 may be performed by the receiving component 2042 of FIG. 20.

At a seventh step 1914, the UE may optionally transmit the indication of the third SL DRX configuration to the second UE. For example, the seventh step 1914 may be performed by the transmitting component 2040 of FIG. 20.

At an eighth step 1916, the UE may optionally receive an acknowledgement (ACK) generated by a first base station, the ACK configured to indicate acceptance, by the first base station, of the second SL DRX configuration. For example, the eighth step 1916 may be performed by the receiving component 2042 of FIG. 20.

At a ninth step 1918, the UE may optionally transmit the ACK to the second UE. For example, the ninth step 1918 may be performed by the transmitting component 2040 of FIG. 20.

In certain aspects, the DRX assistance information comprises at least one of: an existing SL DRX configuration used for SL communications between the first UE and a third UE, an existing Uu DRX configuration used for Uu communications between the first UE and a first base station, or a proposed SL DRX configuration for SL communications between the first UE and the second UE.

In certain aspects, the first SL DRX configuration comprises at least one of: a first SL DRX cycle, a first SL DRX starting offset, or a first SL DRX slot offset; the second SL DRX configuration comprises at least one at least one of: a second SL DRX cycle, a second SL DRX starting offset, or a second SL DRX slot offset; and the first Uu DRX configuration comprises at least one at least one of: a first Uu DRX cycle, a first Uu DRX starting offset, or a first Uu DRX slot offset.

Figure 20:
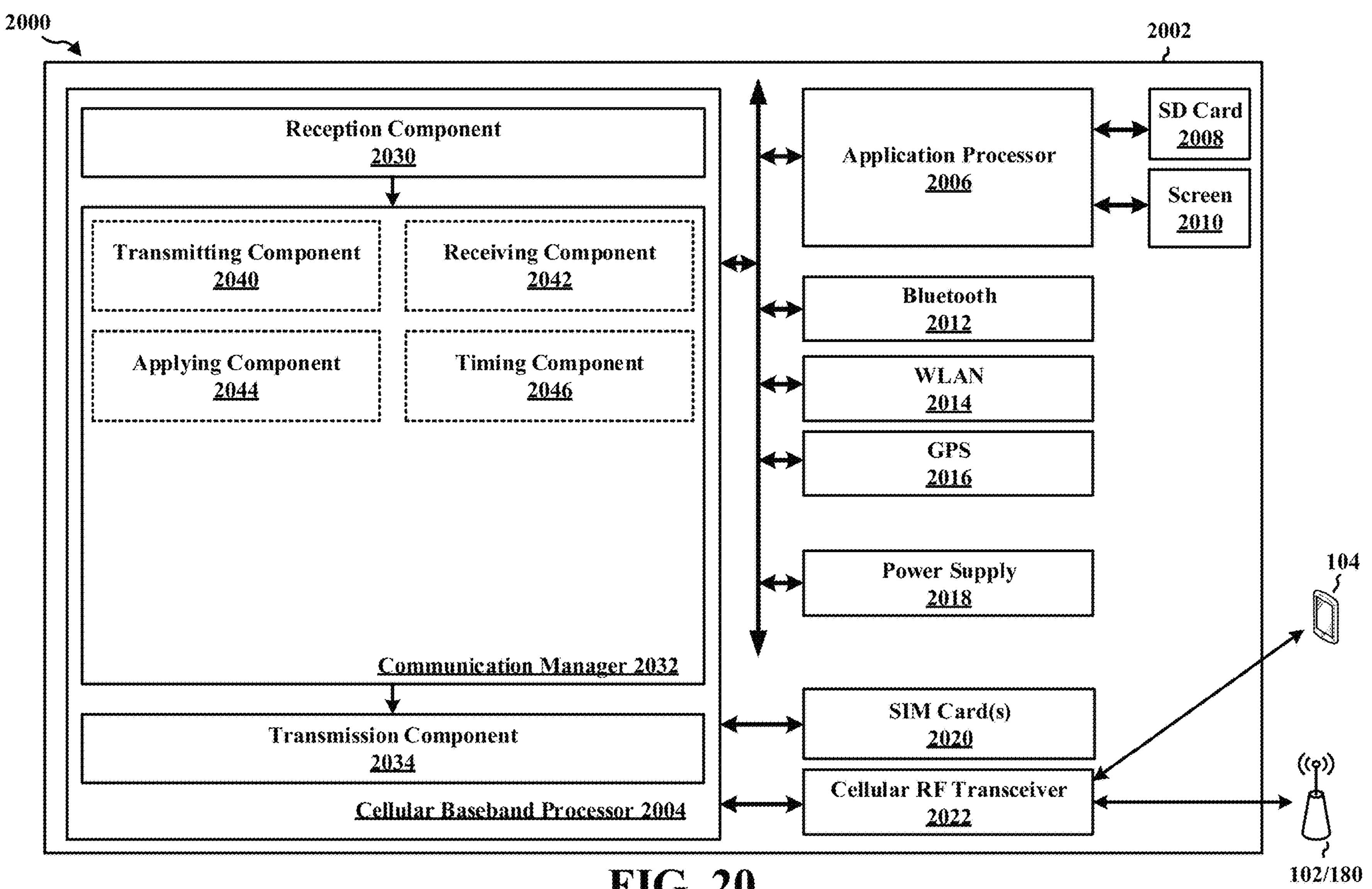
FIG. 20 is a diagram illustrating an example of a hardware implementation for an example apparatus.

FIG. 20 is a diagram 2000 illustrating an example of a hardware implementation for an apparatus 2002. The apparatus 2002 may be a UE, a component of a UE, or may implement UE functionality. In some aspects, the apparatus 2002 may include a cellular baseband processor 2004 (also referred to as a modem) coupled to a cellular RF transceiver 2022. In some aspects, the apparatus 2002 may further include one or more subscriber identity modules (SIM) cards 2020, an application processor 2006 coupled to a secure digital (SD) card 2008 and a screen 2010, a Bluetooth module 2012, a wireless local area network (WLAN) module 2014, a Global Positioning System (GPS) module 2016, or a power supply 2018. The cellular baseband processor 2004 communicates through the cellular RF transceiver 2022 with the UE 104 and/or BS 102/180. The cellular baseband processor 2004 may include a computer-readable medium/memory. The computer-readable medium/memory may be non-transitory. The cellular baseband processor 2004 is responsible for general processing, including the execution of software stored on the computer-readable medium/memory. The software, when executed by the cellular baseband processor 2004, causes the cellular baseband processor 2004 to perform the various functions described supra. The computer-readable medium/memory may also be used for storing data that is manipulated by the cellular baseband processor 2004 when executing software. The cellular baseband processor 2004 further includes a reception component 2030, a communication manager 2032, and a transmission component 2034. The communication manager 2032 includes the one or more illustrated components. The components within the communication manager 2032 may be stored in the computer-readable medium/memory and/or configured as hardware within the cellular baseband processor 2004. The cellular baseband processor 2004 may be a component of the UE 104 and may include the memory 360 and/or at least one of the TX processor 368, the RX processor 356, and the controller/processor 359. In one configuration, the apparatus 2002 may be a modem chip and include just the baseband processor 2004, and in another configuration, the apparatus 2002 may be the entire UE (e.g., see 104 of FIGS. 1 and 3) and include the additional modules of the apparatus 2002.

The communication manager 2032 includes a transmitting component 2040 that is configured to transmit, to a second UE, an indication of DRX assistance information, wherein at least one of the first SL DRX configuration, the first Uu DRX configuration, and the second SL DRX configuration are based on the DRX assistance information; transmit, to the second UE, the indication of the first Uu DRX configuration and the second SL DRX configuration; transmit the indication of the third SL DRX configuration to the second UE; transmit the ACK to the second UE; e.g., as described in connection with the first step 1902, the fourth step 1908, the seventh step 1914, and the ninth step 1918 discussed above.

The communication manager 2032 includes a receiving component 2042 that is configured to receive, from a second UE, an indication of a first sidelink (SL) discontinuous reception (DRX) configuration for the first UE, a first UE-universal mobile telecommunications system terrestrial radio access network (UTRAN) (Uu) DRX configuration for the second UE, and a second SL DRX configuration for the second UE; receive, from the first base station and within the window of time, an indication of a third SL DRX configuration for the second UE, the third SL DRX configured by the first base station to override the second SL DRX configuration; receive an acknowledgement (ACK) generated by a first base station, the ACK configured to indicate acceptance, by the first base station, of the second SL DRX configuration; e.g., as described in connection with the second step 1904, the sixth step 1912, the eighth step 1916 discussed above.

The communication manager 2032 includes an applying component 2044 that is configured to apply the first SL DRX configuration; e.g., as described in connection with the third step 1906 discussed above.

The communication manager 2032 includes a timing component 2046 that is configured Start a timer configured to provide a window of time for a first base station to change the second SL DRX configuration; e.g., as described in connection with the fifth step 1910 discussed above.

The apparatus may include additional components that perform each of the blocks of the algorithm in the flowchart of FIG. 19. As such, each block in the flowchart of FIG. 19 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 2002 may include a variety of components configured for various functions. In one configuration, the apparatus 2002, and in particular the cellular baseband processor 2004, includes means for transmitting, to a second UE, an indication of DRX assistance information, wherein at least one of the first SL DRX configuration, the first Uu DRX configuration, and the second SL DRX configuration are based on the DRX assistance information; means for receiving, from a second UE, an indication of a first sidelink (SL) discontinuous reception (DRX) configuration for the first UE, a first UE-universal mobile telecommunications system terrestrial radio access network (UTRAN) (Uu) DRX configuration for the second UE, and a second SL DRX configuration for the second UE; means for applying the first SL DRX configuration; means for transmitting, to the second UE, the indication of the first Uu DRX configuration and the second SL DRX configuration; means for starting a timer configured to provide a window of time for a first base station to change the second SL DRX configuration; means for receiving, from the first base station and within the window of time, an indication of a third SL DRX configuration for the second UE, the third SL DRX configured by the first base station to override the second SL DRX configuration; means for transmitting the indication of the third SL DRX configuration to the second UE; means for receiving an acknowledgement (ACK) generated by a first base station, the ACK configured to indicate acceptance, by the first base station, of the second SL DRX configuration; means for transmitting the ACK to the second UE.

The means may be one or more of the components of the apparatus 2002 configured to perform the functions recited by the means. As described supra, the apparatus 2002 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Additional Considerations

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

EXAMPLE ASPECTS

The following aspects are illustrative only and may be combined with other aspects or teachings described herein, without limitation.

Example 1 is a method for wireless communications at a first base station, the method comprising: receiving, from a first user equipment (UE), an indication of discontinuous reception (DRX) assistance information; configuring a first sidelink (SL) DRX configuration for the first UE, a second SL DRX configuration for a second UE, and a first UE-universal mobile telecommunications system terrestrial radio access (UTRA) interface (Uu) DRX configuration for the first UE, wherein at least one of the first SL DRX configuration, the second SL DRX configuration, and the first Uu DRX configuration are configured based on the DRX assistance information; and transmitting, to the first UE, an indication of the first SL DRX configuration, the second SL DRX configuration, and the first Uu DRX configuration.

Example 2 is the method of example 1, further comprising: determining a time offset between the first SL DRX configuration and the first Uu DRX configuration, wherein determining the time offset occurs prior to configuring the first SL DRX configuration, the second SL DRX configuration, and the first Uu DRX configuration, and wherein configuring the first SL DRX configuration, the second SL DRX configuration, and the first Uu DRX configuration is based at least in part on the time offset; and transmitting, via the first UE, an indication of the time offset to a second base station.

Example 3 is the method of any of examples 1 and 2, further comprising starting a timer upon transmission of the indication of the first SL DRX configuration, the second SL DRX configuration, and the first Uu DRX configuration, the timer configured to provide a window of time for a second base station to change the first SL DRX configuration.

Example 4 is the method of any of examples 1-3, further comprising receiving, from the first UE and within the window of time, an indication of a third SL DRX configuration for the first UE to replace the first SL DRX configuration, wherein the third SL DRX configuration is configured by the second base station.

Example 5 is the method of any of examples 1-4, further comprising: receiving, from the first UE, an acknowledgement (ACK) message configured to indicate acceptance of the first SL DRX configuration by a second base station; or receiving, from the first UE, an indication of a third SL DRX configuration to replace the first SL DRX configuration, wherein the indication of the third SL DRX is configured to indicate non-acceptance of the first SL DRX by the second base station.

Example 6 is the method of any of examples 1-5, wherein the DRX assistance information comprises at least one of: a first existing SL DRX configuration used for SL communications between a second UE and a third UE, a second existing SL DRX configuration used for SL communications between the first UE and the third UE, an existing Uu DRX configuration used for Uu communications between the second UE and a second base station, or a proposed SL DRX configuration, determined by the second UE, for SL communications between the first UE and the second UE.

Example 7 is the method of any of examples 1-6, wherein: the first SL DRX configuration comprises at least one of: a first SL DRX cycle, a first SL DRX starting offset, or a first SL DRX slot offset; the second SL DRX configuration comprises at least one at least one of: a second SL DRX cycle, a second SL DRX starting offset, or a second SL DRX slot offset; and the first Uu DRX configuration comprises at least one at least one of: a first Uu DRX cycle, a first Uu DRX starting offset, or a first Uu DRX slot offset.

Example 8 is the method of any of examples 1-7, further comprising transmitting, to a second base station over an Xn interface, a radio resource control (RRC) message for at least one of: identifying the first UE and the second UE, and indicating that the first base station is operable as a master base station.

Example 9 is a method for wireless communications at a first base station, comprising:

receiving, from a first user equipment (UE), an indication of a first sidelink (SL) discontinuous reception (DRX) configuration for the first UE and a second SL DRX configuration for a second UE; and determining whether to accept the second SL DRX configuration based at least in part on the first SL DRX configuration.

Example 10 is the method of example 9, wherein the first SL DRX and the second SL DRX are configured by a second base station in communication with the first base station via the first UE and the second UE, and wherein the method further comprises: receiving, prior to receiving the indication of the first SL DRX and the second SL DRX, a time offset between the first SL DRX configuration and a UE-universal mobile telecommunications system terrestrial radio access (UTRA) interface (Uu) discontinuous reception (DRX) configuration for the second UE, wherein the first SL DRX configuration and the second SL DRX configuration are based at least in part on the time offset; and determining, based on the time offset, the Uu DRX configuration for the second UE.

Example 11 is the method of any of examples 9 and 10, wherein: the first SL DRX configuration comprises at least one of: a first SL DRX cycle, a first SL DRX starting offset, or a first SL DRX slot offset; the second SL DRX configuration comprises at least one at least one of: a second SL DRX cycle, a second SL DRX starting offset, or a second SL DRX slot offset; and the first Uu DRX configuration comprises at least one at least one of: a first Uu DRX cycle, a first Uu DRX starting offset, or a first Uu DRX slot offset.

Example 12 is the method of any of examples 9-11, wherein if the first base station accepts the second SL DRX configuration, the method further comprises transmitting an acknowledgment (ACK) to the second base station via the first UE and the second UE.

Example 13 is the method of any of examples 9-12, wherein if the first base station does not accept the second SL DRX configuration, the method further comprises: determining a third SL DRX configuration for the second UE to replace the second SL DRX; and transmitting the third SL DRX configuration to the second base station via the first UE and the second UE.

Example 14 is the method of any of examples 9-13, wherein the method further comprises: receiving DRX assistance information from the first UE; and determining whether to accept the second SL DRX configuration based at least in part on the first SL DRX and DRX assistance information.

Example 15 is the method of any of examples 9-14, wherein the DRX assistance information comprises at least one of: a first existing SL DRX configuration used for SL communications between the first UE and a third UE, a second existing SL DRX configuration used for SL communications between the second UE and the third UE, an existing Uu DRX configuration used for Uu communications between the second UE and the second base station, or a proposed SL DRX configuration, determined by the first UE, for SL communications between the first UE and the second UE.

Example 16 is the method of any of examples 9-15, wherein the method further comprises receiving, from a second base station over an Xn interface, a radio resource control (RRC) message for at least one of: identifying the first UE and the second UE, and indicating that the second base station is operable as a master base station.

Example 17 is a method for wireless communications at a first user equipment (UE), comprising: receiving, from a first base station, an indication of a first UE-universal mobile telecommunications system terrestrial radio access (UTRA) interface (Uu) discontinuous reception (DRX) configuration for the first UE, a first sidelink (SL) DRX configuration for the first UE, and a second SL DRX configuration for a second UE; applying the first Uu DRX configuration and the first SL DRX configuration; and transmitting, to the second UE, the indication of the second SL DRX configuration.

Example 18 is the method of example 17, wherein the method further comprises transmitting, to the second UE, the indication of at least one of the first SL DRX configuration and the first Uu DRX configuration for forwarding to a second base station.

Example 19 is the method of any of examples 17 and 18, wherein the method further comprises: receiving, from the second UE, an indication of a third SL DRX configuration for the first UE, the third SL DRX configured by a second base station to override the first SL DRX configuration; applying the third SL DRX configuration for sidelink communication with the second UE; and transmitting the indication of the third SL DRX configuration to the first base station.

Example 20 is the method of any of examples 17-19, wherein the method further comprises starting a timer configured to provide a window of time for a second base station to change the first SL DRX configuration to a third SL DRX configuration.

Example 21 is the method of any of examples 17-20, wherein the method further comprises: receiving, from the second UE and within the window of time, an indication of a third SL DRX configuration for the first UE, the third SL DRX configured by the second base station to override the first SL DRX configuration; applying the third SL DRX configuration for sidelink communication with the second UE; and transmitting the indication of the third SL DRX configuration to the first base station.

Example 22 is the method of any of examples 17-21, wherein the method further comprises: receiving, from the second UE, an acknowledgement (ACK) generated by a second base station, the ACK configured to indicate acceptance, by the second base station, of the first SL DRX configuration; and transmitting the ACK to the first base station.

Example 23 is the method of any of examples 17-22, wherein the method further comprises: receiving, from the second UE, an indication of DRX assistance information, wherein at least one of the first SL DRX configuration, the first Uu DRX configuration, and the second SL DRX configuration are based on the DRX assistance information; and transmitting, to the first base station, the DRX assistance information.

Example 24 is the method for wireless communications at a first user equipment (UE), comprising: receiving, from a second UE, an indication of a first sidelink (SL) discontinuous reception (DRX) configuration for the first UE, a UE-universal mobile telecommunications system terrestrial radio access (UTRA) interface (Uu) DRX configuration for the second UE, and a second SL DRX configuration for the second UE; applying the first SL DRX configuration; and transmitting, to the second UE, the indication of the first Uu DRX configuration and the second SL DRX configuration.

Example 25 is the method of example 24, wherein the method further comprises transmitting, to a second UE, an indication of DRX assistance information, wherein at least one of the first SL DRX configuration, the first Uu DRX configuration, and the second SL DRX configuration are based on the DRX assistance information.

Example 26 is the method of any of examples 24 and 25, wherein the DRX assistance information comprises at least one of: an existing SL DRX configuration used for SL communications between the first UE and a third UE, an existing Uu DRX configuration used for Uu communications between the first UE and a first base station, or a proposed SL DRX configuration for SL communications between the first UE and the second UE.

Example 27 is the method of any of examples 24-26, wherein the method further comprises starting a timer configured to provide a window of time for a first base station to change the second SL DRX configuration.

Example 28 is the method of any of examples 24-27, wherein the method further comprises: receiving, from the first base station and within the window of time, an indication of a third SL DRX configuration for the second UE, the third SL DRX configured by the first base station to override the second SL DRX configuration; and transmitting the indication of the third SL DRX configuration to the second UE.

Example 29 is the method of any of examples 24-28, wherein the method further comprises: receiving an acknowledgement (ACK) generated by a first base station, the ACK configured to indicate acceptance, by the first base station, of the second SL DRX configuration; and transmitting the ACK to the second UE.

Example 30 is the method of any of examples 24-29, wherein the first SL DRX configuration comprises at least one of: a first SL DRX cycle, a first SL DRX starting offset, or a first SL DRX slot offset; the second SL DRX configuration comprises at least one at least one of: a second SL DRX cycle, a second SL DRX starting offset, or a second SL DRX slot offset; and the first Uu DRX configuration comprises at least one at least one of: a first Uu DRX cycle, a first Uu DRX starting offset, or a first Uu DRX slot offset.

Example 31 is a base station, comprising: a memory; and a processor coupled to the memory, the processor and memory being configured to perform the method of any of examples 1-8.

Example 32 is a base station, comprising a memory; and a processor coupled to the memory, the processor and memory being configured to perform the method of any of examples 9-16.

Example 33 is a user equipment (UE), comprising: a memory; and a processor coupled to the memory, the processor and memory being configured to perform the method of any of examples 17-23.

Example 34 is a user equipment (UE), comprising: a memory; and a processor coupled to the memory, the processor and memory being configured to perform the method of any of examples 24-30.

Example 35 is a base station, comprising: one or more means for performing the method of any of examples 1-8.

Example 36 is a base station, comprising: one or more means for performing the method of any of examples 9-16.

Example 37 is a user equipment (UE) comprising: one or more means for performing the method of any of examples 17-23.

Example 38 is a user equipment (UE) comprising: one or more means for performing the method of any of examples 24-30.

Example 39 is a non-transitory computer-readable storage medium having instructions stored thereon for performing the method of any of examples 1-8 for wireless communication by a base station.

Example 40 is a non-transitory computer-readable storage medium having instructions stored thereon for performing the method of any of examples 9-16 for wireless communication by a base station.

Example 41 is a non-transitory computer-readable storage medium having instructions stored thereon for performing the method of any of examples 17-23 for wireless communication by a user equipment (UE).

Example 42 is a non-transitory computer-readable storage medium having instructions stored thereon for performing the method of any of examples 24-30 for wireless communication by a user equipment (UE).

What is claimed is:

1. An apparatus for wireless communications at a first base station, comprising:

a memory comprising instructions; and one or more processors configured to execute the instructions and cause the apparatus to:

receive, from a first user equipment (UE), an indication of discontinuous reception (DRX) assistance information;

configure a first sidelink (SL) DRX configuration to be applied at the first UE, a second SL DRX configuration to be applied at a second UE, and a UE-universal mobile telecommunications system terrestrial radio access (UTRA) interface (Uu) DRX configuration to be applied at the first UE, wherein at least one of the first SL DRX configuration, the second SL DRX configuration, and the Uu DRX configuration are configured based on the DRX assistance information, and wherein the first SL DRX configuration is different from the second SL DRX configuration; and transmit, to the first UE, an indication of the first SL DRX configuration, the second SL DRX configuration, and the Uu DRX configuration.

2. The apparatus of claim 1, wherein the one or more processors are further configured to cause the apparatus to:

determine a time offset between the first SL DRX configuration and the Uu DRX configuration, wherein determining the time offset occurs prior to configuring the first SL DRX configuration, the second SL DRX configuration, and the Uu DRX configuration, and wherein configuring the first SL DRX configuration, the second SL DRX configuration, and the Uu DRX configuration is based at least in part on the time offset; and transmit, via the first UE, an indication of the time offset to a second base station.

3. The apparatus of claim 1, wherein the one or more processors are further configured to cause the apparatus to start a timer upon transmission of the indication of the first SL DRX configuration, the second SL DRX configuration, and the Uu DRX configuration, the timer configured to provide a window of time for a second base station to change the first SL DRX configuration.

4. The apparatus of claim 3, wherein the one or more processors are further configured to cause the apparatus to receive, from the first UE and within the window of time, an indication of a third SL DRX configuration to be applied at the first UE to replace the first SL DRX configuration, wherein the third SL DRX configuration is configured by the second base station.

5. The apparatus of claim 1, wherein the one or more processors are further configured to cause the apparatus to:

receive, from the first UE, an acknowledgement (ACK) message configured to indicate acceptance of the first SL DRX configuration by a second base station; or receive, from the first UE, an indication of a third SL DRX configuration to replace the first SL DRX configuration, wherein the indication of the third SL DRX is configured to indicate non-acceptance of the first SL DRX by the second base station.

6. The apparatus of claim 1, wherein the DRX assistance information comprises at least one of: a first existing SL DRX configuration used for SL communications between a second UE and a third UE, a second existing SL DRX configuration used for SL communications between the first UE and the third UE, an existing Uu DRX configuration used for Uu communications between the second UE and a second base station, or a proposed SL DRX configuration, determined by the second UE, for SL communications between the first UE and the second UE.

7. The apparatus of claim 1, wherein:

the first SL DRX configuration comprises at least one of: a first SL DRX cycle, a first SL DRX starting offset, or a first SL DRX slot offset;

the second SL DRX configuration comprises at least one of: a second SL DRX cycle, a second SL DRX starting offset, or a second SL DRX slot offset; and the Uu DRX configuration comprises at least one of: a Uu DRX cycle, a Uu DRX starting offset, or a Uu DRX slot offset.

8. The apparatus of claim 1, wherein the one or more processors are further configured to cause the apparatus to transmit, to a second base station over an Xn interface, a radio resource control (RRC) message configured to at least one of:

identify the first UE and the second UE, and indicate that the first base station is operable as a master base station.

9. An apparatus for wireless communications at a first base station, comprising:

a memory comprising instructions; and one or more processors configured to execute the instructions and cause the apparatus to:

receive, from a first user equipment (UE), an indication of a first sidelink (SL) discontinuous reception (DRX) configuration to be applied at the first UE and a second SL DRX configuration to be applied at a second UE, wherein the first SL DRX configuration is different from the second SL DRX configuration, and wherein the first SL DRX and the second SL DRX are configured by a second base station in communication with the first base station via the first UE and the second UE; and determine whether to accept the second SL DRX configuration based at least in part on the first SL DRX configuration.

10. The apparatus of claim 9, wherein the one or more processors are further configured to cause the apparatus to:

receive, prior to receiving the indication of the first SL DRX and the second SL DRX, a time offset between the first SL DRX configuration and a UE-universal mobile telecommunications system terrestrial radio access (UTRA) interface (Uu) discontinuous reception (DRX) configuration to be applied at the second UE, wherein the first SL DRX configuration and the second SL DRX configuration are based at least in part on the time offset; and determine, based on the time offset, the Uu DRX configuration to be applied at the second UE.

11. The apparatus of claim 10, wherein:

the first SL DRX configuration comprises at least one of: a first SL DRX cycle, a first SL DRX starting offset, or a first SL DRX slot offset;

the second SL DRX configuration comprises at least one of: a second SL DRX cycle, a second SL DRX starting offset, or a second SL DRX slot offset; and the Uu DRX configuration comprises at least one of: a Uu DRX cycle, a Uu DRX starting offset, or a Uu DRX slot offset.

12. The apparatus of claim 9, wherein if the first base station accepts the second SL DRX configuration, the one or more processors are further configured to cause the apparatus to transmit an acknowledgment (ACK) to the second base station via the first UE and the second UE.

13. The apparatus of claim 9, wherein if the first base station does not accept the second SL DRX configuration, the one or more processors are further configured to cause the apparatus to:

determine a third SL DRX configuration to be applied at the second UE to replace the second SL DRX; and transmit the third SL DRX configuration to the second base station via the first UE and the second UE.

14. The apparatus of claim 9, wherein the one or more processors are further configured to cause the apparatus to:

receive DRX assistance information from the first UE; and determine whether to accept the second SL DRX configuration based at least in part on the first SL DRX and DRX assistance information.

15. The apparatus of claim 14, wherein the DRX assistance information comprises at least one of: a first existing SL DRX configuration used for SL communications between the first UE and a third UE, a second existing SL DRX configuration used for SL communications between the second UE and the third UE, an existing Uu DRX configuration used for Uu communications between the second UE and the second base station, or a proposed SL DRX configuration, determined by the first UE, for SL communications between the first UE and the second UE.

16. The apparatus of claim 9, wherein the one or more processors are further configured to cause the apparatus to receive, from the second base station over an Xn interface, a radio resource control (RRC) message configured to at least one of:

identify the first UE and the second UE, and indicate that the second base station is operable as a master base station.

17. An apparatus for wireless communications at a first user equipment (UE), comprising:

a memory comprising instructions; and one or more processors configured to execute the instructions and cause the apparatus to:

receive, from a first base station, an indication of a UE-universal mobile telecommunications system terrestrial radio access (UTRA) interface (Uu) discontinuous reception (DRX) configuration to be applied at the first UE, a first sidelink (SL) DRX configuration to be applied at the first UE, and a second SL DRX configuration to be applied at a second UE, wherein the first SL DRX configuration is different from the second SL DRX configuration;

apply the Uu DRX configuration and the first SL DRX configuration; and transmit, to the second UE, the indication of the second SL DRX configuration.

18. The apparatus of claim 17, wherein the one or more processors are further configured to cause the apparatus to transmit, to the second UE, the indication of at least one of the first SL DRX configuration and the Uu DRX configuration for forwarding to a second base station.

19. The apparatus of claim 17, wherein the one or more processors are further configured to cause the apparatus to:

receive, from the second UE, an indication of a third SL DRX configuration to be applied at the first UE, the third SL DRX configured by a second base station to override the first SL DRX configuration;

apply the third SL DRX configuration for sidelink communication with the second UE; and transmit the indication of the third SL DRX configuration to the first base station.

20. The apparatus of claim 17, wherein the one or more processors are further configured to cause the apparatus to start a timer configured to provide a window of time for a second base station to change the first SL DRX configuration to a third SL DRX configuration.

21. The apparatus of claim 20, wherein the one or more processors are further configured to cause the apparatus to:

receive, from the second UE and within the window of time, an indication of a third SL DRX configuration to be applied at the first UE, the third SL DRX configured by the second base station to override the first SL DRX configuration;

apply the third SL DRX configuration for sidelink communication with the second UE; and transmit the indication of the third SL DRX configuration to the first base station.

22. The apparatus of claim 17, wherein the one or more processors are further configured to cause the apparatus to:

receive, from the second UE, an acknowledgement (ACK) generated by a second base station, the ACK configured to indicate acceptance, by the second base station, of the first SL DRX configuration; and transmit the ACK to the first base station.

23. The apparatus of claim 17, wherein the one or more processors are further configured to cause the apparatus to:

receive, from the second UE, an indication of DRX assistance information, wherein at least one of the first SL DRX configuration, the Uu DRX configuration, and the second SL DRX configuration are based on the DRX assistance information; and transmit, to the first base station, the DRX assistance information.

24. An apparatus for wireless communications at a first user equipment (UE), comprising:

a memory comprising instructions; and one or more processors configured to execute the instructions and cause the apparatus to:

receive, from a second UE, an indication of a first sidelink (SL) discontinuous reception (DRX) configuration to be applied at the first UE, a UE-universal mobile telecommunications system terrestrial radio access (UTRA) interface (Uu) DRX configuration to be applied at the second UE, and a second SL DRX configuration to be applied at the second UE, wherein the first SL DRX configuration is different from the second SL DRX configuration;

apply the first SL DRX configuration; and transmit, to a first base station, the indication of the Uu DRX configuration and the second SL DRX configuration.

25. The apparatus of claim 24, wherein the one or more processors are further configured to cause the apparatus to transmit, to the second UE, an indication of DRX assistance information, wherein at least one of the first SL DRX configuration, the Uu DRX configuration, and the second SL DRX configuration are based on the DRX assistance information.

26. The apparatus of claim 25, wherein the DRX assistance information comprises at least one of: an existing SL DRX configuration used for SL communications between the first UE and a third UE, an existing Uu DRX configuration used for Uu communications between the first UE and a first base station, or a proposed SL DRX configuration for SL communications between the first UE and the second UE.

27. The apparatus of claim 24, wherein the one or more processors are further configured to cause the apparatus to start a timer configured to provide a window of time for the first base station to change the second SL DRX configuration.

28. The apparatus of claim 27, wherein the one or more processors are further configured to cause the apparatus to:

receive, from the first base station and within the window of time, an indication of a third SL DRX configuration to be applied at the second UE, the third SL DRX configured by the first base station to override the second SL DRX configuration; and transmit the indication of the third SL DRX configuration to the second UE.

29. The apparatus of claim 24, wherein the one or more processors are further configured to cause the apparatus to:

receive an acknowledgement (ACK) generated by the first base station, the ACK configured to indicate acceptance, by the first base station, of the second SL DRX configuration; and transmit the ACK to the second UE.

30. The apparatus of claim 24, wherein:

the first SL DRX configuration comprises at least one of: a first SL DRX cycle, a first SL DRX starting offset, or a first SL DRX slot offset;

the second SL DRX configuration comprises at least one of: a second SL DRX cycle, a second SL DRX starting offset, or a second SL DRX slot offset; and the Uu DRX configuration comprises at least one of: a Uu DRX cycle, a Uu DRX starting offset, or a Uu DRX slot offset.

* * * * *